(12) United States Patent
Ohkubo et al.

(10) Patent No.: US 7,298,520 B2
(45) Date of Patent: Nov. 20, 2007

(54) IMAGE PRINTING SYSTEM

(75) Inventors: Takayuki Ohkubo, Tokyo-to (JP); Jitsuhiko Ando, Tokyo-to (JP); Naoji Shibasaki, Tokyo-to (JP); Tohru Ishii, Tokyo-to (JP); Tohru Funaki, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 644 days.

(21) Appl. No.: 09/932,700

(22) Filed: Aug. 17, 2001

(65) Prior Publication Data

US 2002/0051207 A1 May 2, 2002

(30) Foreign Application Priority Data

| Aug. 17, 2000 | (JP) | ............................ P2000-247743 |
| Jan. 16, 2001 | (JP) | ............................ P2001-008226 |
| Mar. 16, 2001 | (JP) | ............................ P2001-076477 |

(51) Int. Cl.
*G06F 15/00* (2006.01)
(52) U.S. Cl. .................. 358/1.18; 358/1.15; 358/1.16; 707/1; 707/100; 707/102
(58) Field of Classification Search ............... 358/1.18, 358/1.16, 1.15; 707/1, 100
See application file for complete search history.

(56) References Cited

U.S. PATENT DOCUMENTS 5,513,254 A 4/1996 Markowitz
5,805,215 A * 9/1998 Mizoguchi ............... 348/231.5
6,011,537 A * 1/2000 Slotznick ..................... 715/733
6,111,586 A * 8/2000 Ikeda et al. ................. 345/619
6,249,644 B1 * 6/2001 Inoue et al. ................. 386/130
6,421,062 B1 * 7/2002 Higashio ..................... 345/634
6,567,120 B1 * 5/2003 Hamamura et al. .... 348/207.99
6,801,327 B1 * 10/2004 Haneda et al. ............... 358/1.1

FOREIGN PATENT DOCUMENTS

| EP | 678815 | 10/1995 |
| EP | 678816 | 10/1995 |
| EP | 1148702 | 10/2001 |
| FR | 2773902 | 7/1999 |
| JP | 1 1196247 | 7/1999 |

\* cited by examiner

*Primary Examiner*—Twyler Lamb
*Assistant Examiner*—Mark R Milia
(74) *Attorney, Agent, or Firm*—Ladas & Parry LLP

(57) ABSTRACT

Image plus event information printing system, which comprises an image data inputting means for inputting a datum of original image, an event information database which memorizes the data of current and/or passing events information being sorted with one or more items, wherein one of the items consists of the occurrence time of the event, an event information retrieval means for extracting any event information within a predetermined range being in correlation to the time which is related to the original image, by retrieving from the sorted data in the event information database with using one or more of the items, an image editing means for preparing a datum of an image plus event information, from the datum of original image and the extracted event information, and a printing means for printing the image plus current events information in accordance with the datum prepared by the image editing means.

15 Claims, 49 Drawing Sheets

FIG. 28

Please insert money

| | | |
|---|---|---|
| Number of order | 6 | sheets |
| Unit price | 60 | Yen |
| Fee for News | 100 | Yen |
| Total amount | 460 | Yen |
| Inserted amount | 0 | Yen |

[Cancel] [Prev. Screen]

FIG. 29

If it is okay, please press [Confirmation]

| | | |
|---|---|---|
| Number of order | 6 | sheets |
| Unit price | 60 | Yen |
| Fee for News | 100 | Yen |
| Total amount | 460 | Yen |

[Cancel] [Prev. Screen] [Confirmation]

Please touch in order of date
→ Mark

JUN 6

| Sun | Mon | Tue | Wed | Thu | Fri | Sat |
|---|---|---|---|---|---|---|
|  |  |  |  |  |  | 1 |
| 2 | 3 | 4 | 5 | 6 | 7 | 8 |
| 9 | 10 | 11 | 12 | 13 | 14 | 15 |
| 16 | 17 | 18 | 19 | 20 | 21 | 22 |
| 23 | 24 | 25 | 26 | 27 | 28 | 29 |
| 30 | 31 |  |  |  |  |  |

[Cancel] [Prev. Screen] [Determination]

Please adjust the position and the size of photograph so as to fit the design

[Cancel] [Prev. Screen] [Return to Original] [Confirmation]

FIG. 43

Please insert money

| | | |
|---|---|---|
| Number of order | 6 | sheets |
| Unit price | 60 | Yen |
| Total amount | 360 | Yen |
| Inserted amount | 0 | Yen |

[Cancel] [Prev. Screen]

FIG. 44

If it is okay, please press [Confirmation]

| | | |
|---|---|---|
| Number of order | 6 | sheets |
| Unit price | 60 | Yen |
| Total amount | 360 | Yen |

[Cancel] [Prev. Screen] [Confirmation]

IMAGE PRINTING SYSTEM

BACKGROUND OF INVENTION

1. Field of the Invention

This invention relates to an image printing system which outputs a photographic image which was photographed with an image pickup apparatus such as digital camera, and stored in a recording media as an image datum, and input Into the printing system by reading the image datum with an equipped media reader, or by reading the out-put photograph directly with an equipped image reader such as scanner.

This invention also relates to an image printing system which outputs a specified scene in the dynamic image digital data which was photographed with an image pickup apparatus such as a digital camcorder, and stored In a recording media, and input into the printing system by reading the image datum with an equipped media reader.

This invention further relates to the individual service and information offer service at the time of printing service of the image data which a customer demands.

2. Related Art

Since the image taken by the digital camera etc. is recorded as digital data, without using a lab, it can print out by using the personal computer and printer at a home.

Moreover, a relatively compact Image outputting apparatus capable of reading and outputting image digital data photographed by a digital camera or the like as well as capable of being installed at a relatively small space of a corner in a shop or on the street has been proposed (hereinafter referred to as the "post type image outputting apparatus"). For example, JP-A-10-341303 discloses a post type Image outputting apparatus comprising various kinds of interfaces corresponding to a plurality of different kinds of recording media, capable of reading and outputting image digital data from the various kinds of the recording media. The post type image output apparatus provides the handiness to be operated freely by customers so that they can print out desired photograph images instantaneously and take them back with them.

Further, it is well-known to change a scale and a position by carrying out digital processing of the original image, or to edit the original image to synthesize other material images, or to do so, in order to obtain the image having additional value of high quality. For example, with a personal image printing system built on another personal computer as an axis, the digital processing of a image can perform comparatively easily even in an advanced image edition. Moreover, a different type image printing system called "Print Club" has been also put on the street or other places, wherein a photographed portrait can be synthesized with a frame image.

However, the advantage of using the image printing system put on these streets etc. has been decreased gradually, by improvement in functional of a personal computer and a printer for home use, and thus, a development of the image printing system which can offer a more additional value to the printed article would be desired.

Next, in order to print out one scene (hereinafter, it may be called "dynamic-shot" or a "shot image" may be called below) included in the dynamic image photographed with the digital camcorder, the digital camera, etc. as a still picture, a digital datum to be recorded as the desired scene for static image from the dynamic image digital data is specified, and a still image is printed out based on this static image data.

Such work can be done using the personal computer and printer at a home. Alternatively, once one scene included in a dynamic image is specified by using the personal computer at a home, it is possible for the data of the specified shot image to be recorded on a recording medium, and to be brought to a processing laboratory (lab) in order to be printed as a still picture.

However, in order to print a shot image from a dynamic image data using a lab, it is necessary to specify the scene of wishing to print out as a still picture from the countless scenes included in the dynamic image, and to tell the clerk of the lab about it. For that purpose, a shot Image to be printed should be specified by using a personal computer at home and the datum of shot image should be digitalized to be recorded on a recording medium in order to carry it into the lab. Alternatively, the dynamic image data on a recording medium should be carried into the lab, then the dynamic image data should be reproduced on a monitor in front of the clerk of the lab in order to point out the scene to be printed to the clerk. These are inconvenient anyway.

Although the post type image outputting apparatus as described above can be operated freely by a customer, in order to print out a desired photograph image instantaneously and with ease, it does not have the function which prints out such a shot image.

Furthermore, the shopping center etc. does some unique services offered to customer, such as an information service of the recommended goods by insertion of a newspaper etc., a point service wherein points are given to the customer in proportion to the customer's usage of the shopping center, and any service such as reduction in price, etc., is made according to the given points. These services are not restricted to such a shopping center, but are performed in various types of industry. For example, such service is made on the DPE print store which develops a photograph. In a DPE print store, if a customer orders a print, points will be given to him according to the fee of print. Once the points accrued by the customer attains a fixed point, the print fee will be discounted according to the fixed point. Alternatively, as the service, an enlarged photograph etc. would be given with no charge.

Moreover, in recent years, by using the Internet etc., while performing advertisement of stores (shopping center etc.), a service where a coupon (discount ticket) etc. can be issued by a operation on the browsing screen is offered.

However, when a customer uses the mentioned image printing apparatus, in the present condition, such additional service is not given. Thus, there is a large service gap between the case of using such image printing system and the case of using DPE print store, etc.

Moreover, the printing apparatus has the advantage that it can install anywhere, even In a small space. Therefore, once the printing apparatus is installed in a shop, and it uses for performing advertisement of the shop to the customer using printing apparatus, it is expected that it can perform timely and effective advertisement.

SUMMARY OF INVENTION

First, this invention aims to provide an printed article with a high added value by improving the edit capability of the personal image printing system which is constructed with a personal computer as an axis, or a known commercial image printing system such as the above mentioned post type image outputting apparatus.

Secondly, this invention aims to provide an image printing system which prints the shot image by specifying one scene out of dynamic image contents, and optionally further processing the specified scene image, with using the post type image outputting apparatus.

Thirdly, this invention aims to provide various information which are useful for the customer, upon using the printing apparatus, which would solve the service gap between the case of requesting a print in a image printing system and the case of using a DPE shop.

The first aim mentioned can be attained by an image plus event information printing system according to the present invention, which comprises:

an image data inputting means for inputting a datum of original image, an event information database which memorizes the data of current and/or passing events information being sorted with one or more items, wherein one of the items consists of the occurrence time of the event, an event information retrieval means for extracting any event information within a predetermined range being in correlation to the time which is related to the original image, by retrieving from the sorted data in the event information database with using one or more of the items, an image editing means for preparing a datum of an image plus event information, from the datum of original image and the extracted event information, and a printing means for printing the image plus current events information in accordance with the datum prepared by the image editing means.

According to the above mentioned image plus event information printing system, the current and/or passing information which shows the famous occurrence generated at the time or near the time related to the image can be synthesized with the image, and is printed by improving the personal image printing system which is constructed with a personal computer as an axis, or the Image printing system such as the above mentioned post type image outputting apparatus, and thus the printed article with a high added value can be obtained easily.

The time related to an original image may be the photographed day of the original image typically. By searching and extracting the events information which shows such as the famous occurrence generated at the same day as a photographed day or the near time of an original image, and synthesizing with an original image, those who looked at the synthesized image can grasp the photographed time of an original image intuitively from the contents of event information, or can recognize the time background at the time of original image photographed.

In the image plus event information printing system according to this invention, when two or more events information are retrieved from the sorted data by the event information retrieval means, the system may has further the event information selecting means where one or more events information are selected as user's pleases from the retrieved events information in order to synthesize with an original image.

When two or more events information are retrieved, one or more events information may be automatically determined as the event information to be added to the original image, by the system side according to a predetermined priority. It is preferable, however, to make the user choose favorite events information freely by using the event information selecting means, upon showing all of the events information extracted by the event information retrieval means or showing some of those in higher ranks of the predetermined priority, since the printed article of a higher added value would be obtained.

The image plus event information printing system of this invention may be constructed as the stand-alone type which installs all the means in one apparatus, and may constructed with some apparatuses which bears separate means respectively so as to carry out a distributed storing and each apparatuses are connected to each other by the line.

For example, the image plus event information printing system according to this invention may comprise a terminal part and a event information service part, which are connected to each other via line, wherein the terminal part includes the image data inputting means, the image editing means and the printing means, and wherein the event information service part includes the event information database and the event information retrieval means.

Alternatively, the image plus event information printing system according to this invention may comprise a terminal part and a retrieval and editing part, which are connected to each other via line, wherein the terminal part includes the image data inputting means and the printing means, and wherein the retrieval and editing part includes the current event information database, the current event information retrieval means, and the image editing means.

Further, the image plus event information printing system according to this invention may comprise a terminal part, an editing part, and an event information service part, wherein the terminal part and editing part are connected to each other via line, and the editing part and the event information service part are connected to each other via line, wherein the terminal part includes the image data inputting means and the printing means, and wherein the editing part includes the image editing means, and wherein the event information service part includes the event information database and the event information retrieval means, and the image editing means.

Furthermore, in this invention, distributed storing of each means can be carried out at terminal apparatuses and a server, and a client-server type system can be constructed.

Namely, in this Invention, a server which delivers a material datum for image synthesis to a terminal or server capable of editing the image via line is disclosed. The delivery server comprises:

an event information database which memorizes the data of current and/or passing events information being sorted with one or more items, wherein one of the items consists of the occurrence time of the event;

an event information retrieval means for extracting any event information within a predetermined range being in correlation to the time which is related to the original image, by retrieving from the sorted data in the event information database with using one or more of the items, and a transmission means for transmitting the retrieved data to the terminal or server capable of editing the image.

Further, in this invention, a server which is connected to a terminal via line and transmits to the terminal a datum of image which is synthesized herein is also disclosed. The transmission server comprises:

a receiving means for receiving a datum of original image, an event information database which memorizes the data of current and/or passing events information being sorted with one or more items, wherein one of the items consists of the occurrence time of the event, an event information retrieval means for extracting any event information within a predetermined range being in correlation to the time which is related to the original image, by retrieving from the sorted data in the event information database with using one or more of the items, and an image editing means for preparing a datum of an image plus event information, from the datum of original image and the extracted event information.

The second aim mentioned can be attained by a dynamic-shot printing system according to the present invention, which comprises:

a dynamic image data procurement means for obtaining a dynamic image data, a static image data specifying means for specifying a scene recorded in the dynamic image data as the static image, an order inputting means for inputting orders for an image to be output, an output content designation data producing means for preparing an output content designation datum which records the image to be output and appendix conditions for the image on the basis of the obtained static image data and the input orders, and a printing means which prints out an printed article of the image in accordance with the output content designation datum.

According to this invention, since dynamic image data can be processed easily, and since the selected shot image contained in a dynamic image can be printed as it is or the selected shot image can be printed after it is further received an advanced image processing, the image printing system and printed article which enjoy a high added value can be provided.

As for the output content designation data producing means of the dynamic image shot printing system according to this invention, it is desirable to include an editing means for editing the specified static image datum to the image to be output.

By establishing such an editing means, it can not only print the static image specified from the dynamic image data as It is, but also a newly processed static image data on the basis of the specified static image. Therefore, the shot image with high added value can be printed.

In one embodiment of this invention, the system further comprises an static image inputting means for inputting a static image datum, in addition to a dynamic image inputting means for inputting a dynamic image datum as the dynamic image procurement means.

In another embodiment of this invention, the system further comprises an static image database for storing static image data, in addition to a dynamic image inputting means for inputting a dynamic image datum as the dynamic image procurement means.

In still another embodiment of this invention, the system further comprises an static image inputting means for inputting a static image datum, in addition to a dynamic image database for storing dynamic image data as the dynamic image procurement means.

In yet another embodiment of this invention, the system further comprises an static image database for storing static image data, in addition to a dynamic image database for storing dynamic image data as the dynamic image procurement means.

In an embodiment of this invention, the dynamic image procurement means comprises a dynamic image inputting means for inputting a dynamic image datum and a dynamic image database for storing dynamic image data.

According to each above mentioned embodiment, by combining freely the original dynamic image contents and/or original static Image contents brought by a user with dynamic image contents and/or static Image contents possessed by the system or originally obtainable by the system side, a new image can be easily synthesized and easily printed out.

In this invention, the above mentioned static image data specifying means may comprise a dynamic image viewing means for playing the input dynamic Image datum and displaying the dynamic image, and a static image selecting means for selecting a scene displayed in the dynamic image viewing means as the static image datum.

The dynamic image viewing means may further comprise a playback speed control means for controlling the playback speed of reproduced dynamic image to be in slow motion or frame-by-frame advance at a choice timing.

The dynamic image viewing means may also further comprises a photographic playback producing means for converting the reproduced dynamic image into a photographic playback at a choice timing.

The above mentioned dynamic image viewing means the dynamic Image viewing means may further comprises a pausing means for pausing the reproduced dynamic image at a choice timing.

The static image data can be more easily chosen by adopting combining any two or all of the playback speed control means, a photographic playback producing means, and the pausing means.

The above mentioned static image data specifying means may further comprise a static image data storing means for storing 2 or more static image data while giving a storing number in order to each image datum.

The static image data storing means may further comprise a storing adjustment means which can delete a part of or all of stored static image data, and modify the storing number.

The static image data storing means may further comprise a pre-view displaying means for displaying images of the stored static image data in order of storing.

In this invention, the editing means is capable of editing separately 2 or more static image data stored in the static image storing means into the corresponding number of images to be output as printed articles.

Moreover, in this invention, the editing means is capable of editing 2 or more static image data stored in the static image storing means into a pre-view image as the image to be output which displays the stored static images within a screen.

The third aim mentioned can be attained by an additional information printing system according to the present invention, which comprises a function of concurrent providing a printed article having additional information to a customer, at when a printing service system which prints an image datum into an image printed articles on a requirement of the customer and delivers it to the customer delivers the printed article.

In this invention, the additional information printing service system may further comprises a point producing means which gives to the customer points in proportion to his utilization frequency of the system. The system may further comprises a questionnaire inputting means, and the printed article having additional information is provided at when the customer gives an answer to a questionnaire by the questionnaire inputting means. The additional information to be printed may contain at least one of information of the point, shop information and advertising information.

Since according to this invention a printed matter which can give various information (recommended information, discount information, etc. on a neighboring shopping center) is added to the printed article which the customer demands and they are concurrently provided for a customer, a customer can acquire advantageous information. The donor who carries an advertisement can advertise efficiently and easily. Moreover, by adding service points according to utilization frequency as one form of service, and accumulating the service points, a customer can be provided with various services (discount service etc.), and the number of accumulation points can be checked with the additional information printed matter where it Is printed. Furthermore, if an answer for a questionnaire can be obtained from a customer in another form of service, by using the waiting time of printing, the customer can acquire new information by receiving a printed article which printed new additional information (for example, a first-class information etc.) as thanks for giving answer. The donor of the printing matter can acquire an opinion for improving by the questionnaire result reflecting a customer's idea.

Furthermore, the third aim mentioned can be attained by an additional information printing service system according to the present invention, which comprises:

an inputting means for inputting an image datum and/or information, a storing means for storing the input image data and/or information, an image data/information extracting means for extracting a image and/or information to be needed, from the stored data, and a printing means for printing the input image datum and/or the extracted image datum and/or information by the extracting means.

Since this system is equipped with an input part as an inputting means by which a customer or a printing apparatus donor inputs image data or information, a database as a means to store the image data or information which carried out above mentioned input, a control part wherein with the demand from the above mentioned customer or printing apparatus, the information data demanded is specified from the stored image data or information data and the specified image data or information data is extracted, and further an output part (printer) as a printing means to print the image data which was input or demanded by the customer, and to print the information data, the service which was described above can be offered.

Furthermore, the additional information printing service system according to this invention may be characterized by the fact that the system is provided to a printing apparatus. By this fact, the customer can print freely and easily can print the image data of his wants at the shop (shopping center etc.) where the printing apparatus is installed, without going to the print specialty shop, but along with the same additional service as that he receives at the print specialty shop.

BRIEF DESCRIPTION OF THE DRAWINGS

FIG. 28 is the guidance screen of the charge payment displayed when synthesizing the image plus event information.

FIG. 29 is the guidance screen which asks for the confirmation of a charge when synthesizing the image plus event information in an embodiment of the image printing system according to the first aspect of this invention, it.

FIG. 43 is the guidance screen of the charge payment displayed when frame synthesis is performed.

FIG. 44 is the guidance screen which asks for the confirmation of a charge when frame synthesis is performed.

DETAILED DESCRIPTION OF THE PREFERRED EMBODIMENT OF INVENTION

Now, this invention will be described in detail with referring to the preferred embodiments. However, this invention is not limited to the following preferred embodiments.

Image Plus Event Information Printing System

The image plus event information printing system according to this invention comprises at least following means, that is:

(1) an image data inputting means for inputting original image data,
(2) an event information database which memorizes the data of current and/or passing events information being sorted with one or more items, wherein one of the items consists of the occurrence time of the event,
(3) an event information retrieval means for extracting any event information within a predetermined range being in correlation to the time which is related to the original image, by retrieving from the sorted data in the event information database with using one or more of the items,
(4) an image editing means for preparing a datum of an image plus event information, from the datum of original image and the extracted event information, and
(5) a printing means for printing the image plus current events information in accordance with the datum prepared by the image editing means.

However, the system may have other means optionally, such as a means for inputting order contents, a material database which memorizes material images other than events information, and a means for collecting a charge. Moreover, the image plus event information printing system of this invention may be constructed as the stand-alone type which stored all the means in one apparatus, or may be constructed by some apparatuses which carried out distributed storing of each means and which are connected each other by the line. Furthermore, distributed storing of each means may be carried out at terminal apparatus and a server, and a client/server type system may be constructed.

In order to print the image plus event information with the image plus event information printing system of this invention, at first a image datum which recorded an original image is input in a system by the image data inputting means. Then, the event information which shows a famous current/passing event occurred at a date near to the time being related to the input original image (for examples famous event occurred at the same day with the photographed day of the original image, or within about one month before and after the photographed day) is searched and extracted from the events information database by using a event information retrieval means, and the extracted event information is synthesized with an original image by using the image editing means. Finally, the synthesized image may be printed by the printing means.

Figure 1:
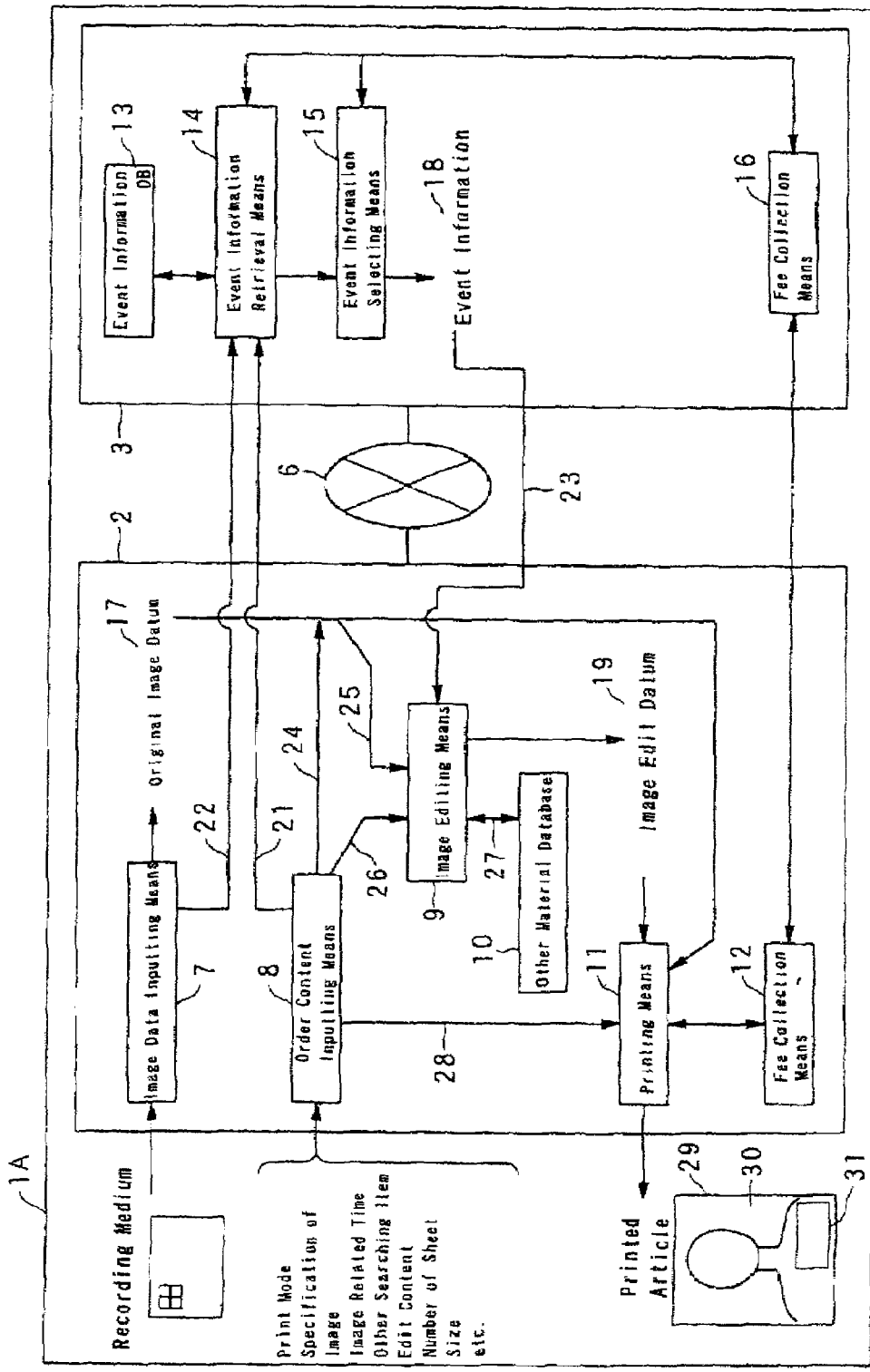
FIG. 1 is the diagram showing the outline of the image printing system according to the first aspect of this invention.

The outline of this invention will be explained with reference to FIG. 1. FIG. 1 is an constructive embodiment of the printing system according to this invention (1A). The print system 1A comprises a terminal part 2 which can receive an order and can output a printed article, and a events information service part (events information distribution server) 3 which offers events information in response to the demand from a terminal part, and the above mentioned terminal part 2 and the above mentioned events information service part 3 are connected through a line 6. The line 6 may be an exclusive or open network line of various scales such as Internet, intranet, LAN. Alternatively, it may be a line which simply connects one main body with one backyard print part.

In addition, in the illustrated printing system 1A, the terminal part 2 is constituted by the post type image outputting apparatus which is a commercial image output system, on the other hand, the events information service part 3 is constituted by the events information distribution server which an entrepreneur other than that of the post type image outputting apparatus manages, and both are connected by the Internet as a line 6.

The terminal part 2 is equipped with an image data inputting means 7, an order inputting means 8, an image editing means 9, an other material databases 10, an printing means 11, and a fee collecting means 12. On the other hand, the events information service part 3 is equipped with an events information database 13, an event information retrieval means 14, an event information selecting means 15, and the fee collection means 16 of the events Information service part.

In order to print the image plus event information using printing system 1A, the print mode which can print the image plus event information is first chosen by using the order inputting means 8 and the mode is started. The order contents which should be outputted may be input optionally by using the order inputting means 8. However, it is possible to set up the system so that a standardized procedure may be performed automatically after starting the printing system, without receiving no order from the user, up to the final step where the image plus event information is printed. Thus, the order inputting means is not essential to the system of this invention.

several alternatives for order contents may be beforehand prepared by the image printing system side in order that the customer can decide his order content with ease by selecting freely from the alternatives. It is desirable to show the customer the alternatives for order contents which can be chosen on a display means (not shown), and to guide input operation of order contents. As the display means, a CRT, a liquid crystal display or the like, are used commonly, but it can be a simpler device. For example, when applying the printing system of this invention to the post type image outputting apparatus mentioned above, it is possible to stand a bulletin board which itemized the operation method by the side of the terminal part. In addition thereto, a substitute display device such as various kinds of screen panels, plasma displays or the like, can be used as well. As the order contents, for example, the selection In case there are two or more print modes the selection of specifying which frame image should be used in case two or more image data for plural frames are input, specification of the time (image related time) relevant to an original image, designation of a retrieval item which should be directed for a event information retrieval means in addition to the image related time, directions of the contents of edit Including the synthesis with the event information and other material image, expansion or reduction of the image, etc. designation of print number of sheets, the determination of size, etc. may be exemplified.

As the order content inputting device 8, for example, various kinds of pointers such as a touch panel provided integrally with a display device such as a CRT, and a liquid crystal panel, a keyboard, a mouse, and a track ball, can be used. Moreover, the DPOF function (digital print order format) provided in a digital camera can be used as well.

Next, an image datum 17 which recorded the original image is input by using the image data inputting means 7.

The image data to be inputted are mainly a photograph image taken by a digital camera or the like, and recorded in a recording medium as digital data, but it is not limited thereto. For example, a computer graphic image produced by a personal computer, digital image data of a synthesized image produced by the editing process of a photography by a personal computer, or any articles which have already printed out, such as those of photograph image, synthesized image, computer graphic image, a handwritten illustration or the like, can be used as well.

As the image data inputting means 7, for example, reading machines corresponding to each recording medium, such as a compact flash memory (CF), a smart medium, a compact disc (CD), a magneto-optic disc (MO), a flexible disc (FD), and a PC card, a connector to be connected with a digital camera, capable of reading image data from a memory of the digital camera, can be used As the image data inputting means 7, a reading device such as a scanner for reading an image from a hard copy, a film, or another printed article so as to convert the same to digital data, can be used as well. By including an image reading device capable of directly scanning an image together with a recording medium reading device in the Image data inputting means 7, even in case the digital image data are not provided, the image printing apparatus according to the present invention can be utilized. For example, in case the negative film is lost, additional prints can be provided easily from the printed photograph. Furthermore, a communication apparatus which can receive an original image from an external server may be used as an image data inputting means 7. It is preferable to include a plurality of reading devices of different kinds in the image data inputting means 7 in order to improve the applicability of the image printing apparatus of the present invention.

Next, the events information which shows the occurrence generated at a time near to the time relevant to the input original Image is searched and extracted from the data of the events information memorized in the events information database 13 by using the event information retrieval means 14.

In the events information database 13, for example, the events information data which specify socially famous occurrences are accumulated. The "socially famous occurrence" would refer to the occurrence which is expected to be remembered and recognized with the exact or about occurrence time thereof by many members in a society, or refer to the occurrence which comes to be a common knowledge in the society, wherein the society may be that organized in a predetermined area, for example, an administrative district region of a prefecture level such as Tokyo, a larger region level such as Kanto, a nation level such as Japan, or worldwide level. The socially famous occurrence may include a historical incident, a large calamity, a topic about a famous entertainer, etc. Event information denotes an information capable of identifying the content of event, such as a socially famous occurrence, on a printed matter, and it can be constituted by words, text, photograph, or picture which each indicate the event, singly or in arbitrary combination thereof. Moreover, since any pattern like a bar code which can reproduce a sound when it Is read with a certain reader, it can be used as event information and thus the contents of a socially famous occurrence can be attached on a printed matter as this pattern and it can be identified with a sound. As a concrete example, the event information may comprise a combination of some brief words which show the socially famous occurrence, a description for the date of the occurrence, and a thumb nail image which indicates one scene of the occurrence.

In the events information database 13, the data of the events information which specify events, such as the socially famous occurrences are sorted or classified by the generating time of occurrence, and preferably, they are pluralistically sorted or classified by two or more items containing the generating time of an occurrence, and memorized. Therefore, an event information 18 regarding the famous occurrence which was generated at the time near the time relevant to the input original image (image related time) can be searched and extracted from the data In the events information database by using the event generating time as the search item at the event information retrieval means 14. Moreover, a priority may be assigned to each events Information accumulated in a database so that the search result can display the events information extracted in preferential order from when many events information are extracted by the search.

The time which is related to the original image is typically the photographed day of the original image. By searching and extracting the events information which shows the famous occurrence generated at the same day as or the near time of the photographed day of original image, and synthesizing the extracted event information with the original image, those who looked at the synthesized image can grasp the photographed time of an original image intuitively from the contents of events information, or can recognize the time background at the time of original image photographed. However, the image related time is not limited to a photographed day. That is, those who perform image edit using this system can choose a certain time related to the original image arbitrarily, and can specify as the image related time. The image related time may be input into the event information retrieval means 14 by using the order inputting means (numeral 21), or may read automatically the data of the photographed day which is recorded along with image data, and transmitted to the event information retrieval means 14 (numeral 22).

In the event information retrieval means 14, a proper time range is set up on the basis of the image related time for searching, and events information for events each of which occurrence time belongs within the time range are extracted. The time range may be set as a proper time range which includes some future from the image related time, and/or some bygone days from the image related time. Alternatively, it may be set to a predetermined period wherein the image related time belongs in arbitrary time units on a calendar(for example, year, month, or day). In accordance with the former method, for example, the events information which indicates the events generated less than 3 months before the image related time, or the events generated within six months each before or after image related time may be searched. In accordance with the latter method, the events information which indicates events generated in the same A.D. annual as the image related time belonging year may be searched Since the events information after the image related time would be not amply accumulated in the system of this invention when using the system at a time relatively close to the image related time, it is desirable to set up and search the range of a proper period before the image related time. On the other hand, when using the printing system of this invention after passing to some extent from image related time, it is desirable to set up and search the range of a relatively extended period before and after the image related time, or the range of the same year or the same month that the image related time belongs.

As far as it is convenient on the operation of this printing system, arbitrary units can be adopted as the time unit for sorting the events by the occurrence time in the events information database 13, as the time unit for specifying the image related time, and as the time unit for setting a searching time range in correlation with the image related time, and the respective time units may be set independently by using separate units. Usually, the occurrence time and the image related time are specified per day unit, and the searching time is set and fixed to one of a day unit, a month unit, and a year unit, or set so that the customer can select one of these unit arbitrarily. For example, then image related time is specified with Mar. 3, 1999, the event information whose generating day is on March 3 can be hit even then using any of year unit (1999), month unit (March, 1999), day unit (Mar. 3, 1999). The event information whose generating day is on March 10 can not be hit when using the day unit, while can be hit with the month unit and with the year unit The event information whose generating day is on May 3 can be hit only with the year unit.

In the events information database 13, when other classification items is adopted in addition to the occurrence time of the event, and events information are pluralistically classified or sorted with these items, events information can be pluralistically searched using two or more searching items corresponding to the classification items. Therefore, the event information whose occurrence time corresponds at image related time can be searched in each genre or categories. For example, even if the image related time to be used is the same, it is possible to extract only the event information in the entertainments category, or alternatively, only event information in the international political field. Further, it is possible to extract any events information regardless the genre, in spite of being classified pluralistically. Namely, searching with non genre can be performed in expectation of a result that two or more events information over a different field would be extracted.

When there are much hit number of events in searching, according to the priority assigned to events information individually in advance or according to the predetermined method for deciding priority of the extracted events information, one or several event information may be selected for image synthesis. Moreover, in order to cope with the case that there are much hit number of events in searching, an event information selecting means 15 can be provided to the system. When two or more events information is hit by the event information retrieval means 14, the all of hit events information are displayed on the display means (not shown) or only several of hit events information are displayed by a selection according to the priority assigned to events information individually in advance or according to the predetermined method for deciding priority of the retrieved events information. The customer can choose freely 1 or two or more events information that he wishes to synthesize with his original image, from the displayed events information by using the event information selecting means 15.

It is desirable to make the customer recognize the event information 18 which is extracted from the events information database 13 by the retrieval means 14, and further optionally chosen by the event information selecting means 15, by displaying the events information 18 on the display means (not shown), and it is more desirable to obtain the customer's confirmation of using the events information extracted or chosen to the image synthesis.

The events information database 13 can be built in memory storage, such as a hard disk in a computer. Moreover, the event information retrieval means 14 and the event information selecting means 15 are realizable by executing the program stored in memory storage, such as a memory device and a hard disk, with the computer.

The event information 18 which is extracted by the event information retrieval means 14, and optionally further chosen by the event information selecting means 15 is transmitted to the image editing means 9 (numeral 23), and is synthesized with the original image. In the illustrated printing system 1A, the image editing means 9 can perform various edits, such as synthesis with material images other than the event information such as a frame, expansion and reduction of image, besides addition of events information. That is, in this printing system 1A, when the print mode which performs addition of events information or other image edits is chosen by the order inputting means (numeral 24), or when being set up so that addition of events information or other image edits may be performed at anytimes, while the image data 17 of an original image is transmitted to the image editing means 9 (numeral 25), the events information 18 (numeral 23) and the other contents of edit (numeral 26) are also transmitted to the image editing means 9 according to print mode and order contents. In the other material databases 10, the data of material images other than events information, such as frame, are accumulated, and when a direction for synthesizing any material image other than event information with the original image is included in the edit contents, a material image is read from the other material database 10, and transmitted to the image editing means 9 (numeral 27).

Figure 4A:
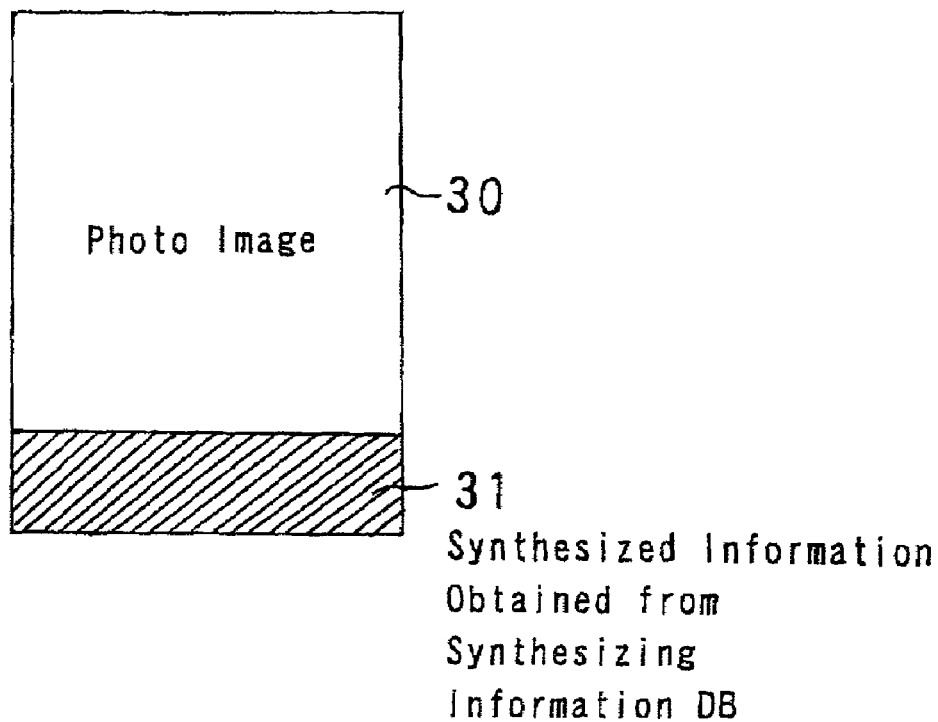
FIG. 4 is the diagram showing the layout of the image plus event information.
Figure 4B:
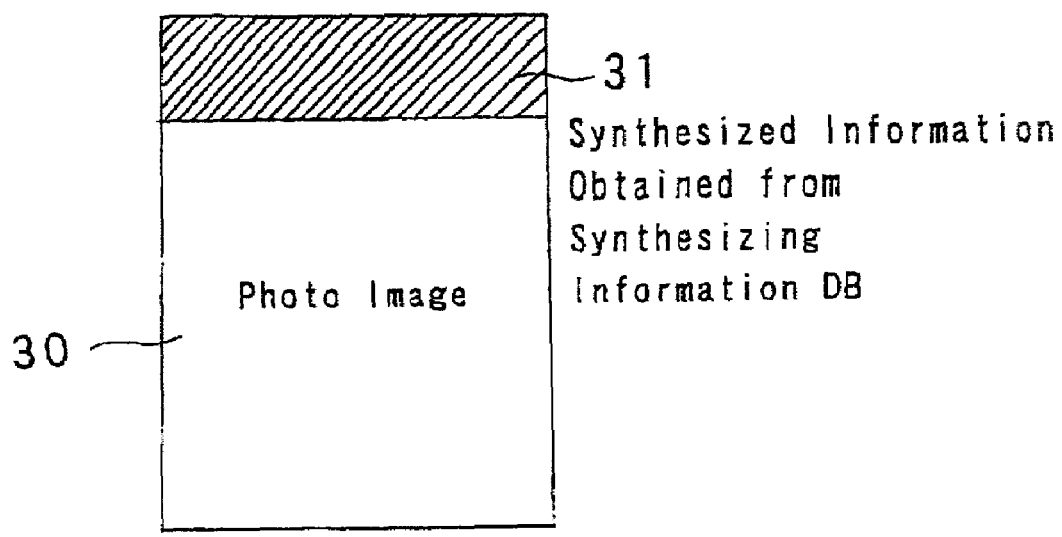
Figure 4C:
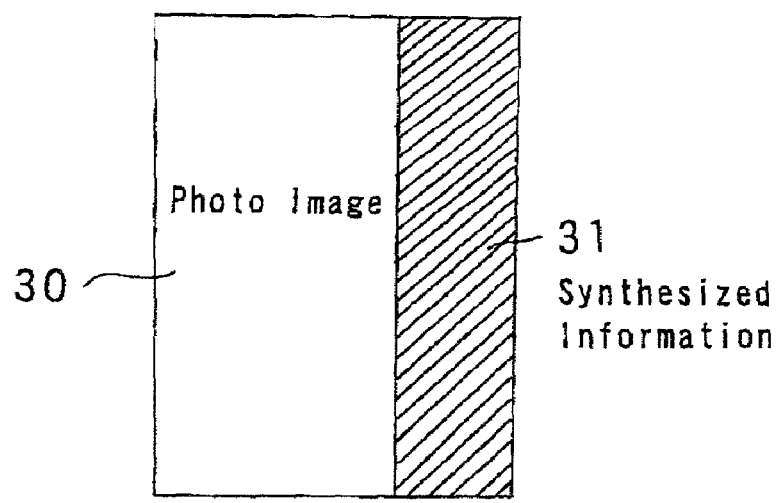
Figure 4D:
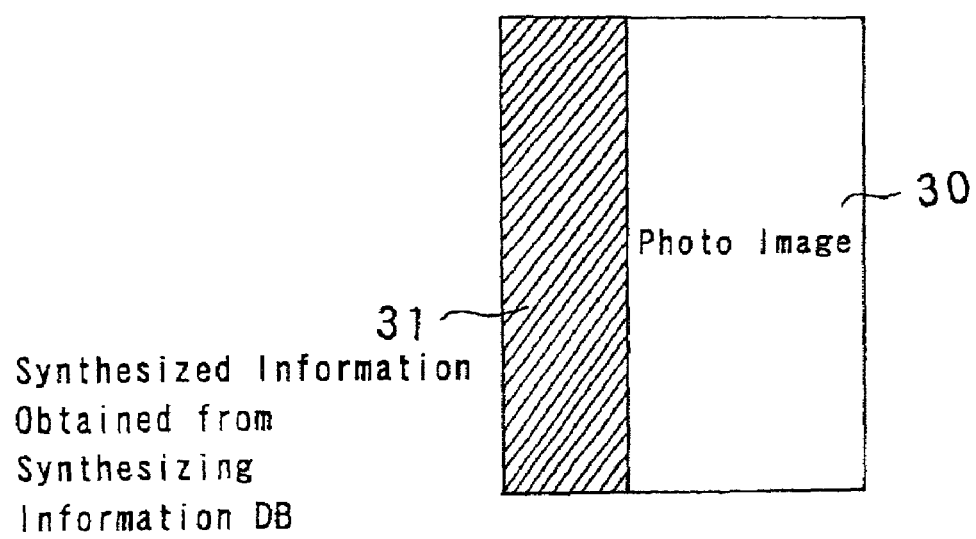
Figure 4E:
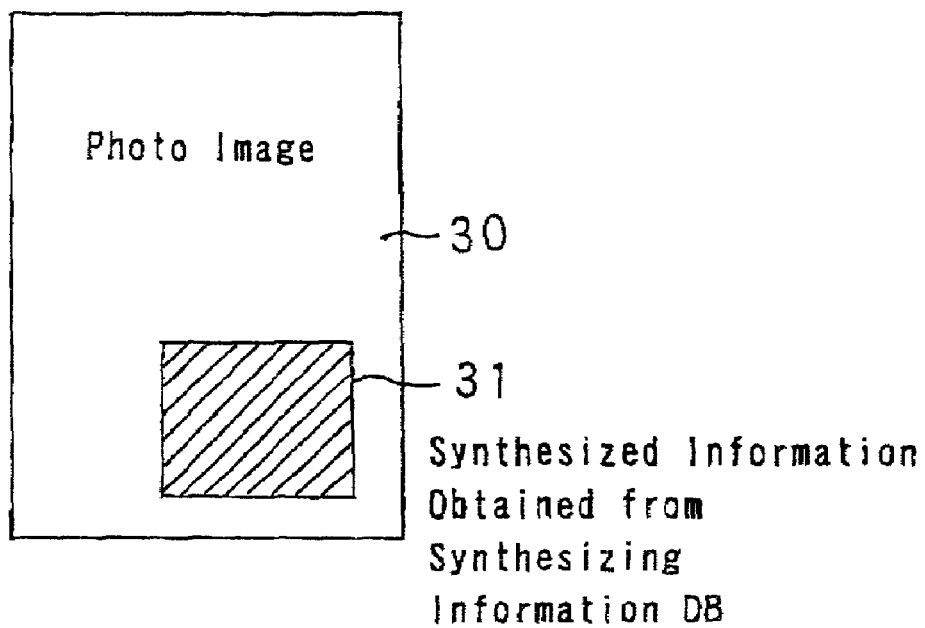
Figure 4F:
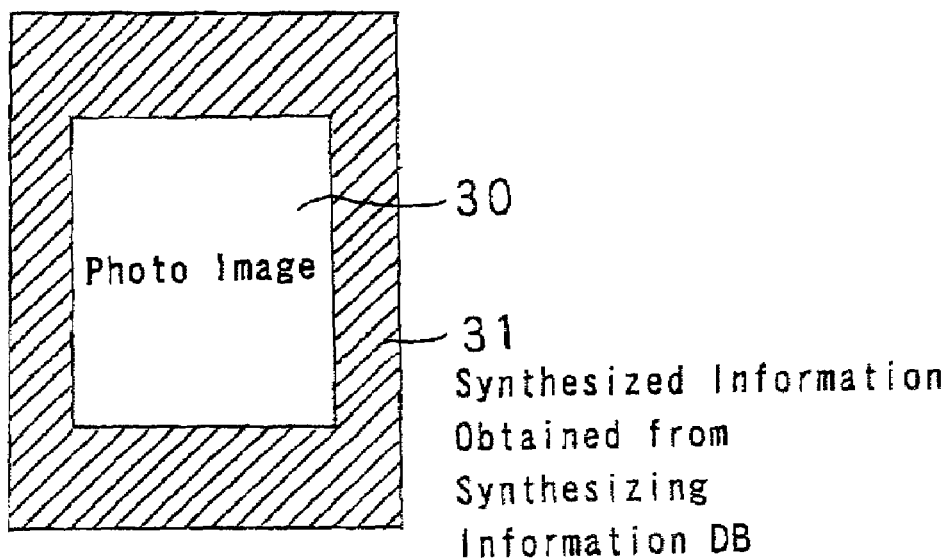

The edit work by the image editing means 9 can be done with displaying the image in the middle of edit on the display means (not shown), and being checked The synthesizing position of the events information to the original image in the synthesized image is not particularly limited. For example, as shown in FIGS. 4, the events information 31 can be given to the lower end (FIG. 4A) of the original image 30, an upper end (FIG. 4B), right side (FIG. 4C), left side (FIG. 4D), the lower right side (FIG. 4E), etc. Moreover, as shown in FIG. 4F, it is possible to synthesize events information with a frame so as to surround all the circumferences of an original image.

Thus, the image data 19 as an edit image is generated by the image editing means 9, and especially when the direction for adding events information is included in the print mode or order contents, the image data of the image plus event information is generated.

The image synthesizing means 9 is realizable by executing the program stored in memory storage, such as a memory and a hard disk, with the computer. Moreover, the other material databases 10 can be built in memory storage, such as a hard disk in the computer.

Next, the image data 19 of the edit image generated by the image editing means 9 is transmitted to the printing means 11. However, when printing an original image as it is, not the image data 19 of an edit image but the image data 17 of an original image is transmitted to the printing means 11 as image data which should be output. Furthermore, other print conditions required in addition to the image data which specifies the image to be output, such as number of sheets, size, and paper to bee used are transmitted to the printing means 11 (numeral 28). And the edited image or original image is printed as order by the printing means. Especially, when the direction of synthesizing the original image 30 and the events information 31 is included in print mode or order contents, according to the image data of the edit image generated with the image editing means 9, the printed article 29 of the image plus event information is printed by the printing means 11.

As a concrete outputting method of the printing device 11, for example, an outputting method suitable for printing based on digital image data, such as the sublimation type thermal transfer method, the melting type thermal transfer method, and the ink jet, can be utilized.

In the image printing system of the present invention, a fee charging means 12 may be provided for collecting the fee for outputting and providing an image. In case the fee charging means is provided, the fee charging means is driven after driving the order content inputting device, more preferably after driving the Image editing means if the image editing is performed and before outputting a printed article by the drive of the printing means. While the fee collection means 12 of the terminal part 2 totals and collects the basic fee of print service, and the option service charge generated by the image editing means 9 or the printing means 11 which can be performed in the terminal part 2, the charge of access to the event information retrieval means 14 currently installed in the events information service part 3 separated physically to the terminal part 2, the charge of sort fee thereof, the data rental fee of the events information chosen by the event information selecting means 15, etc. are managed and collected. The fee collection means 12 of the terminal part 2 may manage directly the expense generated by management of the events information service part 3, and may collect it from the customer. Alternatively it is possible to establish the fee collection means 16 separately in the events information service part 3, and the expense generated from the events information service part 3 is managed by the fee collection means 16 in the events information service part 3. The fee collection means 12 of the terminal part 2 may be indirectly managed in response to directions from the fee collection means 16 about the expense generated within the events information service part 3, and may carry out package collection of the expense generated within the terminal part 2 to the user, and the expense generated within the events information service part 3.

It is preferable to show the amount to be collected by the fee charging means to a user on the display device (not shown) together with the order content. Particularly, at the printing system 1A illustrated, since the events information service part 3 is constituted by the events information distribution server which an entrepreneur different from that of the post type image outputting apparatus as a terminal part 2 manages, after accessing the events information service part 3, searching events information and events information's coming to hand, even if the customer stops edit of a image and the work of a print on the way, it is necessary to ask the customer for the expense generated in the events information service part 3. Therefore, it is desirable to tell the customer about the information of the expense which will be charged even when a procedure is stopped on the way, while performing the procedure of this printing system at any time by the display means (not shown). The case where a user demands addition of events information, It is displayed that "the charge of access to a database, the charge of retrieval, and a data rental fee are needed separately. And, such expense generated by this option is charged even when you discontinue the print work." or so. Further, it Is possible to display, "The charge of access occurred" etc., when a database is accessed, to display "The charge of retrieval occurs" etc., when starting retrieval, and to display "A data rental fee occurs" etc., when taking in events information in the terminal part 2.

When the customer inserts a bill and/or a coin in the fee charging means according to the guide of the amount display by the display device, the fee charging means calculates the accepted amount and returns the change if any.

The fee collection means 12 of the terminal part 2 can be constituted combining suitably a coin and bill discernment device, change return device, the computer that manages a fee collection state. Since the fee collection means 16 of the events information service part 3 functions only for managing the total of a charge and the collection situation by the fee collection means 12, and it is not necessary to do collection work, it is realizable by executing the program stored in memory storage, such as a memory and a hard disk, with the computer.

A receipt producing means may be provided in the fee charging means. The receipt producing means automatically produces the receipt having the collected amount and the order content printed thereon after completing the fee collection by the fee charging means. The receipt producing means may further comprise a receipt producing eliminating means so that the producing of the receipt can be eliminated selectively in case the customer does not need the receipt. In this case, after completing the collection of the fee, an operation guidance "Would you like a receipt published?" or the like is displayed on the display device (not shown) so that the user presses a corresponding touch panel button or keyboard for executing the choice of producing or not producing.

In this invention, a client/server type printing system can be constructed by distributed storing of each means to constitute a image printing system at a terminal part, and one or more servers. In image printing system 1A shown in FIG. 1, the terminal part is constituted by the post type image outputting apparatus which is a commercial image output system. It has a image editing means 9 by which various image edits including synthesis of events information can be performed as well as the image data input apparatus 7 and the printing means 11. On the other hand, the events information service means 3 comprises an events information distribution server which an entrepreneur different from that of a post type image outputting apparatus manages, and has the events information database 13, the event information retrieval means 14, and the event information selecting means 15. Moreover, although it is not illustrated, the events information distribution server as a events information service part 3 has a transmitting means to transmit to the terminal which can image edit the data of the events information 18 extracted by the event information retrieval means. And as for the post type image outputting apparatus which Is the terminal part 2, and the events information distribution server which is the events information service means 3, both are connected by the Internet as a line 6.

Figure 2:
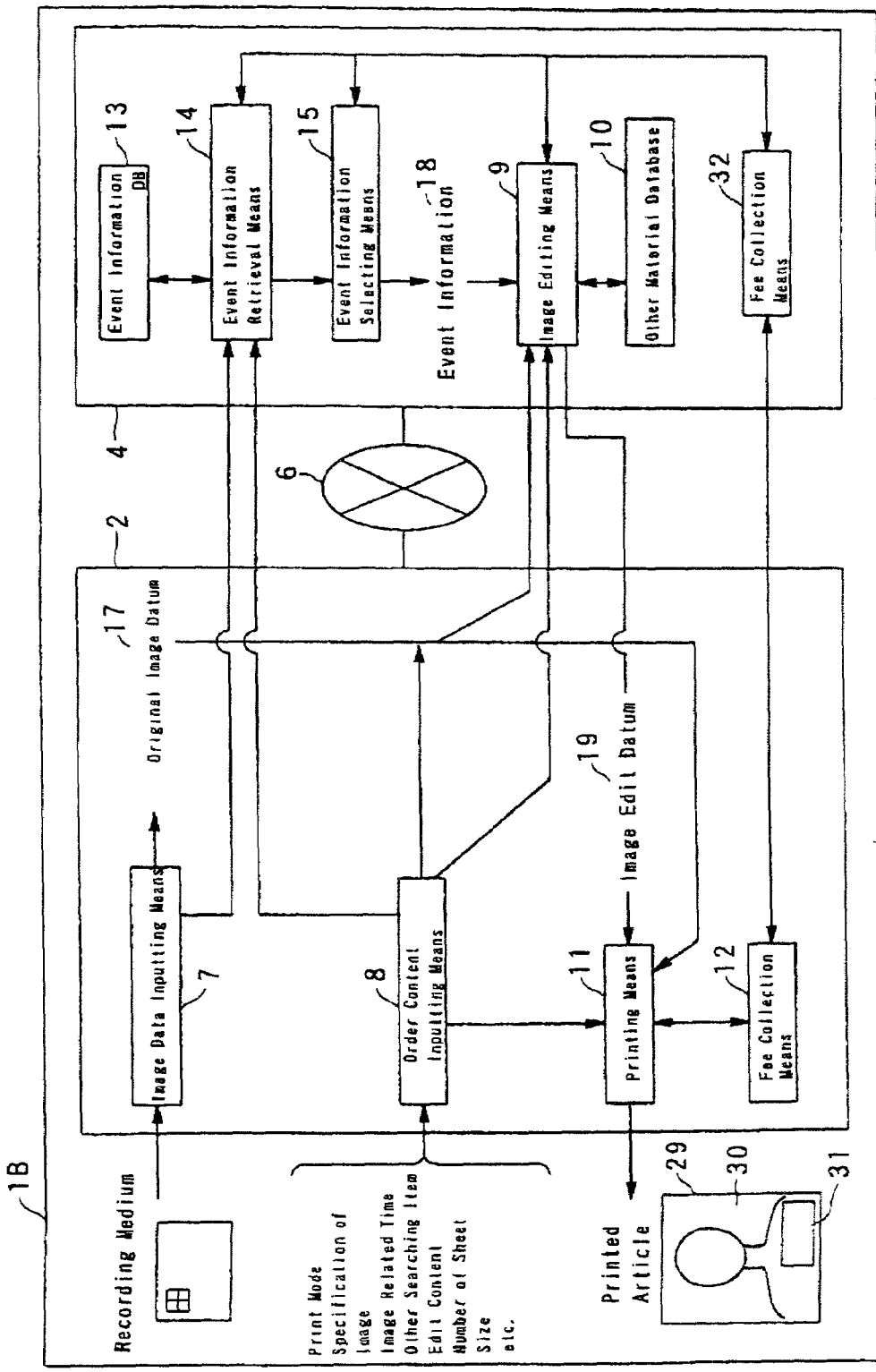
FIG. 2 is the diagram showing the outline of the image printing system according to the first aspect of this invention.

FIG. 2 shows another embodiment of the image printing system according to this invention (1B). In the image printing system 1B shown in FIG. 2, the terminal part 2 which can receive an order and can output a printed article, and the retrieval and editorial part 4 which can perform image edit which includes synthesis of an original image and events information, while can perform the retrieval and extraction of event information according to the demand from a terminal part, are connected through the line 6. The terminal part 2 is equipped with the image data inputting means 7, the order Inputting means 8, the printing means 11, and the fee collection means 12 in the image printing system 1B. On the other hand, the retrieval and editorial part 4 has the image editing means 9, the other material databases 10, the events information database 13, the event information retrieval means 14, the event information selecting means 15, and the fee collection means 32 of the retrieval and editorial part 4. In image printing system 1B, although the image editing means 9 and the other material database 10 are installed in the retrieval and editorial part 4 instead of the terminal part 2, the flow of the data between each means is the same as that of the above mentioned image printing system 1A.

In image printing system 1B shown in FIG. 2, since it is not necessary to give an advanced image edit function to the terminal part 2, the terminal part can be constituted by a personal image printing system built as an axis with a personal computer, on the other hand, the retrieval and editorial part 4 can be constructed by a event information synthesizing server managed commercially, and both can be connected by the Internet as a line 6. Moreover, although it is not shown in FIG. 2, the events information synthesizing server as a retrieval and editorial part 4 has a receiving means to receive the image data of the original image transmitted from the terminal part 2, and a transmitting means to transmit the image data of the image plus event information generated with the image editing means 9 to the terminal part 2.

Figure 3:
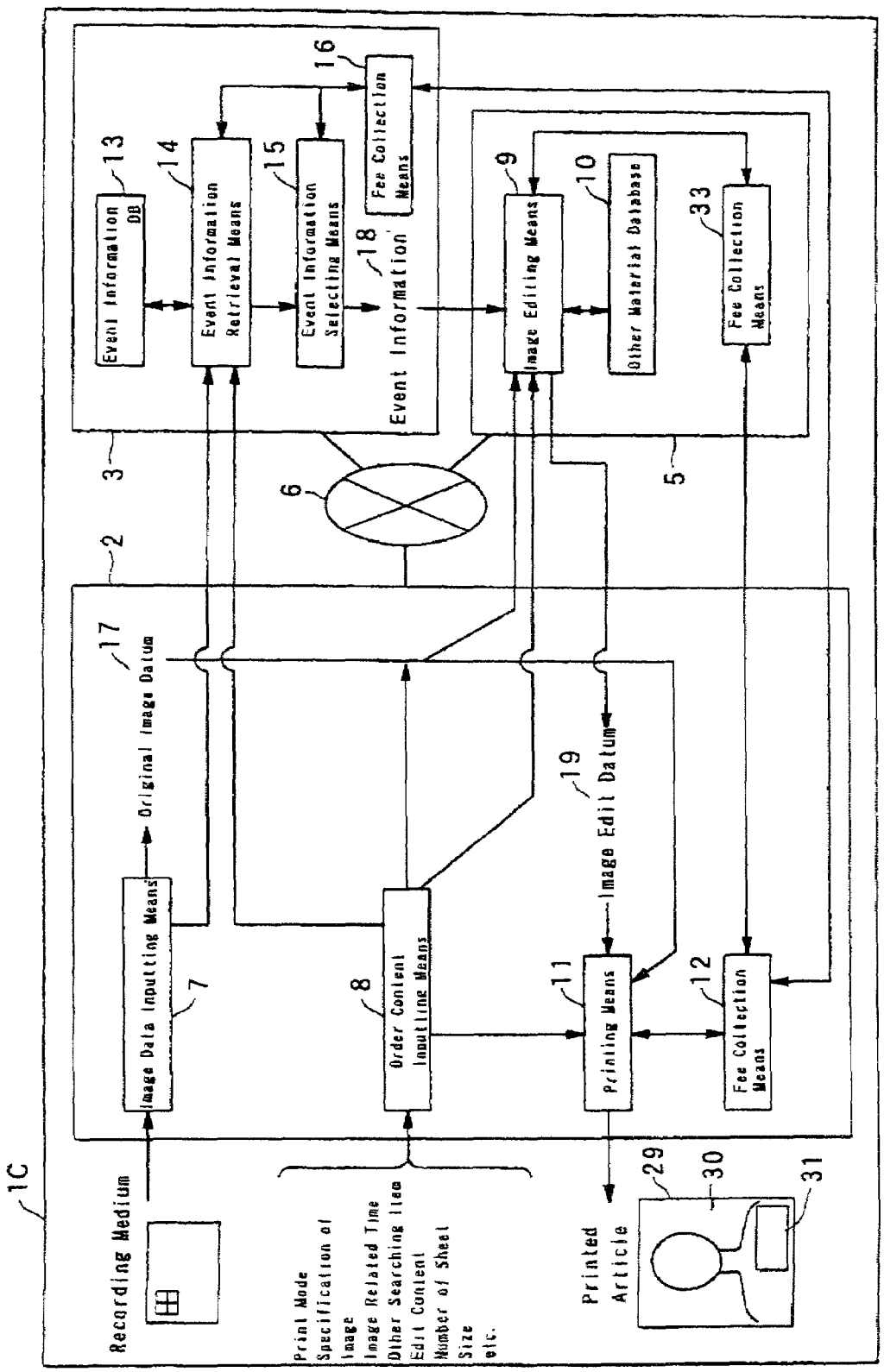
FIG. 3 is the diagram showing the outline of the image printing system according to the first aspect of this invention.

FIG. 3 shows still another embodiment of the image printing system according to this invention (1C). In the image printing system 1C shown in FIG. 3, a terminal part 2 which can output a printed article on an acceptance of order, an event information service means 3 which can search a event information and extract it according to the demand from the terminal part, and an editorial part 5 which can perform image edit including synthesis of an original image and events information according to the demand from the terminal part are connected to each other through the line 6. The terminal part 2 is equipped with the image data inputting means 7, the order inputting means 8, the printing means 11, and the fee collection means 12 in image printing system 1C The events information service means 3 is equipped with an events information database 13, an event information retrieval means 14, an event information selecting means 15, and a fee collection means 16 for the events information offer means 3. Furthermore, the editorial part 5 has an image editing means 9, an other material database 10, and a fee collection means 33 for the editorial department. In image printing system 1C, although the image editing means 9 and the other material database 10 are installed in the independent editorial part 5 instead of the terminal part 2, the flow of the data between each means is the same as that of the above mentioned image printing system 1A.

In image printing system 1C shown in FIG. 3, like the above mentioned image printing system 1B, since It Is not necessary to give an advanced image edit function to the terminal part 2, the terminal part can be constituted by a personal image printing system built as an axis with a personal computer, on the other hand, the event information service means 3 and the editorial part 5 each can be constructed by a server managed commercially and all of these can be connected by the Internet as a line 6. Moreover, although it is not shown in FIG. 3, the server as an editorial part 5 has a receiving means to receive the image data of the original image transmitted from the terminal part 2 and the event information transmitted from the event information service means 3, and a transmitting means to transmit the image data of the image plus event information generated with the image editing means 9 to the terminal part 2.

In addition, particularly when performing retrieval and image edit of event information using the external server via the Internet, a browsing software (the so-called browser) can realize a function required for those work.

Next, the construction of apparatus capable of carrying out this invention will be explained through an example of construction of apparatus capable of carrying out the image printing system 1A shown in FIG. 1.

Figure 5:
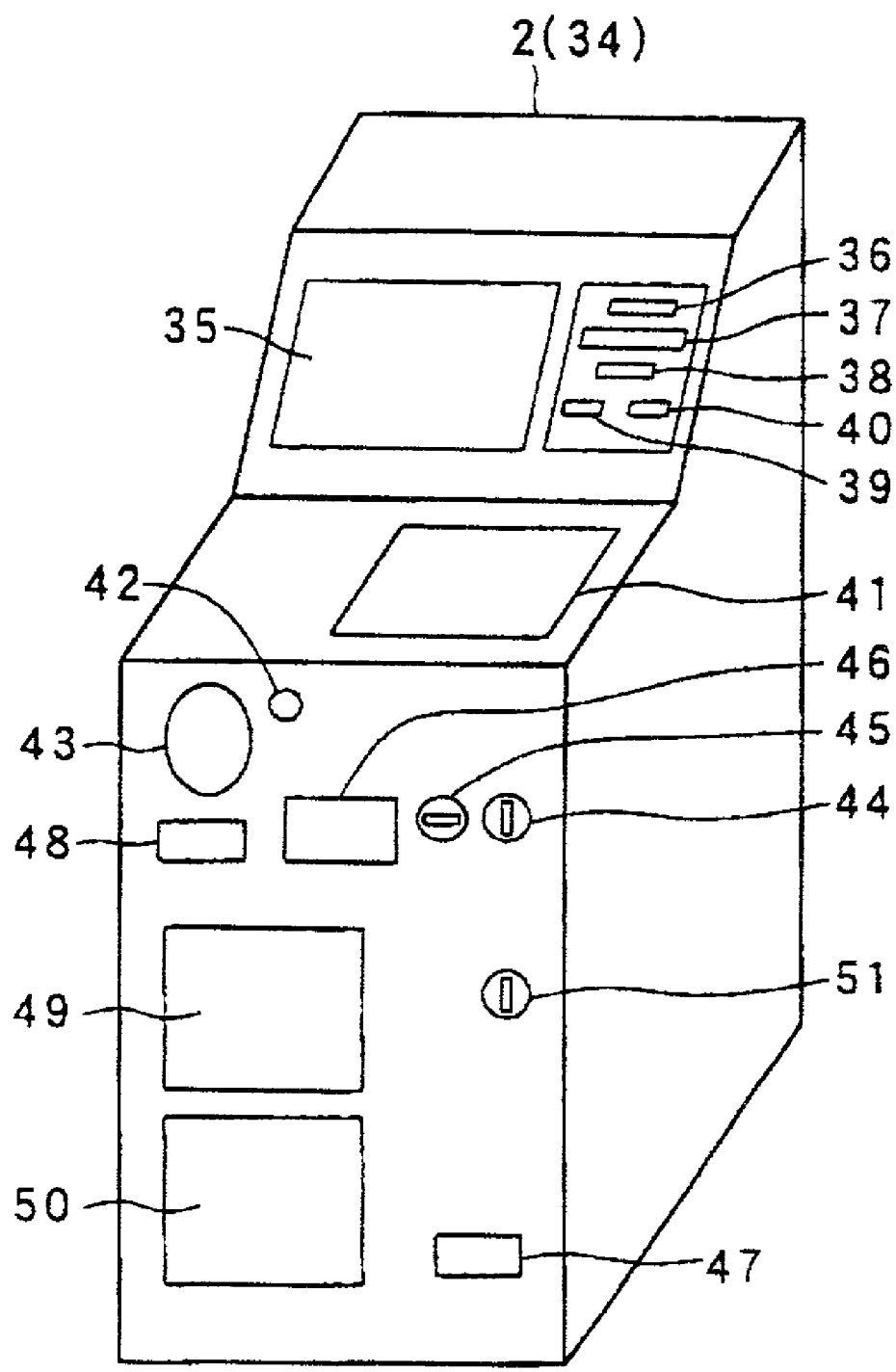
FIG. 5 is the perspective diagram showing an embodiment of the terminal part used for the image printing system according to the first aspect of this invention.

FIG. 5 shows the external appearance of the post type image outputting apparatus 34 used as the terminal part 2 of the image printing system 1A. In FIG. 5 a screen of a monitor 35 with a touch panel is disposed on the upper front surface of the post type image outputting apparatus 34. The monitor 35 with a touch panel may be a CRT or liquid crystal panel. The monitor 35 with a touch panel performs as a display device for displaying the operation guidance, the operation state, the read out image or the processed image or the like as well as a device for the inputting operation for inputting an order content including the search items of the event information or the like.

Insertion ports 36 to 40 for various recording media are provided sideways to the monitor 35 with a touch panel. A scanner reading surface 41 is provided on a horizontal part dividing the upper part and the lower part for reading the image of a printed article and processing the same to digital data. In this embodiment, these are a part of the image data inputting means. In this embodiment, as the insertion ports for the various recording media, specifically, a flexible disc insertion port 36, a CD-ROM insertion port 37, a PC card insertion port 38, a smart medium insertion port 39, and a compact flash insertion port 40 at a position on the whole. Moreover, the main bodies of each reading device are installed inside the housing of the post type image outputting apparatus 34 corresponding to the insertion port of each recording medium. A shutter (not shown) may be provided on each insertion port so that the recording medium cannot be taken out until collection of the fee is completed.

In the lower part of the post type image outputting apparatus 34, a maintenance key 42, a speaker 43, a coin insertion port 44, a coin return lever 45, a bill insertion port 46, a change return port 47, a receipt outlet port 48, a printed article (for standard printing) outlet port 49, a printed article (for pre-cut seal) outlet port 50, and a front door opening/closing key 51 are disposed. The maintenance key 42 is a key for switching an ordinary drive mode capable of accepting a customer, and an administration mode for setting the image printing system or maintenance by an administrator. The speaker 43 is for reproducing the sound, BGM, effect sound or the like while waiting or operation.

In this embodiment, the coin insertion port 44, the coin return lever 45, the bill insertion port 46, and the change return port 47 constitutes a part of the fee charging means. A customer would pay for the fee by inserting a coin in the coin insertion port 44 and/or inserting a bill in the bill insertion port 46 In case there is a change, it is discharged from the change return port 47 so that it is received by the customer. Moreover, In case a coin is choked, it is discharged from the change return port 47 by turning the coin return lever 45 so that it is received by the customer.

In this embodiment, the receipt outlet port 48 constitutes a part of the receipt producing means and the order receipt note producing means. After collecting the fee by the fee charging means, a receipt with the collected amount and the order content printed is discharged from the receipt outlet port 48.

In this embodiment, the printed article (for standard printing) outlet port 49 and the printed article (for pre-out seal) outlet port 50 constitute parts of the printing means. After the customer inputs the command for printing, by touching any button of the touch panel, or so, the customer may receive a printed article discharged from the printed article outlet port 49 or the printed article outlet port 50.

By turning the front door opening/closing key 51, the front door is opened so that the maintenance work for each device installed inside the housing can be executed. In the housing of the post type image outputting apparatus 34, each main body is installed corresponding to the screen of the monitor with a touch panel, the insertion port, and the scanner reading surface. A volume adjusting part is installed corresponding to the speaker 43. Corresponding to the coin insertion port 44, the coin return lever 45, the bill insertion port 46, and the change return port 47, a coin mech (coin processing device) for identifying the coins, storing, and returning the change, a bill bari (bill processing device) for identifying the bills, and storing, and a safe for storing the coins in case the coin mech is fill, are installed. Corresponding to the receipt outlet port 48, a receipt printer is installed. Furthermore, corresponding to the printed article outlet port 49, and the printed article outlet port 50, a printer is installed respectively.

Moreover, although it is not apparently recognized by the external appearance, inside the housing of the post type image outputting apparatus 34, a personal computer including a control unit for controlling each device in the image outputting apparatus 34, a power source box for converting the voltage, an interruptible power supply device for preventing breakage of the CPU, the hard disc or the like in the control unit at the time of blackout or the like are installed.

Figure 6:
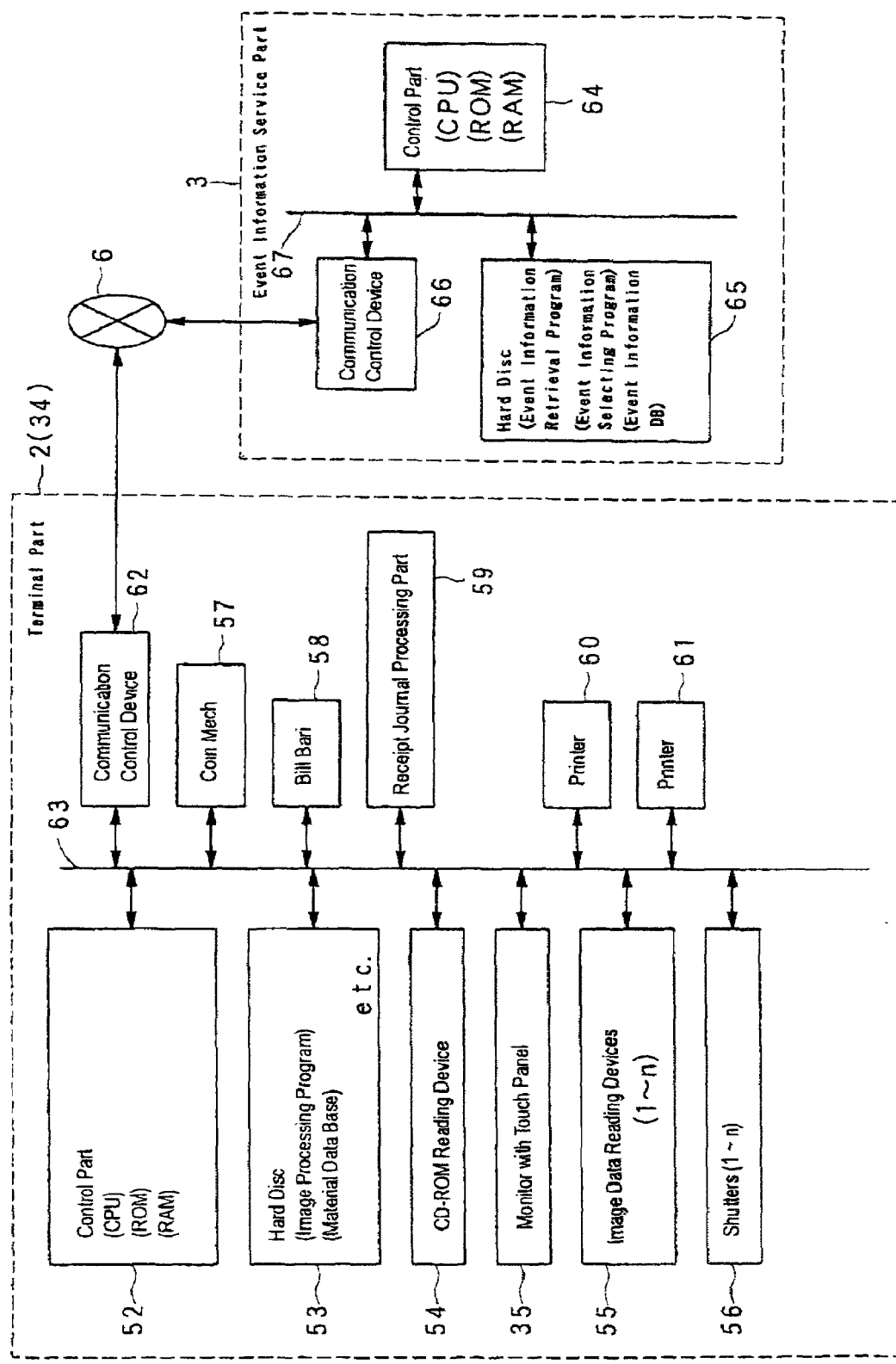
FIG. 6 is the block diagram showing an embodiment of the image printing system according to the first aspect of this invention.

FIG. 6 shows a block diagram of an image printing system 1A having the post type image outputting apparatus 34 shown in FIG. 5. In this embodiment, the post type image outputting apparatus 34 as the terminal part 2 comprises a control unit 52, a hard disc 53, a CD-ROM reading device 54, a monitor 35 with a touch panel, n sets of image data reading devices 55, n sets of shutters 56, a coin mech 57, a bill bari 58, a receipt journal processing part 59, two sets of printers 60, 61, and a communication control device 62, connected via a bus 63. The event information service part 3 is a events information distribution server which an entrepreneur other than that of the post type image outputting apparatus manages, and it comprises a control unit 64, a CD-ROM reading device 65, and a communication control device 66, connected via a bus 67. The post type image outputting apparatus 34 and event information service part 3 each are connected to the Internet as the line 6 via their respective communication control device 62 and 67.

The control unit 52 of the terminal part 2 (post type image outputting apparatus 34) comprises a CPU, a ROM, and a RAM for controlling the drive of the devices connected via the bus according to a program stored in the hard disc 53 as a large scale memory medium. In the hard disc 53, programs for controlling the drive of the devices, such as a reading program corresponding to each recording medium, an opening/closing control program for the shutters, a fee charging program or the like, as well as an image processing program for processing an input image, a material data base storing information of frames to be used for the image synthesis, or the like, are stored so as to be read out as needed and stored in the RAM for driving various devices. The CD-ROM reading device 54 Is used for upgrading the version of programs or any information stored in the ROM or the hard disc of the terminal part 2 such that a CD-ROM for upgrading the version is Inserted in the CD-ROM reading device 54 for rewriting the data with the terminal part switched to the administration mode by the maintenance key.

In FIG. 6, by selecting and executing the touch panel buttons displayed on the monitor 35 with a touch panel according to the operation guidance displayed on the monitor 35 with a touch panel of the terminal part 2, a series of the operation for reading the image data to the output of a printed article can be executed. In this embodiment, first, the menu of the printed article is selected according to the operation guidance displayed on the monitor 35 with a touch panel, and in case the touch panel button is pressed, an operation screen for guiding the input of the image data is shown on the monitor 35 with a touch panel.

The image data reading devices 55 include various reading devices 1 to n corresponding to various kinds of recording media so that the customer can input photography image data recorded in a recording medium the customer has into the terminal part 2 using the corresponding reading device. The image data reading devices 55 also include a scanner so that an Image can be read out from a printed article, processed to be digital data, and inputted into the terminal part 2. In case the image data reading devices 55 are not dedicated for reading but also they can record image data in a recording medium, the customer can store the image data of the edited image produced by operating the terminal part 2 and take it home with the customer. The shutters 56 are provided at the recording medium Insertion ports of the reading devices 1 to n so that the taking out operation of the recording medium can be prohibited during the reading process, or until the fee charging process is completed by port or closing the recording medium insertion port.

When the images provided by the customer are inputted as digital data using the image data reading devices 55 according to the operation guidance on the monitor 35 with a touch panel, the inputted original image is shown on the monitor 35 so that an image to be printed can be selected according to the operation guidance of the monitor 35 with a touch panel. At the time, it is convenience to show the all images as a thumb nail image or the like, and select an image by the touch panel method.

When an original image is selected, an image processing program is executed according to a printing menu already selected. The customer can process the image, such as reduction, enlargement, rotation, deformation, synthesis with another image or the like according to the operation guidance on the monitor 35 with a touch panel. At the time, image materials stored in the material data base, such as picture frames can be utilized as well.

When the menu of adding events information to an original image is chosen from a print menu or an edit menu, the terminal part 2 accesses the events information service part 3 after selection of an original image. The control part 64 of the events information service part 3 (events information distribution server) comprises a CPU, a ROM, and RAM, accepts the demand of the terminal part 2, and it searches, extracts and selects the event information from the event information database in a hard disk according to the demand from the terminal part 2, and distributes the data of event information to the terminal part 2. The event information database, the event information retrieval program, the event information selection program, the fee collection program, etc. are stored in the hard disk 65, so as to be read out as needed and stored in the RAM for executing the retrieval program, the event information selection program, the fee collection program, etc.

The event information service part 3 when accessed from the terminal part 2, first, a retrieval program will be started, and it requires to the terminal part 2 to input a datum for the event occurrence time and optionally data for other retrieval conditions corresponding to other retrieval items. The customer can input such retrieval conditions relevant to an original image, such as time and a genre, into the events information service part 32 according to the guidance screen displayed in the monitor 35 with touch panel of the terminal part 2. As an input method of retrieval conditions, first, the photographed day appended to the original image is displayed to a guidance screen of the monitor 35 with touch panel, for example, so as to ask the customer to confirm the displayed photographed day is correct as image related time. The customer can input another time as retrieval condition for the generating time of event information when the displayed photographed day is wrong or when he wishes to use a time other than the photographed day as the image related time. After the input of image related time is completed, next, the categories which can search the events information are displayed on the monitor 35 with touch panel 35 as a guidance screen. Each genre, such as an entertainments field and a political economy field, can be included in the guidance screen, and the item of a non genre can also be prepared in it.

CPU of the event information service part 3 searches through a event information database according to the input retrieval conditions, and extracts the event information with which it is the event generated at the time near the time relevant to an original image, and other retrieval conditions, such as a specification genre, are filled. Since the extracted event information is displayed on the monitor 35 of the terminal part 2, the customer can check the retrieval result. When there are much hit number of cases of retrieval, the event information selection program is started, all or a part of hit event information are displayed on the monitor 35 of the terminal part 2 according to a predetermined priority, and the event information service part 3 makes the customer choose any favorite event information. Thus, the event information which is searched and extracted and optionally selected is transmitted to the terminal part 2.

In the event information service part 3, the fee collection program is performed in parallel with the retrieval program or the event information selection program, during a period of from the time when the service part 3 is accessed from the terminal part 2 to the time when the service part 3 transmits the event information to the terminal part 2, in order to summarize the total of fee for access to the events information service part 3, fee for retrieval, and fee for use of the event information, and then to transmit the result of total fee to the terminal part 2 along with the event information data.

The terminal part 2 will synthesize an original image and events information according to the image processing program stored in the hard disk, when it receives the data of event information. Further, when the customer directs any edit direction other than the synthesizing with the event information, for example, synthesizing with a frame, expansion or reduction, movement, etc. such processing for the image is performed according to those directions.

After completion of the edit of the image, according to the operation guidance on the monitor 35 with touch panel, the order content other than the printing menu and the process content, such as the number of prints, the print size or the like, is inputted. Also at this time, the order content can be input by pressing a button or ten keys displayed on the touch panel. In case a printing menu not requiring the edit of the original image is selected at the time of the start, the operation screen for guiding the edit operation is eliminated so that the operation guidance for guiding the other order content is displayed immediately.

After all the order content is inputted, on monitor 35 with the touch panel, the screen for the charged fee is displayed together with the order content and the fee payment is requested. The charge of access to the event information service part, the charge of retrieval, and the rental fee of event information may be contained in the claim items of payment. When a coin is inserted and/or a bill is inserted to the main body 1 according to the payment request, the coin mech 57 and/or the bill bari 58 are driven so as to execute the fee charging process such as judgment of genuineness of the coin or bill inserted to the terminal part 2 for the fee payment, the judgment of the kind thereof, the amount calculation, the discharge of the change or the like. After finishing the fee charging process, the receipt journal part 59 prints the printing menu, the collected fee amount or the like on a receipt paper and discharges the receipt. The system can be set so as to eliminate the drive of the fee charging means in case request of the fee payment is not needed.

After the discharge of the receipt, the shutter is opened so as to enable taking out of the inserted recording medium so that the operation screen for guiding the take-out of the recording medium is displayed on the monitor 35. When the recording medium is taken out, a printed article is output by the printer 60 or 61. The printer 60 can output a standard size printed article with a standard image quality, and the printer 61 can output a pre-cut seal printed article.

Next, the motion of the image printing system of the present invention will be explained with reference to a flow chart and the indication on the monitor with a touch panel, as the image printing system 1A shown in FIG. 1.

Figure 8:
FIG. 8 is a start screen in an embodiment of the image printing system according to this invention.
Figure 9:
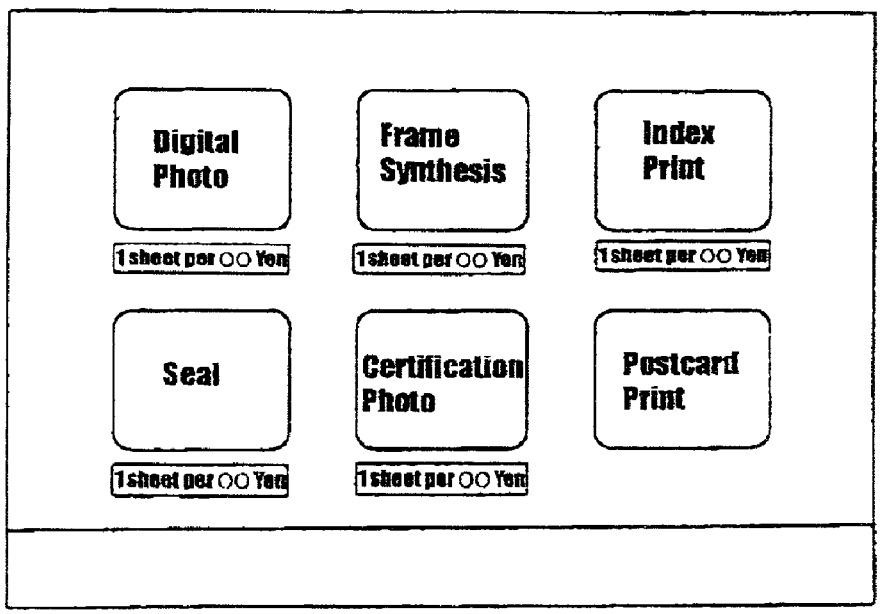
FIG. 9 is a main menu screen in an embodiment of the image printing system according to the first aspect of this invention.

In the embodiment of the image printing system 1A according to the present Invention, a start screen as shown in FIG. 8 is displayed on the screen of the monitor 35 with a touch panel in the terminal part 2. In case an optional position of the start screen is touched by a hand, a main menu screen as shown in FIG. 9 is indicated. In case the main menu screen is left for a predetermined time, it returns to the start screen. In the main menu screen, the kinds of the printed articles to be selected are shown. Specifically, touch panel buttons for the "digital photo", the "photo edit", the "index print", the "seal", the "certification photograph", and the "postcard print" are shown in the upper and lower two rows. In the main menu screen, if "photo edit" is chosen, the printed article of the image plus event information can be created.

In case the "digital photons" is selected in the main menu screen and the touch panel button thereof is touched, a print out can be provided by reading the image data from a smart medium, a PC card, a compact flash card, a CD-ROM, or a flexible disc (FD), or reading the image data from a printed article such as a photograph using a scanner.

In case the "photo edit" is selected, a print out can be provided by reading the image data from a smart medium, a PC card, a compact flash card, a CD-ROM, or a flexible disc (FD), or reading the image data from a printed article such as a photograph using a scanner, and synthesizing the read out image with a frame or an event information, and further processing such as expansion or reduction of image, etc.

In case the "index print" is selected, an index print with a thumb nail image displayed can be printed out by reading the image data from a smart medium, a PC card, a compact flash card, a CD-ROM, or a flexible disc (FD).

In case the "seal" is selected, a pre-cut seal can be printed out by reading the image data from a smart medium, a PC card, a compact flash card, a CD-ROM, or a flexible disc (FD), or reading the image data from a printed article such as a photograph using a scanner, and synthesizing the read out image and a frame prepared by the system side. In the pre-cut seal, a plurality of small screens (frames) of the same image are printed, with each small screen divided by half cut.

In case the "certification photograph" is selected, an image for the certification photograph is taken by a digital camera in the shop so as to be stored in a flexible disc, and then, the stored image data are read out by the main body so that they can be printed out after selecting the size from the driver's license size, the curriculum vitae size, the passport size, and the visa size, and selecting color or monochrome.

In case the "post card print" is selected, a print can be provided by reading the image data from a smart medium, a CF card, a flexible disc (FD), a PC card, or a CD-ROM, or reading the image data from a printed article such as a photograph using a scanner, producing the postcard data by processing the read out image, and reading the postcard data from the recording medium storing the same.

As described above, since the printed article of the image plus event information can be created and printed only when "photo edit" is chosen, hereinafter, only the procedure of "photograph edit" will be explained.

Figure 7:
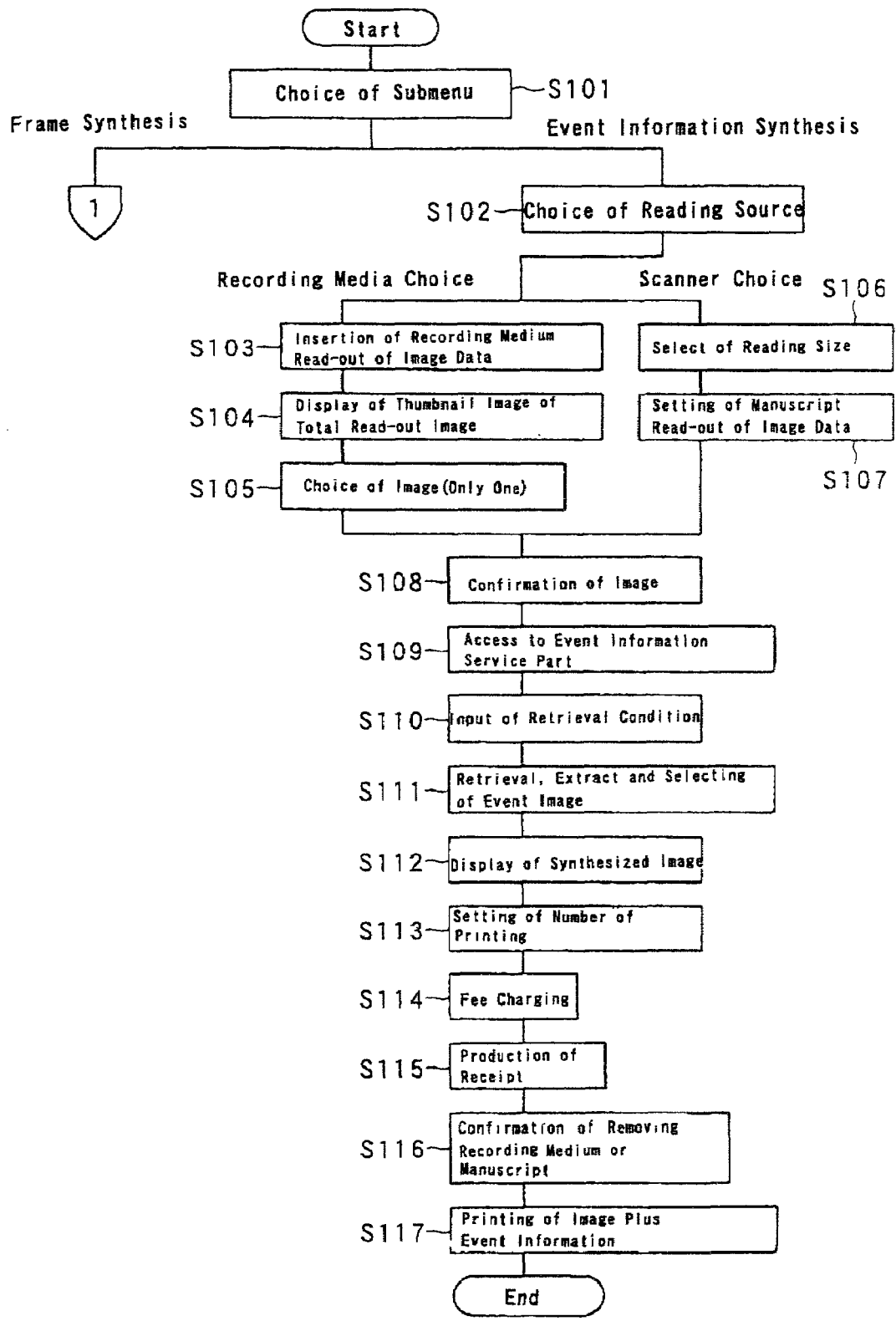
FIG. 7 is the flow chart which shows the procedure which synthesizes events information in an original image in an embodiment of the image printing system according to the first aspect of this invention, it.

In the main menu screen, if the "photo edit" position is touched by a hand, the "photo edit" procedure shown in FIG. 7 is started. In each operation screen to be indicated after the start of the "photo edit" procedure, in principle, a "cancel" button and a "return to the previous screen" button are provided so that it can return to the start screen by pressing the "cancel" button, and it can return to the operation screen of the previous step by pressing the "return to the previous screen" button so as to enable change of the operation.

Figure 10:
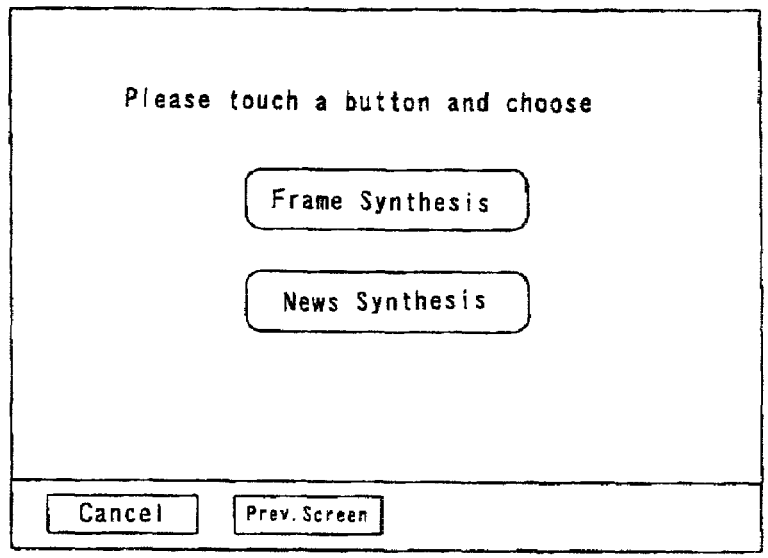
FIG. 10 is the sub menu screen of photograph edit in an embodiment of the image printing system according to the first aspect of this invention.

In case the "photo edit" procedure is started, as shown in FIG. 10, the guidance screen which displays a sub menu appears, and "frame synthesis" or "news synthesis" can be chosen (S101). In the guidance screen at this time, the message of "please touch a button and choose" is laterally written in the uppermost row. and therebelow, the button of "frame synthesis" and the button of "news synthesis" are arranged as above and below, and in the lowermost row, the "Cancel" button and the "return to the previous screen" button are provided.

In the procedure of "frame synthesis", the datum of original image, such as a photograph, is read from a recording media or a printed article, and it can synthesize with the frame image currently prepared for the system side, and then the synthesized image can print out. On the other hand, in the procedure of "news synthesis", the original image can be synthesized with a event information. That is, while reading the data of original image, such as a photograph, from a recording media or a printed article, the event information which shows event such as a famous occurrence is obtained by accessing the event information service part 3 from the terminal part 2, and searching any event generated at the time near the photographed day of an original image and extracting it, in order to synthesize the original image with the events information.

Figure 38:
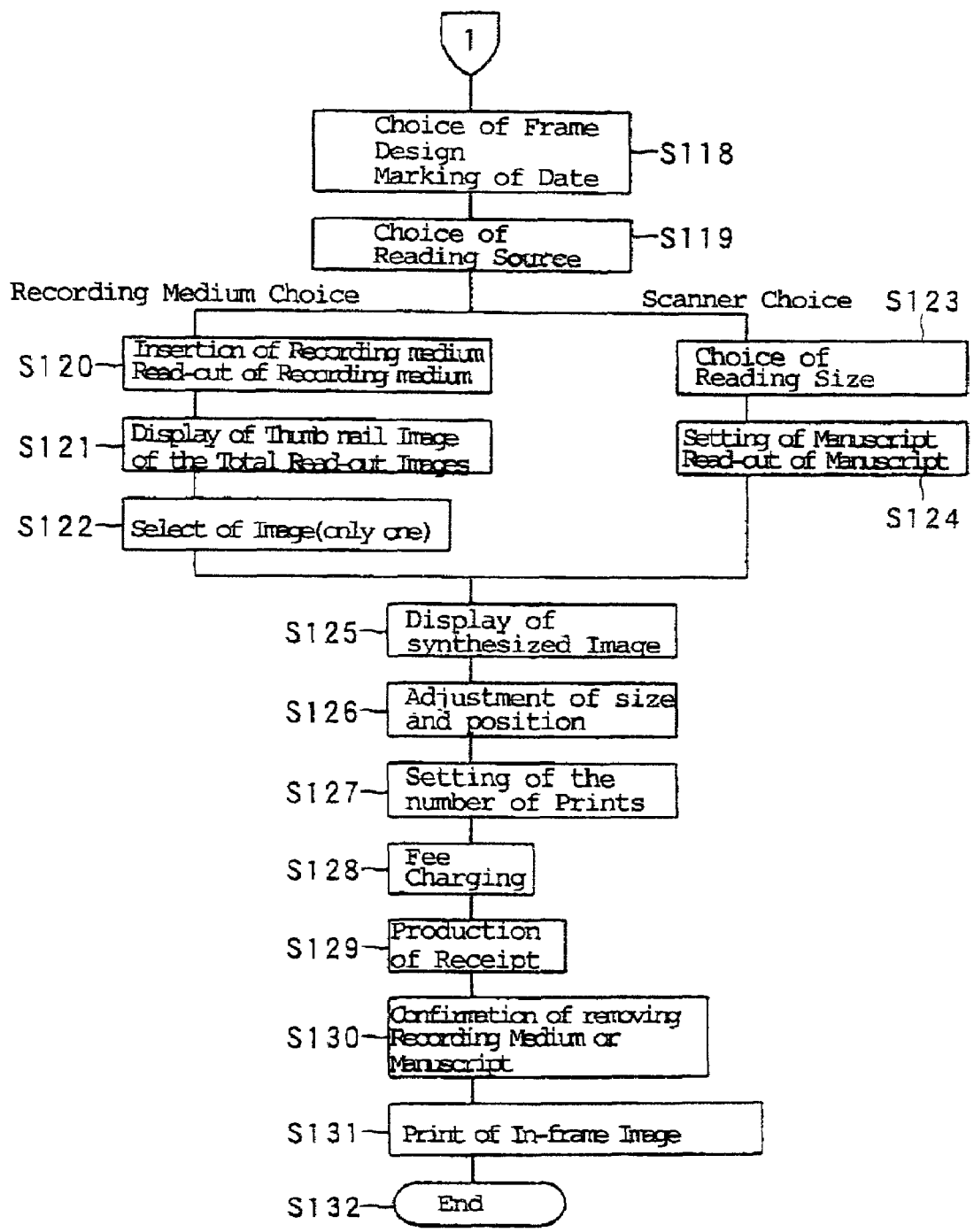
FIG. 38 is the flow chart which shows the procedure which synthesizes a frame with an original image in an embodiment of the image printing system according to the first aspect of this invention.
Figure 39:
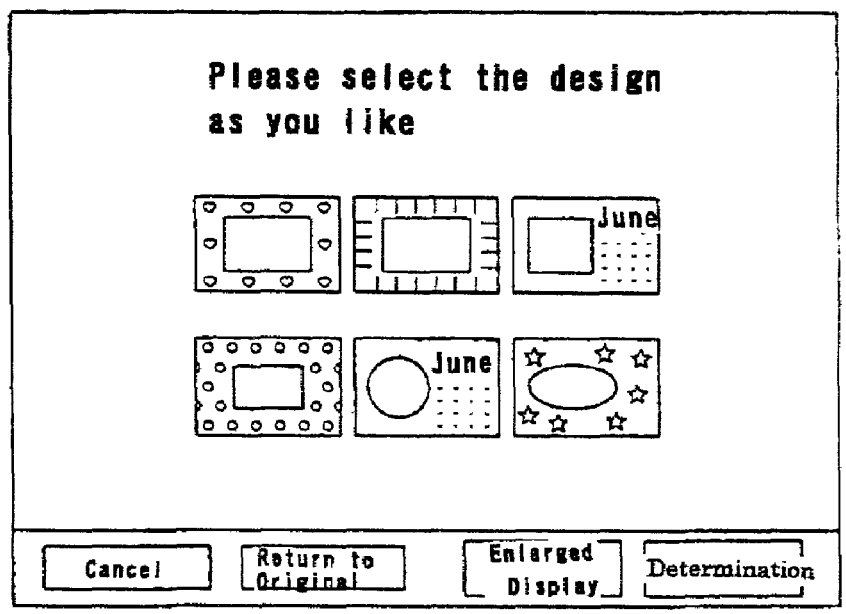
FIG. 39 is the thumb nail image display screen of frames used in the frame synthesis in an embodiment of the image printing system according to the first aspect of this invention.

In the guidance screen of sub menu shown in FIG. 10, if the "frame synthesis" is selected (S101), the procedure shown in FIG. 38 is started. In case the "frame synthesis" procedure is started, as shown in FIG. 39, an operation screen with the picture frames shown is indicated so that a frame can be selected (S118). In the operation screen at the time, the message "please select the frame design as you like" is shown laterally in the uppermost row, and below the message, frame designs are shown. In the lowermost row, the "cancel" button, the "return to the previous screen" button, the "enlarged display" button, and the "determination" button are provided. The frame designs are provided from the material data base stored in the hard disc of the terminal part so as to be indicated on the screen.

Figure 40:
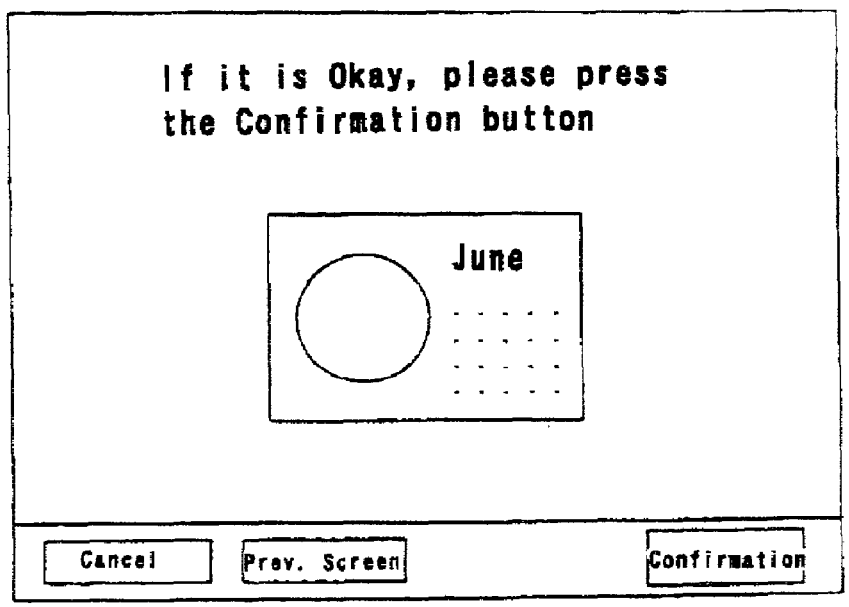
FIG. 40 is the expansion display screen of the selected frame.

In case the enlarged display button is touched after touching one of a frame displayed on the screen, as shown in FIG. 40, the enlarged image of the selected frame is shown. In the operation screen at the time, the message "if it is okay, please press the confirmation button" is shown laterally in the uppermost row, and below the message, the enlarged frame design is shown. In the lowermost row, the "confirmation button" is provided together with the "cancel" button, and the "return to the previous screen" button. In case the customer does not like the enlarged frame, by touching the return to the previous screen button, the screen with the frames listed can be shown so that another frame can be selected.

In case the determination button is touched immediately after selecting the frame in the screen of FIG. 39, or in case the confirmation button is touched after indicating the enlarged image in the screen of FIG. 40, the frame to be used is set.

Figure 13:
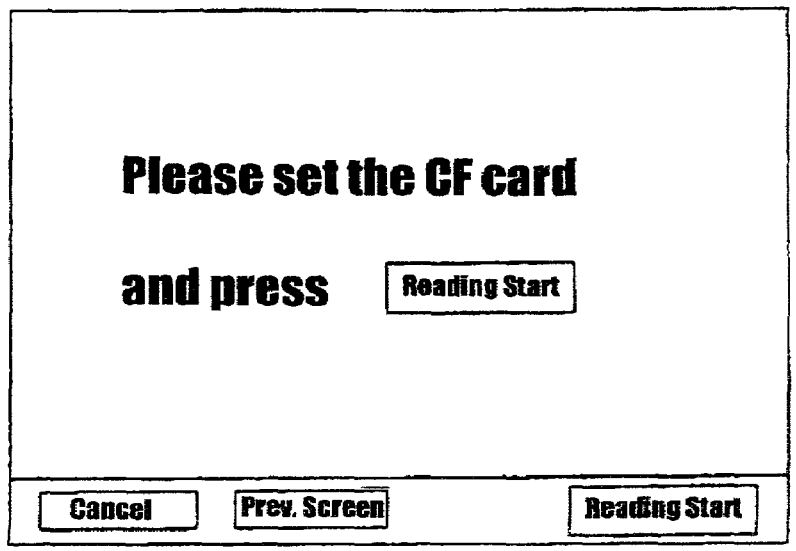
FIG. 13 is the guidance screen of the compact flash card insertion method in an embodiment of the image printing system according to the first aspect of this invention.

In case the frame is set, as shown in FIG. 13, the operation screen for selecting the reading source appears (S102). In the operation screen, in case a touch panel button is touched by a hand, the corresponding reading source is selected.

Figures 41, 42:
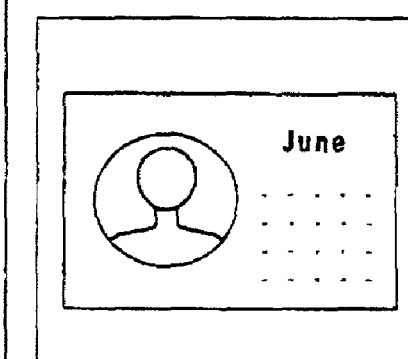
FIG. 41 is the guidance screen which carries out marking to the date of a calendar frame.
FIG. 42 is the guidance screen which adjusts the synthesized image in the frame synthesis.

As shown in FIG. 40, when the frame of a calendar is chosen, a guidance screen as shown in FIG. 41 appears after decision of the frame. In the guidance screen at this time, the message of "please touch in order of date mark" is laterally written in the uppermost row, and therebelow, an expansion indication of the date column of a calendar is given at one side of the screen, the icons of marks to other one side are enumerated, and "cancel" button, the "redo" button, and "determination" button are prepared in the lowermost row.

The customer can give a favorite mark to the position of a specific date by touching on a favorite mark, after touching the position of the specific date. The customer can display the icon (mark) of a birthday cake on the date of his birthday, and can create the calendar which added addition information about the specific date When selection of a date or a mark is mistaken, marking can be redone by touching the redo button. After giving a mark to the date, the marking of the date is completed by touching a determination button.

If the indication of the date on a calendar and the indication of the icon are piled up, visibility and design nature may become bad. Then, in the portion with which the indications of the date and the icon overlap, it is desirable by displaying in white one of indications, or performing image processing of bordering with white, black, or other arbitrary colors to make both indications look clear.

When the customer does not want to do marking of the date, the marking of the date can be omitted by touching a determination button, without performing selection of the date or a mark in the guidance screen of FIG. 41. Moreover, it is possible to set up the option which prints independently the calendar which is chosen and optionally attached the date as it is, without synthesizing with an original image.

Figure 11:
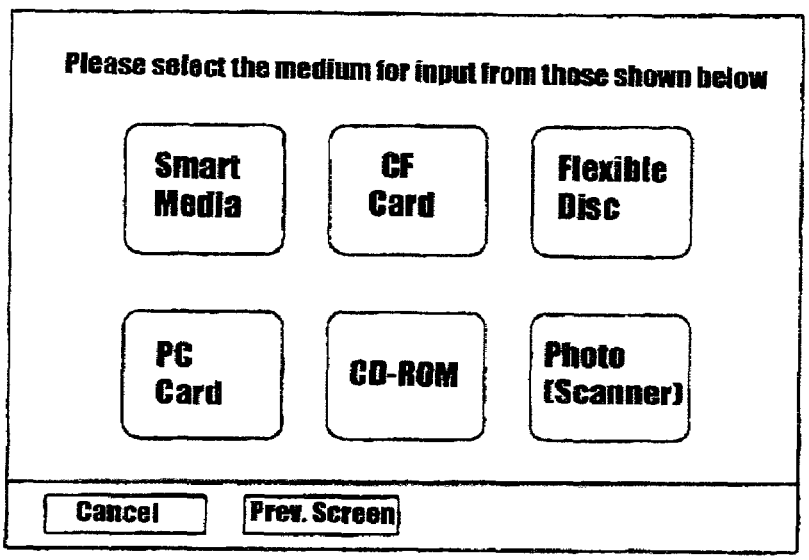
FIG. 11 is the guidance screen which chooses image data's reading source in an embodiment of the image printing system according to the first aspect of this invention.

After completion of the frame choice by the above operation, and particularly in case of the calendar frame, the completion of the optional marking of the date, the guidance screen which enumerates various reading sources for image datum is displayed as shown in FIG. 11, so that a reading source can be selected (S119). In the operation screen at the time, the message "please select the medium for input from those shown below" is shown laterally in the uppermost row, and therebelow, the touch panel buttons each with the name of the smart medium, the compact flash card (CF card), the flexible disc, the PC card, the CD-ROM, and the photograph (scanner) are shown. In the operation screen, in case a touch panel button is touched by a hand, the corresponding reading source is selected.

If any of the reading sources is selected from the smart medium, the CF card, the flexible disc, the PC card, and the CD-ROM, the operation screen showing the inserting method corresponding to the selected recording medium is indicated so that the recording medium can be inserted.

Figure 12:
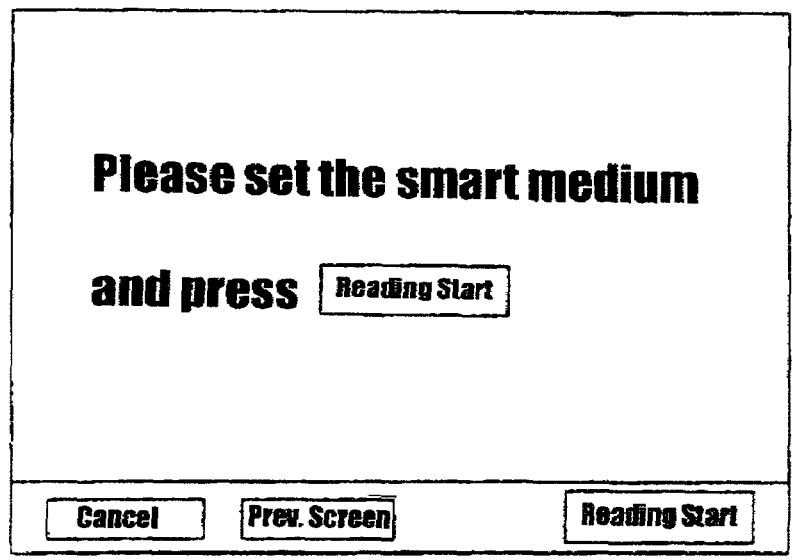
FIG. 12 is the guidance screen of the smart media insertion method in an embodiment of the image printing system according to the first aspect of this invention.
Figure 14:
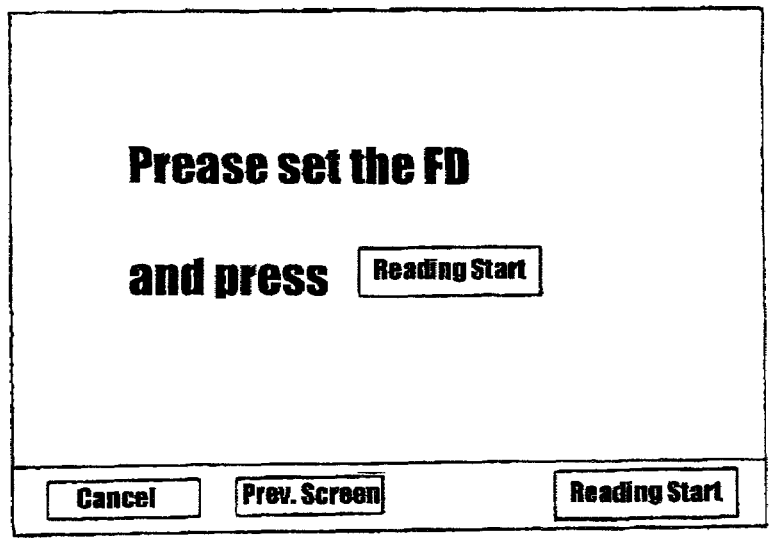
FIG. 14 is the guidance screen of the floppy disk insertion method in an embodiment of the image printing system according to the first aspect of this invention.

In the operation screen in case the smart medium is selected, as shown in FIG. 12, the message "please set the smart medium and press the reading start" is shown laterally in the uppermost row, and a "reading start" button is provided in the lowermost row together with the "cancel" button and the "return to the previous screen" button. Similarly, in case the CF card is selected, the operation screen shown in FIG. 13 appears. In case the flexible disc is selected, the operation screen shown in FIG. 14 appears. In case the PC card is selected, the operation screen shown in FIG. 15 appears. And in case the CD-ROM is selected, the operation screen shown in FIG. 16 appears.

In case a recording medium is inserted in the predetermined insertion port according to the guidance of the operation screen and the reading start button on the touch panel is touched by a hand, the insertion port with the recording medium inserted is closed by the shutter so as to start the reading operation of the image data (S120).

Figure 17:
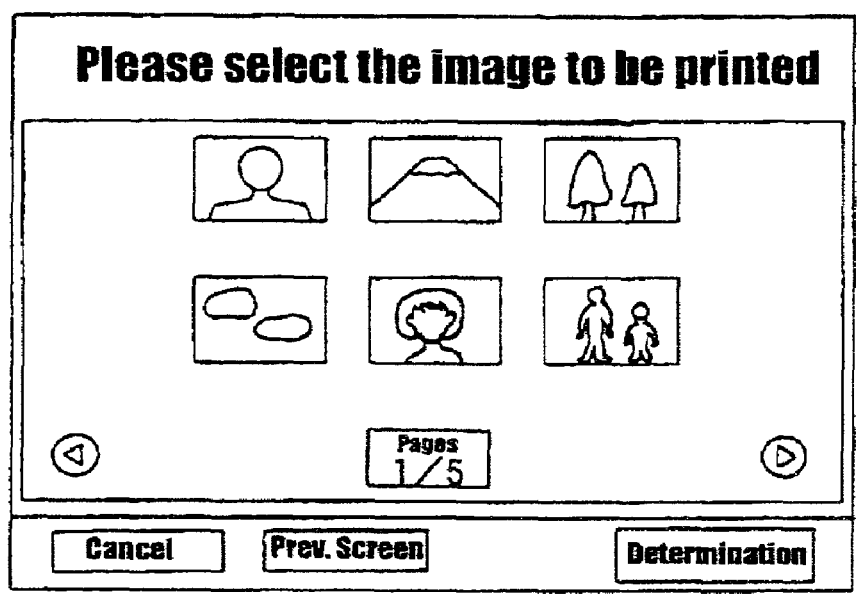
FIG. 17 is the thumb nail image display screen which enumerates the images read for photograph edit in an embodiment of the image printing system according to the first aspect of this invention.

As shown in FIG. 17, the operation screen with the thumb nail images of the total read out images shown appears (S121) after the reading operation is completed. In the operation screen at the time, the message "please select the image to be printed, and input the number of prints" is shown laterally in the uppermost row, and therebelow, total 6 thumb nail Images are shown in the two rows laterally, with the column for inputting the number of prints provided to each thumb nail image.

In case the number of the thumb nail images so large than they cannot be shown on one screen, all the thumb nail images are shown, divided in a plurality of pages. The page number currently appearing on the screen and triangular scroll buttons for moving forward or backward among the pages are displayed on the screen in the same row as the buttons for increasing or reducing the number of prints. Moreover, in the lowermost row of the operation screen at the time, a "determination" button is provided together with the "cancel" button and the "return to the previous stage" button. By selecting the images to be printed in the operation screen, and pressing the determination button, the image to be edited is specified (S122).

Figure 18:
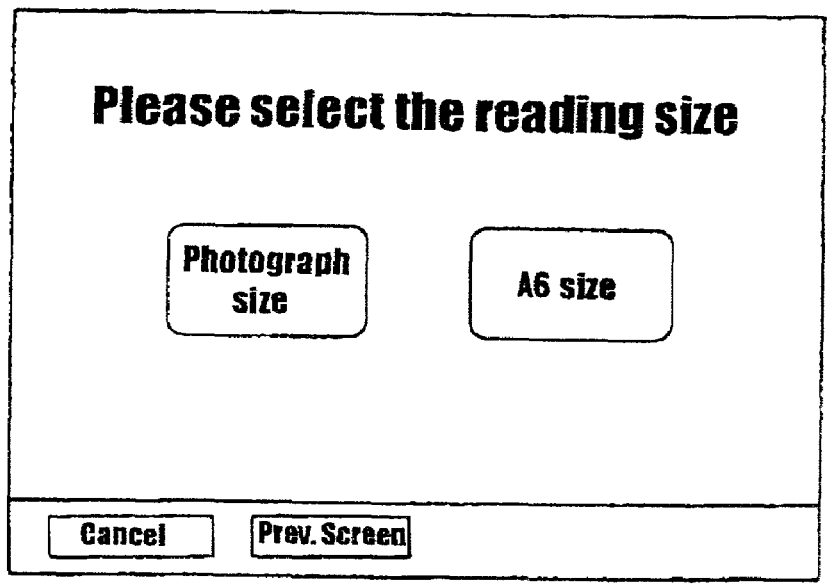
FIG. 18 is the guidance screen which chooses the reading size of a scanner in an embodiment of the image printing system according to the first aspect of this invention.

In the "photo edit" procedure, it is also possible to select the "photograph (scanner)" as the reading source so that the image data are read out from a printed article such as a photograph using a scanner (S123 to S124). In the operation screen shown in FIG. 11, in case the "photograph (scanner)" is selected as the reading source, as shown in FIG. 18, the operation screen for selecting the reading size appears (S123). In the operation screen at the time, the message "please select the reading size" is shown laterally in the uppermost row, and therebelow a button for selecting the photograph size and a button for selecting the A5 size are provided. In case the photograph size is selected, a manuscript of a size within the ordinary photograph size of vertically 89 mm×laterally 127 mm can be read. In case the A5 size is selected, a manuscript of a size over the ordinary photograph size up to vertically 148.5 mm×laterally 210 mm can be read.

Figure 19:
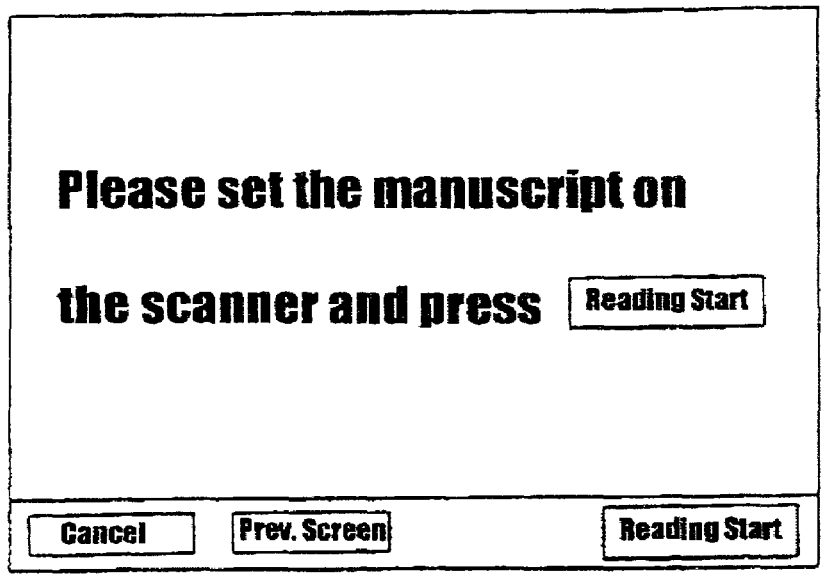
FIG. 19 is the guidance screen to which it shows the manuscript set method of a scanner in an embodiment of the image printing system according to the first aspect of this invention.

In case the button for the photograph size or A5 size is touched, the corresponding reading size is selected so that the operation screen for reading the manuscript by a scanner appears as shown in FIG. 19. In the operation screen at the time, the message "please set the manuscript on the scanner and press the reading start" is shown laterally in the uppermost row, and the "reading start" button is provided in the lowermost row together with the "cancel" button and the "return to the previous screen" button.

In case the manuscript is set on the scanner and the reading start button is touched according to the operation screen shown in FIG. 19, the manuscript is scanned and read so as to obtain the image data (S124).

When the original image to be edited is specified by the procedure S122 or S124, as shown in FIG. 42, a guide screen is appeared with displaying the image which is synthesized from the selected original image and frame (S125) so as to be able to adjust the synthesized image (S126). In the guide screen at the time, the message "please adjust the position and the size of the photograph so as to fit the design" is shown laterally in the uppermost row, and below the message on the half side, the synthesized image is displayed, and on the other half side, operation panels for the enlargement/reduction, and the movement are disposed in two rows vertically. In the lowermost row, the "cancel" button, the "return to the previous screen" button, the "return to the original" button, and the "confirmation" button are provided.

In the enlargement/reduction panel, a scale-up button and a scale-down button are provided so that the size of the read out image can be changed by touching these buttons. In the movement panel, movement buttons for upward, downward, leftward and rightward are provided so that the position of the image can be adjusted by touching these buttons. In case the return to the original button is pressed, it returns to the original image size and the position. In case the confirmation button is touched after finishing the image adjustment, the image adjustment is completed.

Figure 27:
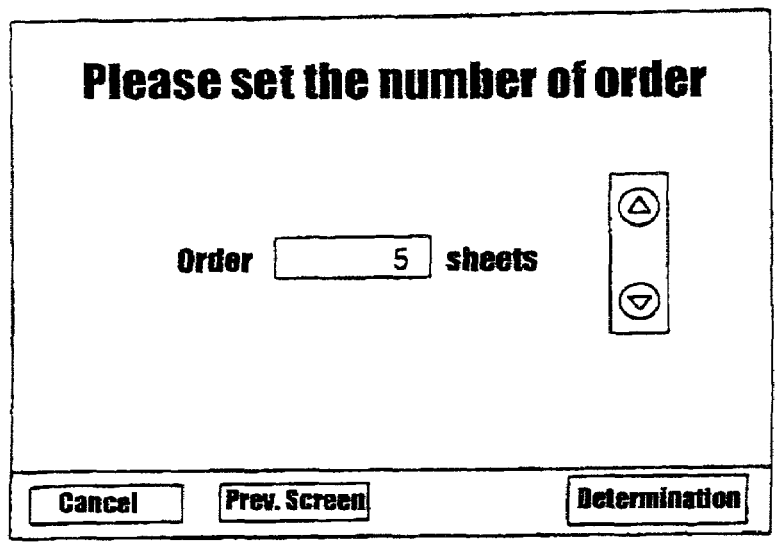
FIG. 27 is the guidance screen which sets up print number of sheets when synthesizing the image plus event information.

In case the image adjustment is completed, as shown In FIG. 27, the operation screen for setting the number of prints for the image appears (S127). In the operation screen at the time, the message "please set the number of order" is shown laterally in the uppermost row, and below the message, a column for inputting the number of order and input buttons for increasing or reducing the number of order are provided. In the lowermost row, the "cancel" button, the "return to the previous screen" button, and the "determination" button are provided. The input buttons include a number increase button of an upward triangle, and a number reduction button of a downward triangle. By touching these, the number of order can be increased or reduced. By touching the determination button after finishing the input operation, the order content including the number of order can be set.

When the order content is set, as shown in FIG. 43, the guidance screen for charging the fee appears for executing the fee charging process (S128). In the guidance screen for the fee charging process, the message "please insert money" is shown laterally In the uppermost row, and therebelow, the number of order, the fee for one sheet (unit price), the total amount (sum of the charged amount), and the inserted fee (inserted amount) are shown laterally from above successively in four rows. When the amount inserted in the coin insertion port and/or the bill insertion port according to the explanation on the guidance screen reaches or exceeds the total charged amount, in case it is a mode for only confirming the total amount, the change is discharged from the change discharging port as needed, and the guidance screen for requesting the fee charge content appears as shown in FIG. 44. In the guidance screen at the time, the message "if it is okay, please press the confirmation button" is shown laterally in the uppermost row, and therebelow, the number of order, the fee for one sheet, and the total amount are shown laterally from above successively in three rows. In the lowermost row, the "confirmation" button is provided together with the "cancel" button and the "return to the previous screen" button. In the guidance screen, in case the confirmation button is touched, the fee charging process is completed so as to move to the next step.

Figure 30:
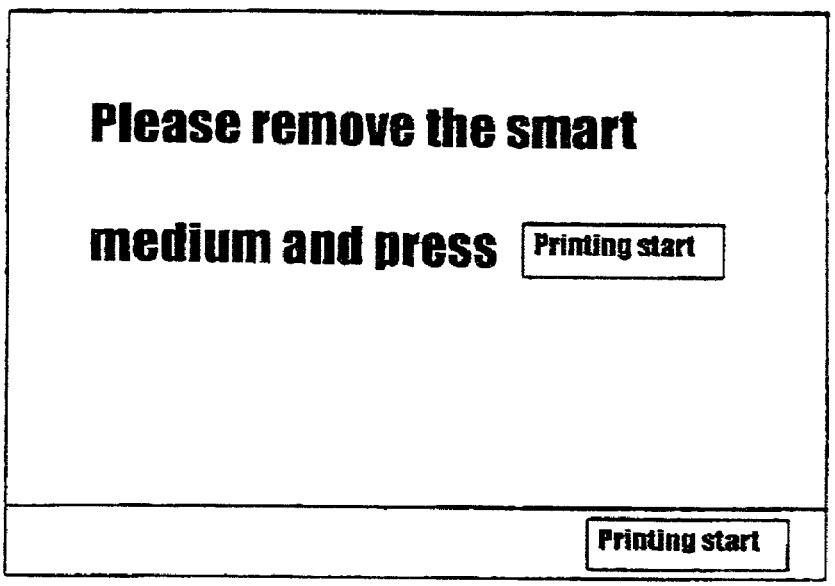
FIG. 30 Is the guidance screen of the smart media removal method in an embodiment of the image printing system according to the first aspect of this invention.
Figure 31:
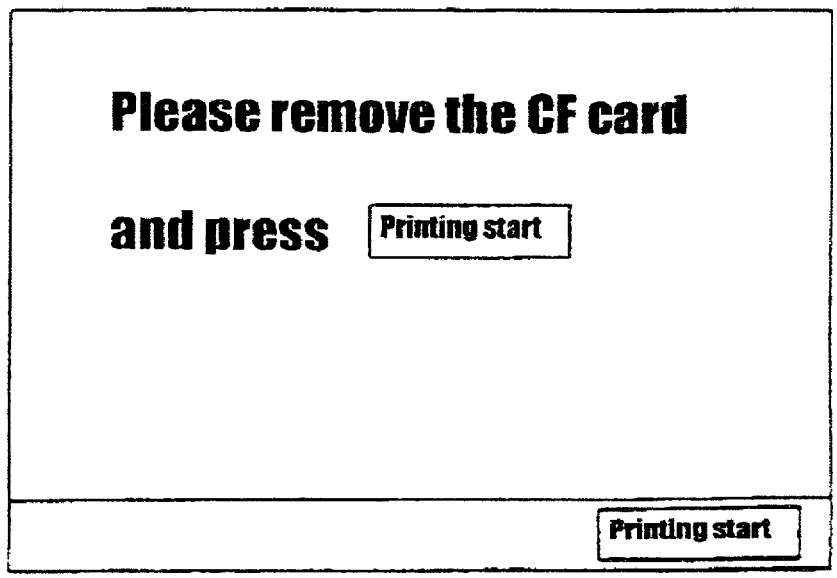
FIG. 31 is the guidance screen of the compact flash card removal method in an embodiment of the image printing system according to the first aspect of this invention.
Figure 32:
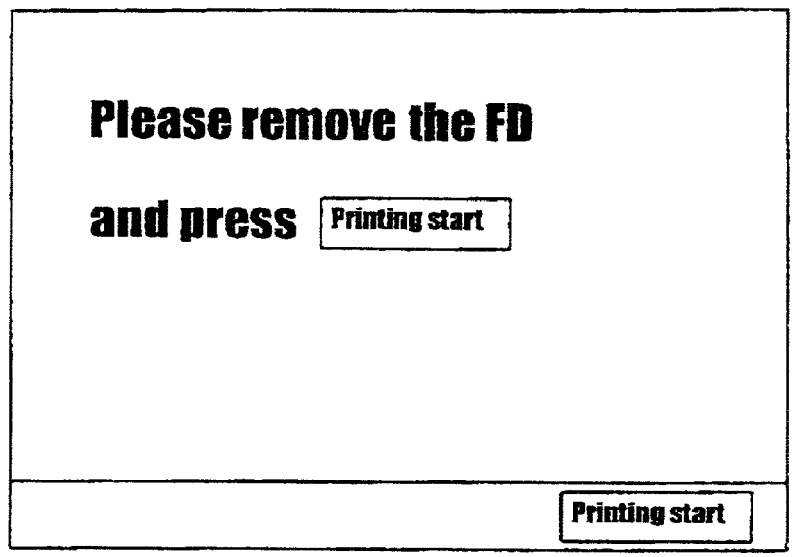
FIG. 32 is the guidance screen of the floppy disk removal method in an embodiment of the image printing system according to the first aspect of this invention.
Figure 33:
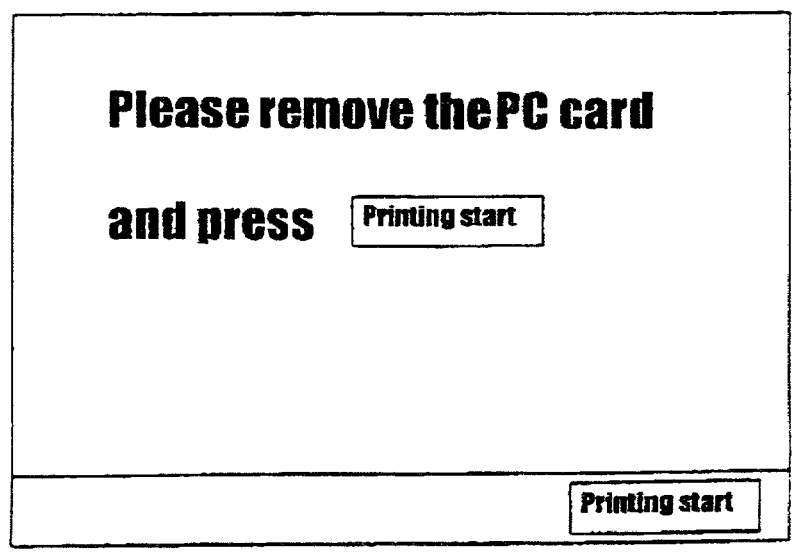
FIG. 33 is the guidance screen of the PC card removal method in an embodiment of the image printing system according to the first aspect of this invention.
Figure 34:
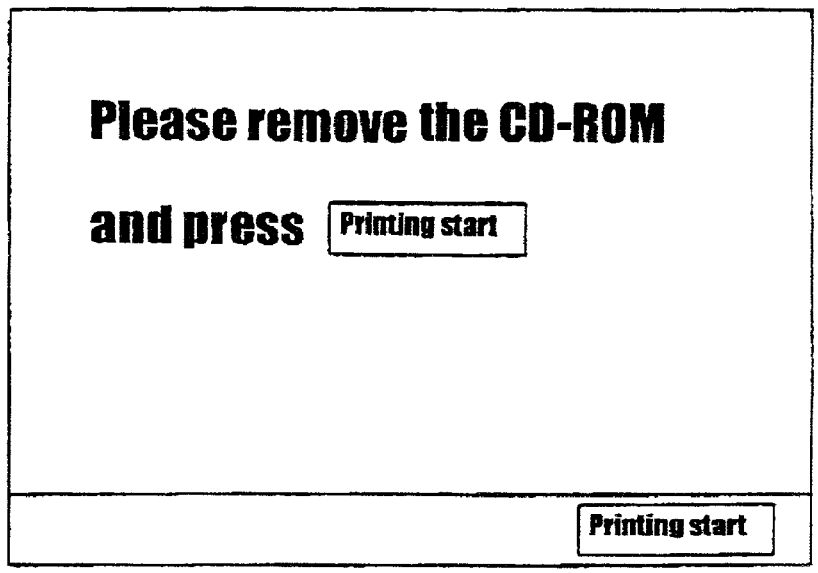
FIG. 34 Is the guidance screen of the CD-ROM removal method in an embodiment of the image printing system according to the first aspect of this invention.

When the fee charging process is completed, the fee receipt is published so as to be discharged from the receipt outlet port (S129). After producing the receipt, the operation screen for removing the recording medium or the manuscript, which is the reading source of the image data, appears, and furthermore, in case the recording medium is inserted in the reading machine, the shutter of the insertion port is opened (S130). As shown in FIG. 30, in the operation screen in case the smart medium is inserted, the message "please remove the smart medium and press the printing start" is shown laterally, and the "printing start" button is provided in the lowermost row. Similarly, in case the CF card is inserted, the operation screen as shown in FIG. 31 appears. In case the flexible disc is inserted, the operation screen as shown in FIG. 32 appears. In case the PC card is inserted, the operation screen as shown in FIG. 33 appears. And in case the CD-ROM is inserted, the operation screen as shown in FIG. 34 appears.

Figure 35:
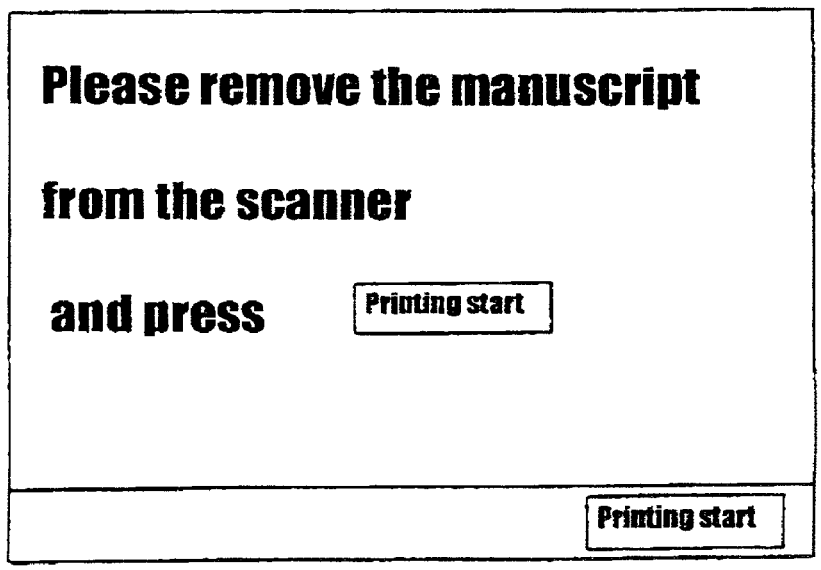
FIG. 35 is the guidance screen of the scanner manuscript removal method in an embodiment of the image printing system according to the first aspect of this invention.

Moreover, in the operation screen in case the printed article such as a photograph is read out by the scanner, as shown in FIG. 35, the message "please remove the manuscript from the scanner and press the printing start" is shown laterally in the uppermost row, and the "printing start" button is provided in the lowermost row.

Figure 36:
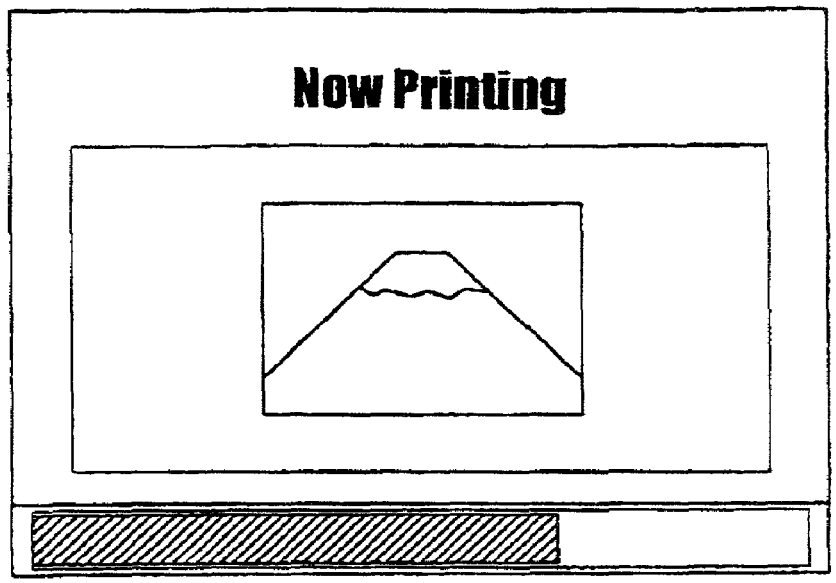
FIG. 36 is a guidance screen under print execution in an embodiment of the image printing system according to the first aspect of this invention.
Figure 37:
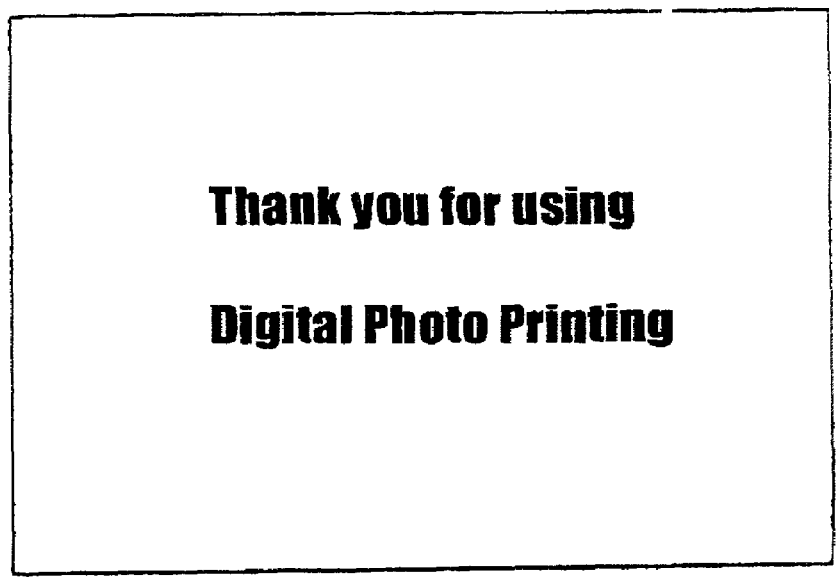
FIG. 37 is an end screen in an embodiment of the image printing system according to the first aspect of this invention.

In case the recording medium inserted in the reading machine or the manuscript placed on the glass surface of the scanner is removed and the printing start button is touched according to the guidance on the operation screen, the printing is started by the printer installed in the terminal part (S131). During the printing process, the guidance screen as shown in FIG. 36 appears In the guidance screen at the time, the message "now printing" is shown laterally in the uppermost row, therebelow, the Image being printed is shown, and below the image, a time line roughly indicating the proceeding state of the printing process Is lit. When the printing process is finished, the printed article is discharged from the printed article outlet port (standard printing) of the main body, and the finish screen as shown in FIG. 37 appears. The finish screen in the meantime returns to the start screen.

On the other hand, in the guidance screen of sub menu shown in FIG. 10, if the "news synthesis" is selected (S101), the procedure shown in FIG. 7 is started. In case the "news synthesis" procedure is started, first, the guidance screen which enumerates various reading sources for image datum is displayed as shown in FIG. 11, so that a reading source can be selected (S102). In the operation screen at the time, the message "please select the medium for input from those shown below" is shown laterally in the uppermost row, and therebelow, the touch panel buttons each with the name of the smart medium, the compact flash card (CF card), the flexible disc, the PC card, the CD-ROM, and the photograph (scanner) are shown. In the operation screen, in case a touch panel button is touched by a hand, the corresponding reading source Is selected.

If any of the reading sources is selected from the smart medium, the CF card, the flexible disc, the PC card, and the CD-ROM, the operation screen showing the inserting method corresponding to the selected recording medium is indicated so that the recording medium can be inserted.

In the operation screen in case the smart medium is selected, as shown in FIG. 12, the message "please set the smart medium and press the reading start" is shown laterally in the uppermost row, and a "reading start" button is provided in the lowermost row together with the "cancel" button and the "return to the previous screen" button. Similarly, in case the CF card is selected, the operation screen shown in FIG. 13 appears. In case the flexible disc is selected, the operation screen shown in FIG. 14 appears. In case the PC card is selected, the operation screen shown in FIG. 15 appears. And in case the CD-ROM is selected, the operation screen shown in FIG. 16 appears.

In case a recording medium is inserted in the predetermined insertion port according to the guidance of the operation screen and the reading start button on the touch panel is touched by a hand, the insertion port with the recording medium inserted is closed by the shutter so as to start the reading operation of the image data (S103).

As shown in FIG. 17, the operation screen with the thumb nail images of the total read out images shown appears (S104) after the reading operation is completed. In the operation screen at the time, the message "please select the image to be printed, and input the number of prints" is shown laterally in the uppermost row (S105), and therebelow, total 6 thumb nail images are shown in the two rows laterally, with the column for inputting the number of prints provided to each thumb nail image.

In case the number of the thumb nail Images so large than they cannot be shown on one screen, all the thumb nail images are shown, divided. In a plurality of pages. The page number currently appearing on the screen and triangular scroll buttons for moving forward or backward among the pages are displayed on the screen in the same row as the buttons for increasing or reducing the number of prints. Moreover, in the lowermost row of the operation screen at the time, a "determination" button is provided together with the "cancel" button and the "return to the previous stage" button. By selecting the images to be printed in the operation screen, and pressing the determination button, the image to be edited is specified.

Figure 15:
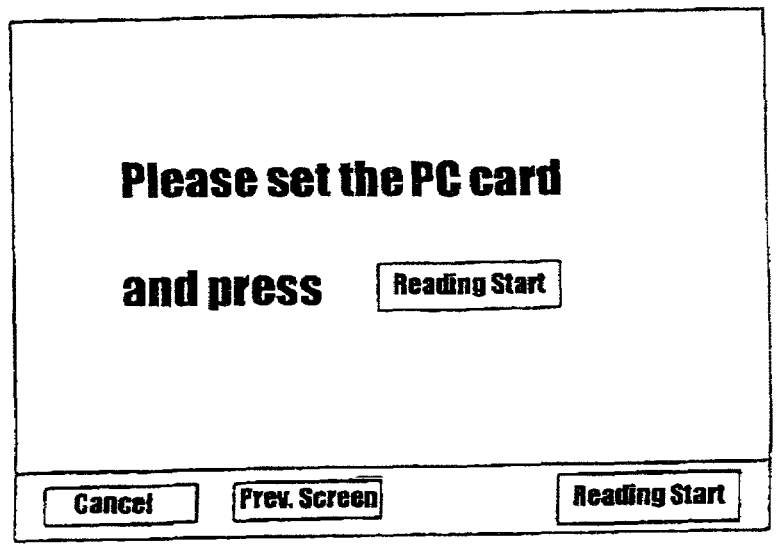
FIG. 15 is the guidance screen of the PC card insertion method in an embodiment of the image printing system according to the first aspect of this invention.
Figure 16:
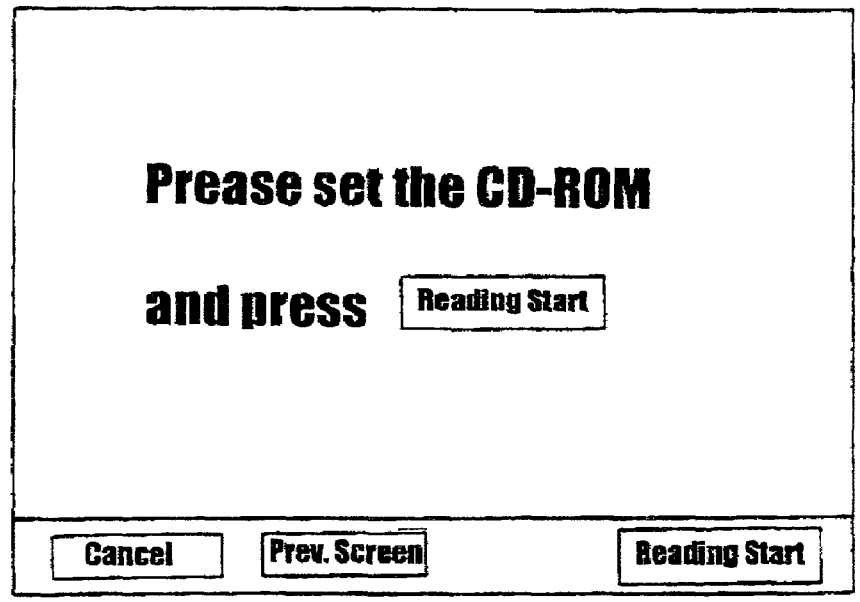
FIG. 16 is the guidance screen of the CD-ROM insertion method in an embodiment of the image printing system according to the first aspect of this invention.

In the "photo edit" procedure, it is also possible to select the "photograph (scanner)" as the reading source so that the image data are read out from a printed article such as a photograph using a scanner (S106 to S107). In the operation screen shown in FIG. 11, in case the "photograph (scanner)" is selected as the reading source, as shown in FIG. 15, the operation screen for selecting the reading size appears (S106). In the operation screen at the time, the message "please select the reading size" is shown laterally in the uppermost row, and therebelow a button for selecting the photograph size and a button for selecting the A5 size are provided. In case the photograph size is selected, a manuscript of a size within the ordinary photograph size of vertically 89 mm×laterally 127 mm can be read. In case the A5 size is selected, a manuscript of a size over the ordinary photograph size up to vertically 148.5 mm×laterally 210 mm can be read.

In case the button for the photograph size or A5 size is touched, the corresponding reading size is selected so that the operation screen for reading the manuscript by a scanner appears as shown in FIG. 19. In the operation screen at the time, the message "please set the manuscript on the scanner and press the reading start" is shown laterally in the uppermost row, and the "reading start" button is provided in the lowermost row together with the "cancel" button and the "return to the previous screen" button.

In case the manuscript is set on the scanner and the reading start button is touched according to the operation screen shown in FIG. 19, the manuscript is scanned and read so as to obtain the image data (S107).

Figure 20:
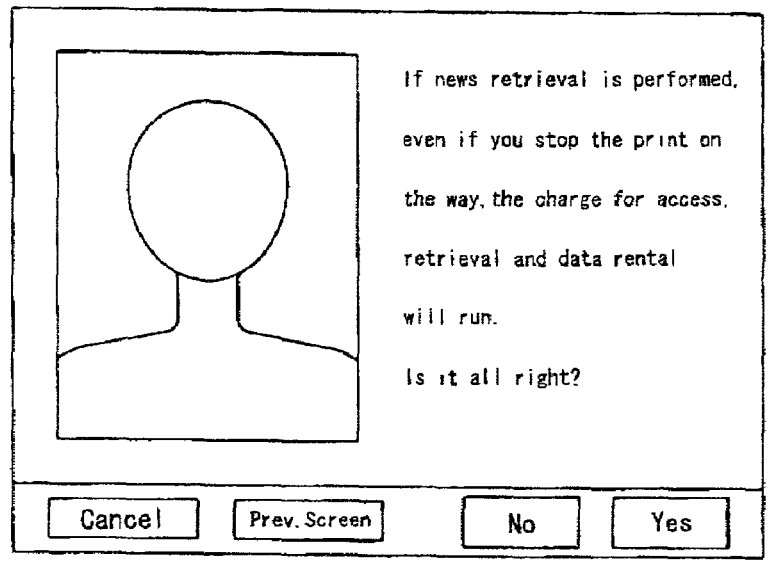
FIG. 20 is the guidance screen which displays the selected original image in an embodiment of the image printing system according to the first aspect of this invention.

When the original image to be edited is specified, as shown in FIG. 20, while displaying the original image to be edited, the guidance screen which advises to be careful of being charged separately once starting the retrieval of the event information and the expense of the retrieval is charged even if the printing procedure is interrupted on the way (S108). In the guidance screen at this time, an original image is displayed on one side, and on other one side, the message of "if news retrieval is performed, even if you stop the print on the way, the charge of access, retrieval, and data rental will run. Is it all right?" is displayed, and the "cancel" button, the "return to the previous screen" button, the "yes" button and the "no" button are provided in the lowermost row.

If the "yes" button is touched in this guidance screen, it will mean that consent for starting retrieval is obtained and by starting retrieval and an access to the events information service part 3 will be started (S109). If "no" is chosen in this guidance screen, the guidance screen (not shown) which checks whether the system changes to another print menu or it cancels will appear, and it will show a user to the menu of a wish.

Figure 21:
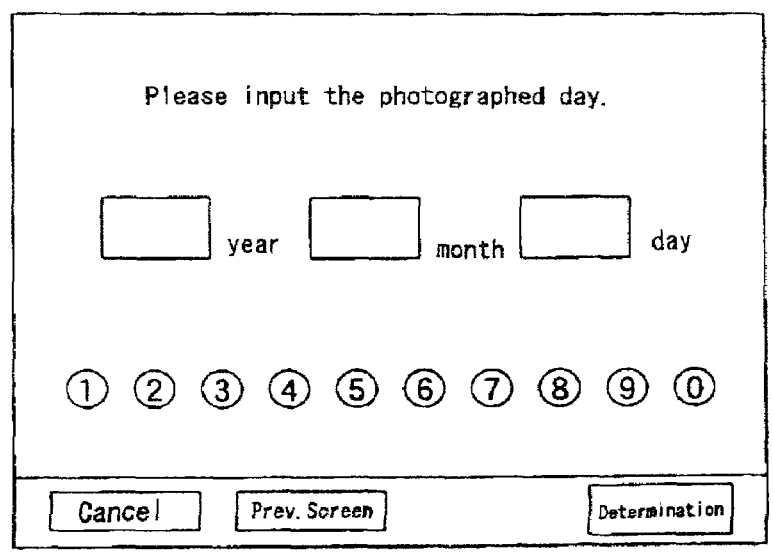
FIG. 21 is the guidance screen which inputs the photographed day of an original image in an embodiment of the image printing system according to the first aspect of this invention.
Figure 22:
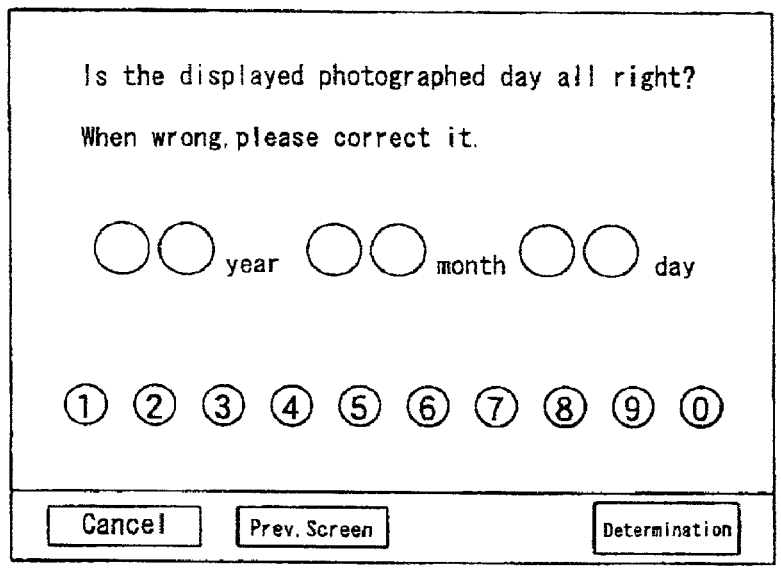
FIG. 22 is the guidance screen which checks the photographed day read in recording media in an embodiment of the image printing system according to the first aspect of this invention.

If the terminal part 2 accesses the events information service part 3, the guidance screen into which the customer is made to input retrieval conditions will appear (S101). As retrieval conditions, the guidance screen which is for inputting or confirming the photographed day as the image related time appears first. Basically as shown in FIG. 21, in the guidance screen, the message of "please input the photographed day" is shown laterally in the uppermost row, and therebelow, the input column and the ten key are provided, and the "cancel" button, the "return to the previous screen" button, and "determination" button are provided in the lowermost row. When the datum of a photographed day is appended to the image datum of the recording media as reading source, as shown in FIG. 22, the guidance screen will be appeared, wherein the message of "Is the displayed photographed day all right? When wrong, please correct it" is laterally shown in the uppermost row, while displaying the data of the photographed day read in recording media to the lower side, and providing with the ten key used for correction. In the lowermost row, the "cancel" button, the button "return to the previous screen", and "determination" button are also provided.

Figure 23:
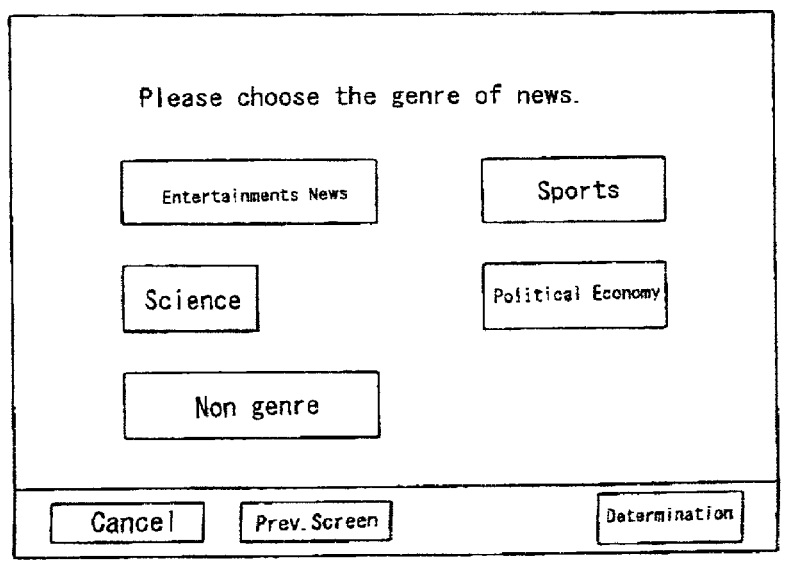
FIG. 23 is the guidance screen which chooses the genre of events information in an embodiment of the image printing system according to the first aspect of this invention.

If on the guidance screens, a photographed day is input or corrected and a determination button is touched, a photographed day will be decided, and then, as shown in FIG. 23, the screen which chooses the genre of events information appears. In the guidance screen at this time, the message of "please choose the genre of news" is shown laterally to the uppermost row, and therebelow, the choices of "entertainments news", "sports", "science", "political economy", and "non genre" are displayed, and the "cancel" button, the "return to the previous screen" button, and "determination" button are provided in the lowermost row. If the button of the genre of a wish is touched in this guidance screen and "determination" button is touched, a genre will be decided and the input of retrieval conditions will be completed (S110).

Figure 24:
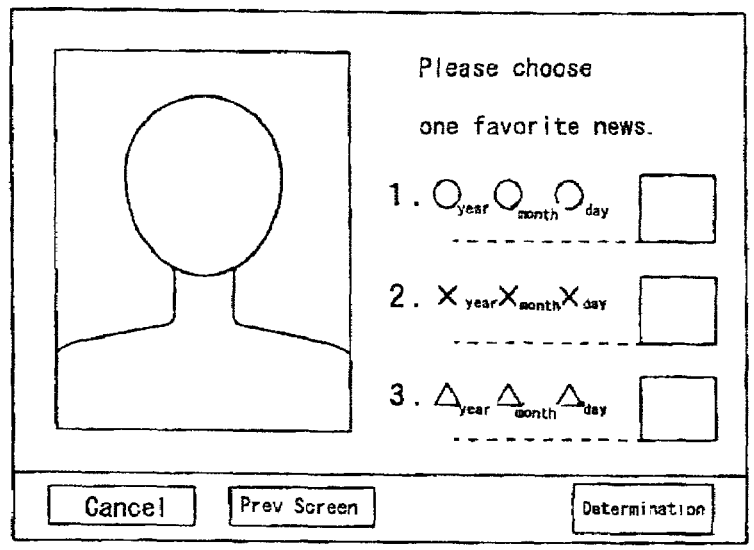
FIG. 24 is the guidance screen which further selects the extracted events information.

Once the input of retrieval conditions is completed, the retrieval of events information will be started automatically, and as shown In FIG. 24, the hit event information is shown in a guidance screen (S111). In the guidance screen at this time, the original image is displayed on one side, only two or more event information of a higher rank among the hit event information according to a predetermined priority are displayed with a message of "choose one favorite news". The "cancel" button, the button "return to the previous screen", and "determination" button are provided in the lowermost row. Each event information displayed preferentially consists of a generating date of the event, brief explanation of the contents, and a photograph. If only one event information to be synthesized with the original image is chosen in this guidance screen and a determination button is touched, the event information will be decided (S111).

Figure 25:
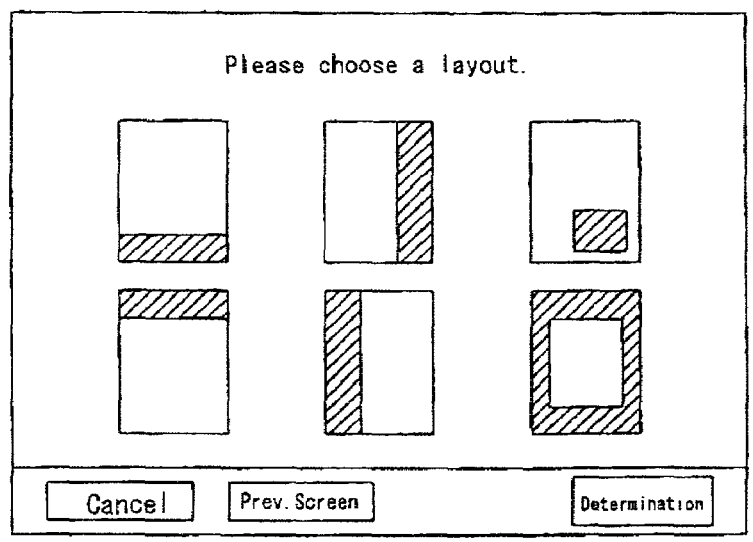
FIG. 25 is the guidance screen which chooses the layout of the image plus event information.
Figure 26:
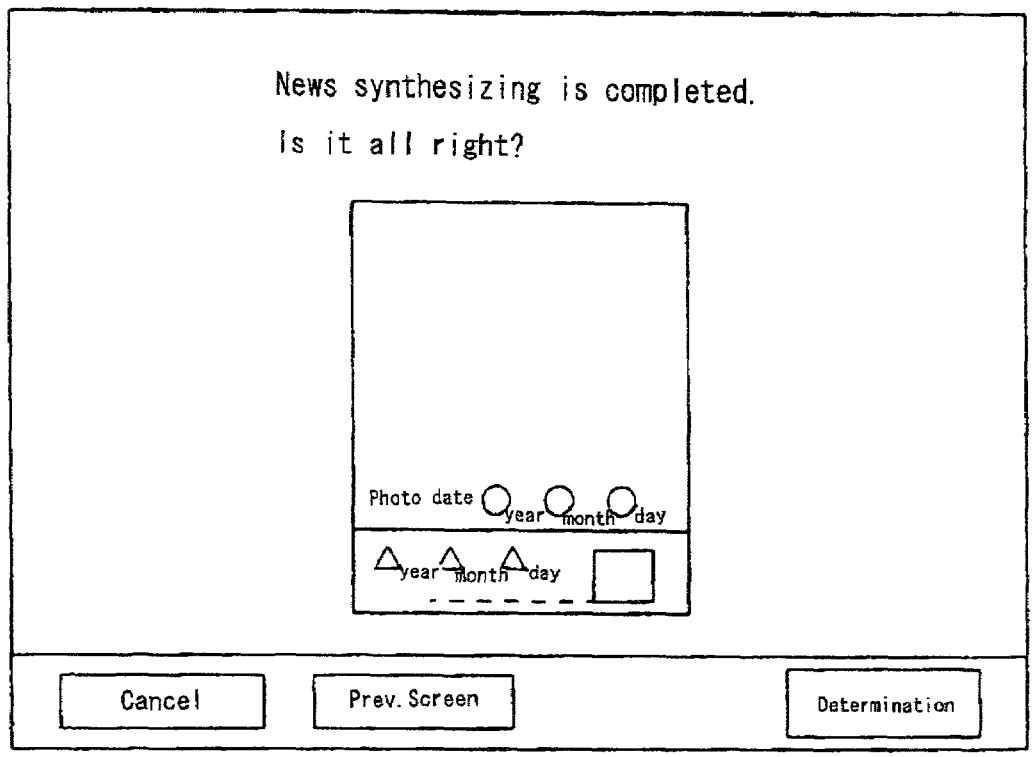
FIG. 26 is the guidance screen which checks the synthesized image plus event information.

If event information is decided, synthesizing of the images will be started, and the guidance screen which chooses a layout as shown in FIG. 25 appears (S112). The message of "please choose a layout" is laterally shown in the uppermost row in the guidance screen at this time, and therebelow, the choices of layout are enumerated, and the "cancel" button, the "return to the previous screen" button, and "determination" button are provided in the lowermost row. It a layout is chosen in this guidance screen and a determination button is touched, a image will be synthesized, as shown in FIG. 26, the image plus event information is indicated by expansion, and the guidance screen to check appears (S122). In the guidance screen at this time, the message of "News synthesizing is completed. Is it all right?" is shown laterally in the uppermost row, and therebelow, the Image which gave a photographed day and events information to the bottom at the original image is displayed, and the "cancel" button, the "return to the previous screen" button, and the "determination" button are provided in the lowermost row.

If the "to return to a before screen" button is touched in this guidance screen, a layout can be redone, and if the "determination" button is touched, as shown in FIG. 27, the guidance screen which sets up print number of sheets will appear (S113). In the guidance screen at this time, the message of "please set the number of order" is shown laterally in the uppermost row, and below the message, a column for inputting the number of order and input buttons for increasing or reducing the number of order are provided. In the lowermost row, the "cancel" button, the "return to the previous screen" button, and the "determination" button are provided. The input buttons include a number increase button of an upward triangle, and a number reduction button of a downward triangle. By touching these, the number of order can be increased or reduced. By touching the determination button after finishing the input operation, the order content including the number of order can be set (S113).

When the order content is set, as shown in FIG. 28, the guidance screen for charging the fee appears for executing the fee charging process (S114). In the guidance screen for the fee charging process, the message "please insert money" is shown laterally in the uppermost row, and therebelow, the number of order, the fee for one sheet (unit price), the fee for news (the fee for access to the event information, fee for retrieval, and fee for rental of event information), the total amount (sum of the charged amount), and the inserted fee (inserted amount) are shown laterally from above successively in fifth rows. When the amount inserted in the coin insertion port and/or the bill insertion port according to the explanation on the guidance screen reaches or exceeds the total charged amount, in case it is a mode for only confirming the total amount, the change is discharged from the change discharging port as needed, and the guidance screen for requesting the fee charge content appears as shown in FIG. 29. In the guidance screen at the time, the message "if it is okay, please press the confirmation button" is shown laterally in the uppermost row, and therebelow, the number of order, the fee for one sheet, and the total amount are shown laterally from above successively in three rows. In the lowermost row, the "confirmation" button is provided together with the "cancel" button and the "return to the previous screen" button. In the guidance screen, in case the confirmation button is touched, the fee charging process is completed so as to move to the next step.

When the fee charging process is completed, the fee receipt is published so as to be discharged from the receipt outlet port (S115). After producing the receipt, the operation screen for removing the recording medium or the manuscript, which is the reading source of the image data, appears, and furthermore, in case the recording medium is inserted in the reading machine, the shutter of the insertion port is opened (S116). As shown in FIG. 30, in the operation screen in case the smart medium is inserted, the message "please remove the smart medium and press the printing start" is shown laterally, and the "printing start" button is provided in the lowermost row. Similarly, in case the CF card is inserted, the operation screen as shown in FIG. 31 appears. In case the flexible disc is inserted, the operation screen as shown in FIG. 32 appears. In case the PC card is inserted, the operation screen as shown in FIG. 33 appears. And in case the CD-ROM is inserted, the operation screen as shown in FIG. 34 appears.

Moreover, in the operation screen in case the printed article such as a photograph is read out by the scanner, as shown in FIG. 35, the message "please remove the manuscript from the scanner and press the printing start" is shown laterally in the uppermost row, and the "printing start" button is provided in the lowermost row.

In case the recording medium inserted in the reading machine or the manuscript placed on the glass surface of the scanner is removed and the printing start button is touched according to the guidance on the operation screen, the printing is started by the printer installed in the terminal part (S117). During the printing process, the guidance screen as shown in FIG. 36 appears. In the guidance screen at the time, the message "now printing" is shown laterally in the uppermost row, therebelow, the image being printed is shown, and below the image, a time line roughly indicating the proceeding state of the printing process is lit. When the printing process is finished, the printed article is discharged from the printed article outlet port (standard printing) of the main body, and the finish screen as shown in FIG. 37 appears. The finish screen in the meantime returns to the start screen.

As described above, according to the image plus event information printing system of this invention, by using the personal image printing system constructed with the personal computer as an axis thereof and the image printing system involving the commercial image printing system like the above mentioned post type image outputting apparatus, the events information which shows the famous occurrence which was generated at the time near the time relevant to an Image or the time concerned can be synthesized with the original image and printed out. Thus, the printed article of high added value can obtain easily.

Especially those that looked at the image synthesized by searching and extracting the event information which shows the famous occurrence generated at the same day as a photographed day or the near time of an original image, and synthesizing with an original image can grasp the photographed time of the original image intuitively from the contents of events information, or can recognize the time background at the time of original image photography.

Moreover, when two or more events information which show the occurrence generated at the same day as a photographed day or the near time of an original image are searched and extracted, although one or more events information to be added to the original image may be decided automatically by the system side according to a predetermined priority, the printed article of particular high added value may be obtained by showing all of the extracted events information or a part of the extracted event information, which part is chosen in accordance with the predetermined priority, and making the customer choose favorite event information freely.

Although the image plus event information printing system of this invention may be constructed as the stand-alone type which stored all the means in one apparatus, some apparatuses which carried out distributed storing of each means can be connected by the line, and particularly, the client/server type system can be constructed by carrying out distributed storing of each means at terminal apparatus and a server.

Dynamic Shot Printing System

Figure 45:
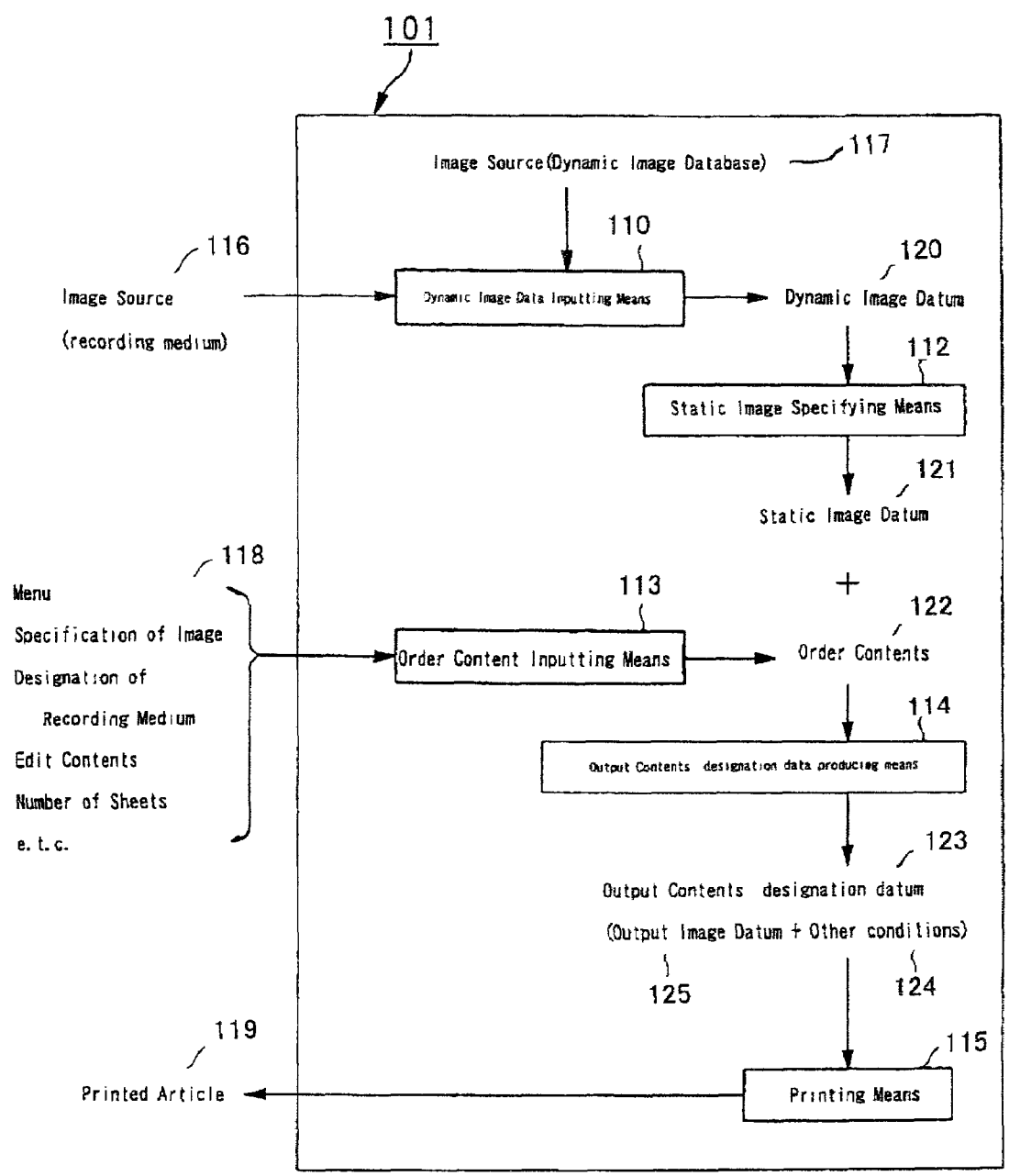
FIG. 45 is the diagram showing the outline of the image printing system according to the second aspect of this invention.

First, the outline of the second aspect according to this invention is explained with reference to FIG. 45. The dynamic shot printing system 101 of this invention comprises at least following means, that is:

(1) a dynamic image data procurement means for obtaining a dynamic image data,
(2) a static image data specifying means for specifying a scene recorded in the dynamic image data as the static image,
(3) an order inputting means for inputting orders for an image to be output,
(4) an output content designation data producing means for preparing an output content designation datum which records the image to be output and appendix conditions for the image on the basis of the obtained static image data and the input orders,
(5) a printing means which prints out an printed article of the image in accordance with the output content designation datum.

As a dynamic image data procurement means 110, it is the means which can receive a dynamic image data (image data which recorded the dynamic image) from a certain source of a dynamic image data, for example, a dynamic image data inputting means 110 which can be read a dynamic image data in the recording media 116, or which photographs an actual motion and makes it digital datum and thus obtains a dynamic image data, or a dynamic image database 117 which memorizes one or more dynamic image data, and can take out a desired dynamic image data suitably may be cited. The dynamic image database could be built in memory storage, such as a hard disk of a computer, and may be equipped with the retrieval means which can choose a favorite thing easily out of many dynamic image data. Moreover, the dynamic image database 117 may be installed in this printing system, and uniting with the dynamic image data procurement means 110, or the dynamic image database 117 may be constructed as dynamic image source independent from this printing system.

The dynamic image data 120 received by the dynamic image data procurement means 110 is transmitted to a static image data specifying means 112 mentioned below, and one or more scenes which are included in the dynamic image are specified as static image data 121.

On the other hand, directions for selection of a print menu 118, specification of the recording medium used as dynamic image source, specification of static image datum, the existence of edit, the contents of edit, print number of sheets, etc. are input into this printing system 101 by the order inputting means 113, and it is recognized as order contents 122.

The specified static image datum 121 and some of order contents 122 are transmitted to the output content designation data producing means 114, and the output content designation datum 123 which consists of the image datum which records the image to be output and other conditions accompanying to the image datum is generated. When there are no directions of edit in order contents as image datum to be output, the static image datum 121 is recognized as image datum 124 to be output as it is. When directions of edit are included in order contents, according to the concrete contents of edit, the static image datum 121 synthesizes with materials, such as a frame, or two or more static images are arranged on the screen of one sheet for synthesizing a preview image, and expansion, movement, rotation, modification, or other processings of image are performed. Thus, the image data 124 to be output is edited. As conditions which accompany to the image data to be output, directions for use of print number of sheets and use of the mount for pre-cut seals etc. are included, for example.

The generated output content designation data 123 is transmitted to the printing means 115, the print of a image is performed here, and the printed article 119 of a shot image is obtained.

According to this invention, a dynamic image data can be processed easily, and since the shot Image contained in a dynamic image can be printed as it is or after performing an advanced image processing to the selected shot image, the image printing system and printed article both having high added value are offered.

It Is desirable to establish an editing means for editing the specified static image datum to the image to be output in the output content designation data producing means 114 of the dynamic image shot printing system according to this invention. Since it not only prints the static image specified from the dynamic image data by establishing such an editing means as it is, but it can process static image data and a image can be edited newly, the shot image with high added value can be printed.

According to the dynamic image shot printing system according to this invention, by combining freely the original dynamic image contents and/or original static image contents brought by a user with dynamic image contents and/or static image contents possessed by the system or originally obtainable by the system side, a new image can be easily synthesized and easily printed out.

For example, in the dynamic image shot printing system according to this invention, while providing a dynamic image data inputting means to input a dynamic image data as a dynamic image data procurement means 110, a static image data inputting means to input static image data can be further established. Thus, in such constitution, the customer inputs a dynamic image data into this printing system by the dynamic image data inputting means, and a favorite static image datum from the dynamic image data is specified by the static image data specifying means 112. Moreover, in parallel to this, an image datum, such as a static image photographed with the digital camera may be input into this printing system by the static image data inputting means as a second static image datum. Then, the first static image datum which is specified from the dynamic image data and the second static image datum are synthesized by the above mentioned editing Means, thus a new image (this is also called "shot image" by this invention) is edited, and it can print by the printing means 115.

Alternatively, in the dynamic image shot printing system according to this invention, while providing a dynamic image data inputting means to input a dynamic image data as a dynamic image data procurement means 110, the static image database which accumulates static image data can be further provided. Thus, in such constitution, the customer inputs dynamic image data into this printing system by the dynamic image data inputting means, and specifies favorite static image datum from the dynamic image data by the static image data specifying means 112. In parallel to this, a second static image data comes to hand from the static image database. And the first static image data specified from the dynamic image data and the second static image data are synthesized by the above mentioned editing means, thus a new Image is edited, and it can print by the printing means 115.

In addition, a static image database can be built in memory storage, such as a hard disk of a computer, and a retrieval means may be added therein so that a favorite static image can be chosen easily. As such a static image database, various kinds of material databases used for frame synthesis can be exemplified The static image database may be formed in this printing system or may be formed independently from this printing system.

Furthermore, in the dynamic image shot printing system according to this invention, while forming the dynamic image database which accumulates a dynamic Image data as a dynamic Image data procurement means 111, a static image data acquisition means to input static image data can be further prepared. Thus, in such constitution, the customer receives dynamic image data from the dynamic image database, and specifies favorite static image datum from the dynamic image data by the static image data specifying means 112. In parallel to this, an image datum, such as a static image photographed with the digital camera is input into this printing system by the static image data inputting means as second static image datum. The first static image datum which is specified from the dynamic Image data and the second static image datum are synthesized by the above mentioned editing means, thus, a new image is edited, and it can print by the printing means 115.

Furthermore, in the dynamic image shot printing system according to this invention, while forming the dynamic image database which accumulates a dynamic image data as a dynamic image data procurement means 110, a static image data acquisition means to input static image data can be further prepared. Thus, in such constitution, the customer receives dynamic image data from the dynamic image database, and specifies favorite static image datum from the dynamic image data by the static image data specifying means 112. In parallel to this, an image datum, such as a static image photographed with the digital camera is input into this printing system by the static image data inputting means as second static image datum. The first static image datum which is specified from the dynamic image data and the second static image datum are synthesized by the above mentioned editing means, thus, a new image is edited, and it can print by the printing means 115.

Furthermore, in the dynamic image shot printing system according to this invention, while forming a dynamic image database which accumulates a dynamic image data as the dynamic image data procurement means 110, a static image database which accumulates static image data can be further provided. Thus, in such constitution, the customer receives a dynamic image data from the dynamic image database, and specifies favorite static image datum from the dynamic image data by the static image data specifying means 112. Moreover, in parallel to this, the second static image datum comes to hand from a static image database. And the first static image datum which is specified from the dynamic image data and the second static image datum are synthesized by the above mentioned editing means, thus a new image is edited, and it can print by the printing means 115.

Furthermore, in the dynamic image shot printing system according to this invention, a dynamic image data inputting means to input a dynamic image data, and the dynamic image database which accumulates a dynamic image data can be formed both as a dynamic image data procurement means 110. Thus, when it constitutes, a static image datum specified from the dynamic image data input by the dynamic image data inputting means and the second static image datum specified from the dynamic image data which came to hand with the dynamic image database are synthesized by the above mentioned editing means, a new image is edited, and it can print by the printing means 115.

Figure 46:
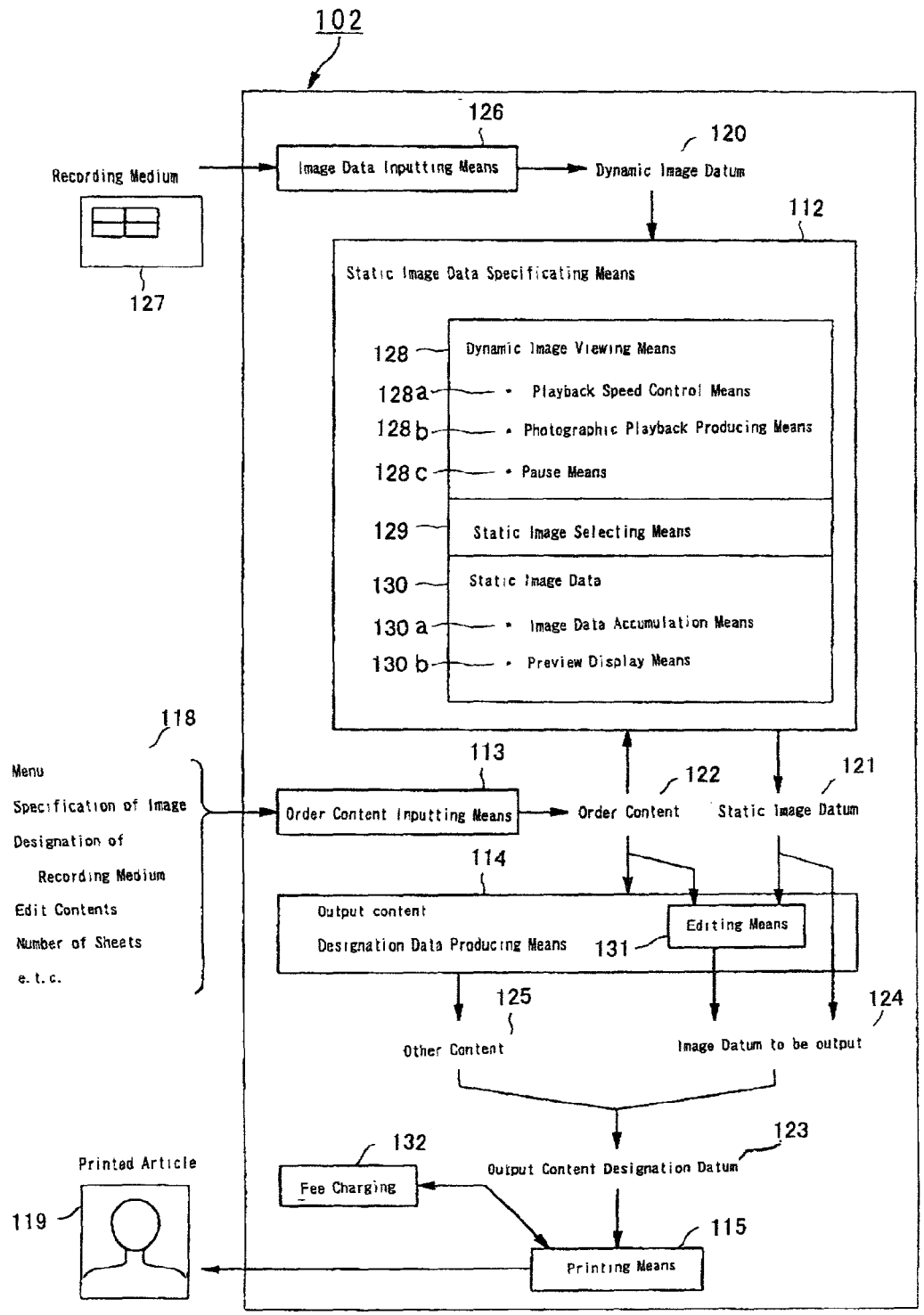
FIG. 46 is the diagram showing one embodiment of the image printing system according to the second aspect of this invention.

An embodiment of the dynamic image shot printing system 112 belonging to this invention is shown in FIG. 46. The dynamic image shot printing system 102 comprises at least following means, that is:

(1) an image data inputting means 126 to input a dynamic image data,
(2) a static image data specifying means 112 to specify one scene of the dynamic image currently recorded Into the input dynamic image data as image data of a static image (static image data),
(3) an order inputting means 113 to input the order contents about the Image to be output,
(4) an output content designation data producing means 114 to prepare an output content designation datum which records the image to be output and appendix conditions for the image on the basis of the obtained static image data and the input orders, and
(5) a printing means which prints out an printed article of the image in accordance with the output content designation datum.

In order to print a desired shot image using the dynamic image shot printing system 102 of this invention, first, image data 120, i.e., the dynamic image data, which recorded the dynamic image is input into the dynamic image shot printing system 102 by using the image data inputting means 126 Usually, by inputting the order contents relevant to this printing system 102 from the order inputting means 113, the image data inputting means 126 is operated and the dynamic image data is input. However, when the recording medium 127 which recorded the dynamic image data is inserted in the reader of this printing system 102, it is possible to set up so that the image data inputting means 126 may operate automatically to start the reading of a dynamic image data.

Although the dynamic image data to be input is the dynamic image which is mainly took with the digital camcorder or the digital camera, and is recorded on a certain recording media as a digital datum, but it is not limited to thereto. For example, it may be the dynamic image of the computer graphics created with the personal computer, and when this printing system is equipped with image pick-up apparatus, such as a CCD camera, as an image data inputting means, the dynamic image datum may be a motion or performance which are actually performed in front of this printing system.

As the image data inputting means 126, for example, reading machines corresponding to each recording medium, such as a compact flash memory (CF), a smart medium, a compact disc (CD), a magneto-optic disc (MO), a flexible disc (FD), and a PC card, a connector to be connected with a digital camcorder, capable of reading dynamic image data from a memory of the digital camcorder, can be used. As the image data inputting means 110, an image pick-up apparatuses, such as a CCD camera which can photograph a motion or performance which are actually performed in front of this printing system and can convert it into a digital datum may be used. The enjoyableness of this printing system may increase when including the image pick-up apparatus which can photograph a dynamic image in addition to the reading apparatus of recording media in the image data inputting means 126. It is preferable to include a plurality of reading devices of different kinds in the image data inputting means 126 in order to improve the applicability of the dynamic shot printing apparatus of the present invention. Moreover, the image data inputting means 126 may be equipped with the function of both a dynamic image data inputting means and a static image data inputting means. That is, an image data inputting means enables not only to receive the input of a dynamic image, but also to receive the input of a static image such as the photograph image photographed by a digital camera, an illustration created by computer graphics, and to process them like the static image data specified from the dynamic image in the subsequent process, and may enable it to create a printed article.

The order contents about the image to be output are input into this printing system 102 by using the order inputting means 113. The alternatives of order contents are prepared in advance at the printing system side, the customer can choose freely any order from the prepared items. It is desirable to show a customer the order contents which can be chosen on a display means (not shown), and to guide input operation of order contents. As a display means, although CRT, a liquid crystal panel, etc. are used commonly, it may be simpler one like the bulletin board which itemized the operation method.

In the alternatives of order contents, for example, those of specifying the image to be output, such as an option for which scene in a dynamic image to be printed, an option for which the specified scene (static image) should be printed as it is or should be further processed, or an option for how the static image should be processed, and those of appertained to the image datum when shot image is printed, such as decisions of the print number of sheets, print size, or using or not using a particular print like a pre-cut seal, etc., may be included.

Order contents may be input at any time according to advance of operation after starting operation of this printing system until print-out is completed. For example, since the indication about the printing the read image as it is, or after processing, and the indication about the particular printing such as pre-cut seal, etc., would belong to the alternatives in the main menu, they would be input at the time of starting of this printing system operation. The determination of which scene in a dynamic image to print would be input after reading a dynamic image data into this printing system. The direction of how to process the specified static image data would be input after specifying static image data. Further, the setting of print number of sheet would be input after processing of static image data and the image datum to be output is produced or after the static image datum itself is recognized as the datum to be output Therefore, the order inputting means 113 is performed at any time if needed in the operation process of this printing system.

As the order content inputting device 113, for example, various kinds of pointers such as a touch panel provided integrally with a display device such as a CRT, and a liquid crystal panel, a keyboard, a mouse, and a track ball, can be used. Moreover, the DPOF function (digital print order format) provided in a digital camera can be used as well.

When a dynamic image data 120 is input, the static image data specifying means 112 is performed in this printing system 102, and the static image datum 121 which records the image used as a shot image to be output or to be used as its material is specified from of the countless scene included in a dynamic image. The static image data specifying means 112 is operated by inputting any required directions from the order inputting means 113. The static image data specifying means 112 is equipped with the dynamic image viewing means 128 for reproducing a dynamic image normally to display the contents on a dynamic image display part (not shown), and the static image selection means 129 which can choose any desirable scene arbitrarily while checking the contents of a dynamic image with the dynamic image viewing means 128. In addition, when there is no reference especially in this description and claims, reproduction of a dynamic image should be understood as a concept also including reverse reproduction (reproduction with rewinding).

The dynamic image viewing means 128 may be provided with a playback speed control means 128a which can change playback speed into a slow motion or frame-by-frame advance to arbitrary timing during reproduction of a dynamic image. A best shot can be easily chosen by reducing the playback speed of a dynamic image by the playback speed control means when the dynamic image reaches a little before the best shot, and pushing the selection button as a static image selection means 129 when the image of a best shot is displayed on a dynamic image display part. It is further desirable that the playback speed control means further has a fast-forward and/or fast-rewind functions since the reproduction time of an unnecessary portion can be omitted or shortened.

Moreover, the dynamic image viewing means 128 may be provided with a photographic playback producing means 128b which can change the dynamic image under reproduction into photographic playback at a choice timing. When the button as photographic playback producing means 128b is pushed at the arbitrary times while reproducing the dynamic image, the dynamic image stops at the time when the button is pushed, and a photographic playback is displayed by package at the dynamic image display part (not shown). The photographic playback includes a series of picture frames within a predetermined time range or of a predetermined number of frames which starting point, middle point, or end point is based on the time when the button is pushed. Each picture frame of the photographic playback displayed at the dynamic image display part serves as a touch panel, and after the customer touches and specifies a position to be desired, by pushing the button as a static image selection means 129, a best shot can be chosen easily.

Moreover, the dynamic image viewing means 128 may be provided with an pausing means 128c which can stop the dynamic image under reproduction to arbitrary timing. If the button as pausing means 128c was pushed when a best shot was displayed on the dynamic image display part(not shown), a dynamic image stops at the time when the button is pushed, and a best shot is fixed. Thus, a best shot can be easily chosen by pushing the selection button as a static image selection means 129 in the state.

Static image data can be more easily chosen now by combining any two or all of playback speed control means 128a, photographic playback producing means 128b, and the pausing means 128c. The case where playback speed control means 128a and pausing means 128c are combined is especially preferable, since a best shot can be particularly easily chosen by reducing the playback speed of a dynamic image by the playback speed control means 128a when the dynamic image reaches a little before the best shot, and then the best shot was hold by pushing the pausing means 128c so as to pause the replay of a dynamic image, and the hold best shot is fixed by pushing the selection button as a static image selection means 129.

In addition, when the timing which operates the static image selection means 129 shifts, it is possible to redo any number of times and the static image data of a best shot is able to be chosen until it canceled the static image data chosen accidentally and went satisfactorily, it can specify as static image data which should be delivered to a output content designation data producing means to mentioned below. In this case, after rewinding a dynamic image to a suitable scene, the same operation as the above may be repeated, or reverse reproduction, an reverse slow motion, or frame-by-frame back is performed, and a best shot may be displayed, optionally by making it stop by the pausing means, and it can be chosen.

As for the static image data specifying means 112, it is desirable to have further the static image data accumulation means 130 which can accumulate two or more static image data When the static image data specifying means 112 is equipped with the static image data accumulation means 130, the candidate of the static image to be output as the shot image, or used as its material can be chosen one after another, it accumulates temporarily, and after that, each candidate Is fully compared and, finally the most desirable static image datum can be specified. Moreover, the package print of the shot image of two or more scenes can also be carried out in one procedure by accumulating two or more static image data in the static image data accumulation means 130, and processing whole accumulated data in parallel at the editing means and the printing means mentioned below. Moreover, it can arrange on one screen all static image data accumulated in the static image data accumulation means 130, then the preview image are edited, and the edited preview image can be printed by the printing means.

It is desirable to prepare preview display means 130b which displays the image of the accumulated static image data on the static image data accumulation means 130, and to enable it to check an accumulation situation easily.

Usually, the static image data accumulation means 130 accumulates two or more static image data with attaching accumulation ranking which is given according to the ascending order of the specific time of static image data It becomes easy to access each accumulated static image data by attaching accumulation ranking according to the specific time of static image data. Moreover, while reproducing a dynamic image, when two or more static image is specified one after another and are accumulated in order according to the ascending order of the specific time of the static image, each scene in a dynamic image comes to arrange along time series. Thus, it is possible to prepare a playback photography by arranging the static images in order of accumulation.

The static image data accumulation means 130 may be provided with an accumulation adjustment means 130a which can delete some or all of static image data or change the accumulation ranking. By establishing such an accumulation adjustment means, substitution of the accumulated static image data becomes easy. Particularly, since only a static image with a bad relation condition with the scene of order can be easily substituted when editing the preview image of playback photography, it is far efficient rather than it redoes the selection work of static image data from the start. Furthermore, according to the accumulation adjustment means, since it is possible to arrange each static image in an order which is not related to a motion of an actual dynamic image, it is possible to produce a preview image which has an unique characteristic distinct from the playback photograph of dynamic image wherein each scene is arranged along the time series.

It is desirable to add to the accumulation adjustment means 130a a function which can give arbitrary accumulation ranking when choosing new static image data. When accumulation adjustment means 130a has such a function, the newly chosen static image data can be directly inserted in arbitrary accumulation ranking in a relation with 1 or more static image data which have already been accumulated.

The static image data specifying means 112 containing the dynamic image viewing means 128, the static image selection means 129, and static image data accumulation means 130 are realizable by executing the program stored in memory storage, such as a memory and a hard disk, with the computer.

If required order contents are input into this printing system 102 by the order inputting means 113 while 1 or more static image data 121 are specified by the static image data specifying means 112, the output content designation data producing means 114 will be performed. Consequently, based on some of static image data 121 and order contents 122, the output content designation data 123 which comprises the image data 124 to be output and the data 125 which recorded the other appendix conditions would generate.

Here, as the additional new order content which are input in order to generate the output content designation data, there are the concrete contents of edit for processing print number of sheets and static image data, for example. The directions about the trimming of a image, expansion/reduction, synthesis with the material of a frame or others, the whole layout, etc. are included in the contents of edit. The appendix conditions 125 which accompany the image data to be output are contents which is necessary for directing with image data to a printing means so that a printed article is outputted as order, and for example, items, such as a kind of print number of sheets, size, and paper, are included.

The static image data 121 and the order contents 122 transmitted to the output content designation data producing means 114, when the directions which should process a static image are included in order contents, are delivered to the editing means 131 with which the output content designation data producing means 114 was equipped, and edition is performed, and the image data 124 recorded in the image to be output generates. When the directions which should print the static image recorded on the static image data specified as order contents by the above mentioned static image data specifying means 112 as it is are included, the static image data 121 itself is recognized as image data 124 which records the image to be output at the output content designation data producing means 114. Moreover, some order contents are recognized as conditions 125 which accompany the image data 124 to be output.

The editing means 131 is realizable by executing the program stored in memory storage, such as a memory and a hard disk, by computer. Moreover, the materials, such as a frame design which is synthesized with the a static image in edition, can accumulate in a material database which can construct in memory storage, such as a hard disk of a computer. When an advanced edit function is not required to the dynamic image shot printing system of this invention, and only to choose a best shot from a dynamic image, and to print it as it is required, the editing means 131 may be omitted.

The output content designation data 123 generated by the output content designation data producing means 114 is transmitted to the printing means 115, and a shot image is printed as order. As the concrete output method of the printing means 115, for example, an outputting method suitable for printing based on digital image data, such as the sublimation type thermal transfer method, the melting type thermal transfer method, and the ink jet, can be utilized.

In the image printing system 102 of the present invention, a fee charging means 132 may be provided for collecting the fee for outputting and providing an image. In case the fee charging means is provided, the fee charging means is driven after driving the order content inputting device, more preferably after driving the image editing means 131 if the image editing is performed and before outputting a printed article by the drive of the printing means 115. It is preferable to show the amount to be collected by the fee charging means to a user on the display device (not shown) together with the order content.

When the customer inserts a bill and/or a coin in the fee charging means according to the guide of the amount display by the display device, the fee charging means calculates the accepted amount and returns the change if any.

The fee collection means 132 can be constituted combining suitably a coin and bill discernment device, change return device, the computer that manages a fee collection state.

A receipt producing means may be provided in the fee charging means. The receipt producing means automatically produces the receipt having the collected amount and the order content printed thereon after completing the fee collection by the fee charging means. The receipt producing means may further comprise a receipt producing eliminating means so that the producing of the receipt can be eliminated selectively in case the customer does not need the receipt. In this case, after completing the collection of the fee, an operation guidance "Would you line a receipt published?" or the like is displayed on the display device (not shown) so that the user presses a corresponding touch panel button or keyboard for executing the choice of producing or not producing.

Next, the construction of apparatus capable of carrying out this invention will be explained through an example of construction of apparatus capable of carrying out the shot image printing system 102 shown in FIG. 46.

Figure 47:
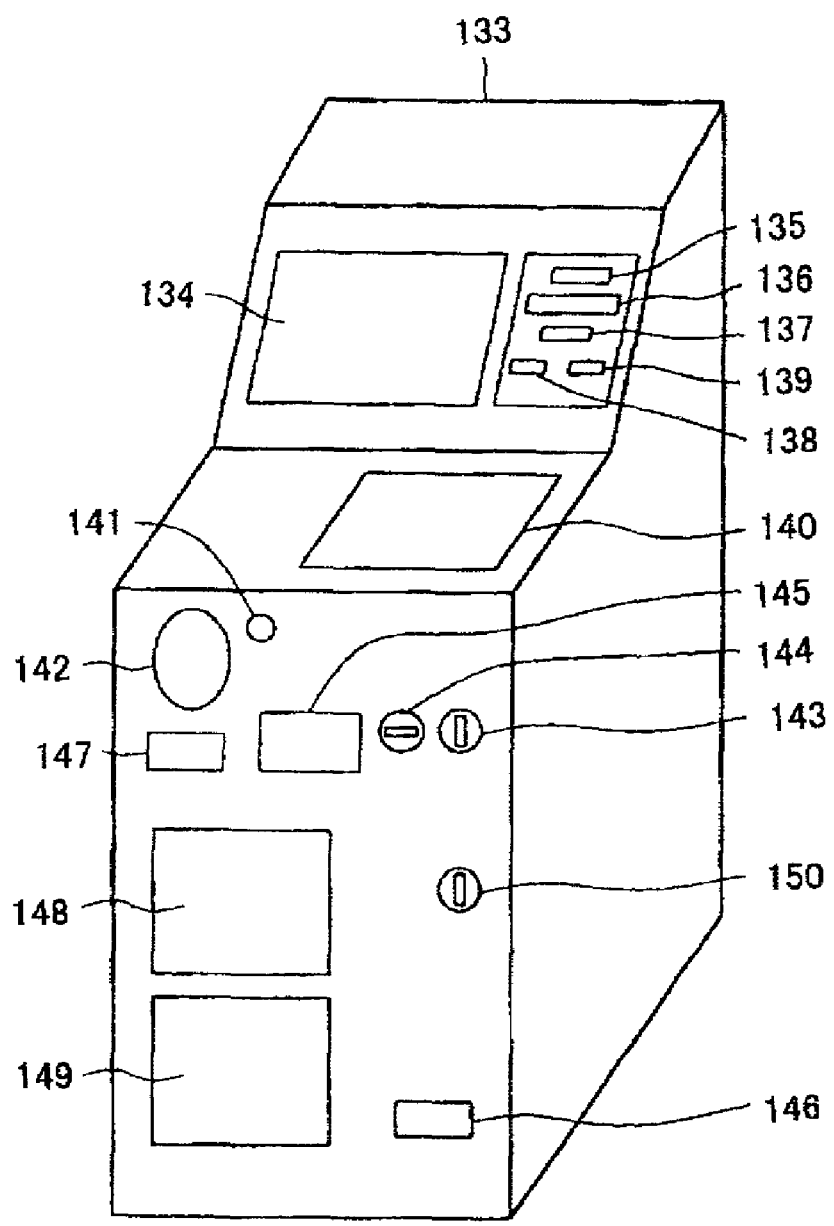
FIG. 47 is a perspective diagram showing an example of apparatus which carries out the image printing system according to the second aspect of this invention.

FIG. 47 shows the external appearance of the post type image outputting apparatus 133 used as the printing system 102. In FIG. 47, a screen of a monitor 134 with a touch panel is disposed on the upper front surface of the post type image outputting apparatus 133. The monitor 134 with a touch panel may be a CRT or liquid crystal panel. The monitor 134 with a touch panel performs as a display device for displaying the operation guidance, the operation state, the read out dynamic image, specified static image, the processed image or the like as well as a device for the inputting operation for inputting an order content including the search items of the event information or the like.

Insertion ports 135 to 139 for various recording media are provided sideways to the monitor 134 with a touch panel A scanner reading surface 140 is provided on a horizontal part dividing the upper part and the lower part for reading the image of a printed article and processing the same to digital data. In this embodiment, these are a part of the image data inputting means. In this embodiment, as the insertion ports for the various recording media, specifically, a flexible disc insertion port 135, a CD-ROM insertion port 136, a PC card insertion port 137, a smart medium insertion port 138, and a compact flash insertion port 139 at a position on the whole. Moreover, the main bodies of each reading device are installed inside the housing of the post type image outputting apparatus 133 corresponding to the insertion port of each recording medium. A shutter (not shown) may be provided on each insertion port so that the recording medium cannot be taken out until collection of the fee is completed.

In the lower part of the post type image outputting apparatus 133, a maintenance key 141, a speaker 142, a coin insertion port 143, a coin return lever 144, a bill insertion port 145, a change return port 146, a receipt outlet port 147, a printed article (for standard printing) outlet port 148, a printed article (for pre-cut seal) outlet port 149, and a front door opening/closing key 150 are disposed. The maintenance key 141 is a key for switching an ordinary drive mode capable of accepting a customer, and an administration mode for setting the image printing system or maintenance by an administrator. The speaker 142 is for reproducing the sound, BGM, effect sound or the like while waiting or operation.

In this embodiment, the coin insertion port 143, the coin return lever 144, the bill insertion port 145, and the change return port 146 constitutes a part of the fee charging means. A customer would pay for the fee by inserting a coin in the coin insertion port 143 and/or inserting a bill in the bill insertion port 145. In case there is a change, it is discharged from the change return port 146 so that it is received by the customer. Moreover, In case a coin is choked, it is discharged from the change return port 146 by turning the coin return lever 144 so that it is received by the customer.

In this embodiment, the receipt outlet port 147 constitutes a part of the receipt producing means and the order receipt note producing means. After collecting the fee by the fee charging means, a receipt with the collected amount and the order content printed is discharged from the receipt outlet port 147.

In this embodiment, the printed article (for standard printing) outlet port 148 and the printed article (for pre-cut seal) outlet port 149 constitute parts of the printing means. After the customer inputs the command for printing, by touching any button of the touch panel, or so, the customer may receive a printed article discharged from the printed article outlet port 148 or the printed article outlet port 149.

By turning the front door opening/closing key 150, the front door is opened so that the maintenance work for each device installed inside the housing can be executed. In the housing of the post type image outputting apparatus 133, each main body is installed corresponding to the screen of the monitor with a touch panel, the insertion port, and the scanner reading surface. A volume adjusting part is installed corresponding to the speaker 142. Corresponding to the coin insertion port 143, the coin return lever 144, the bill insertion port 145, and the change return port 146, a coin mech (coin processing device) for identifying the coins, storing, and returning the change, a bill bari (bill processing device) for identifying the bills, and storing, and a safe for storing the coins in case the coin mech is fill, are installed. Corresponding to the receipt outlet port 147, a receipt printer is installed. Furthermore, corresponding to the printed article outlet port 148, and the printed article outlet port 149, a printer is installed respectively.

Moreover, although it is not apparently recognized by the external appearance, inside the housing of the post type image outputting apparatus 133, a personal computer including a control unit for controlling each device in the image outputting apparatus 133, a power source box for converting the voltage, an interruptible power supply device for preventing breakage of the CPU, the hard disc or the like In the control unit at the time of blackout or the like are installed.

Figure 48:
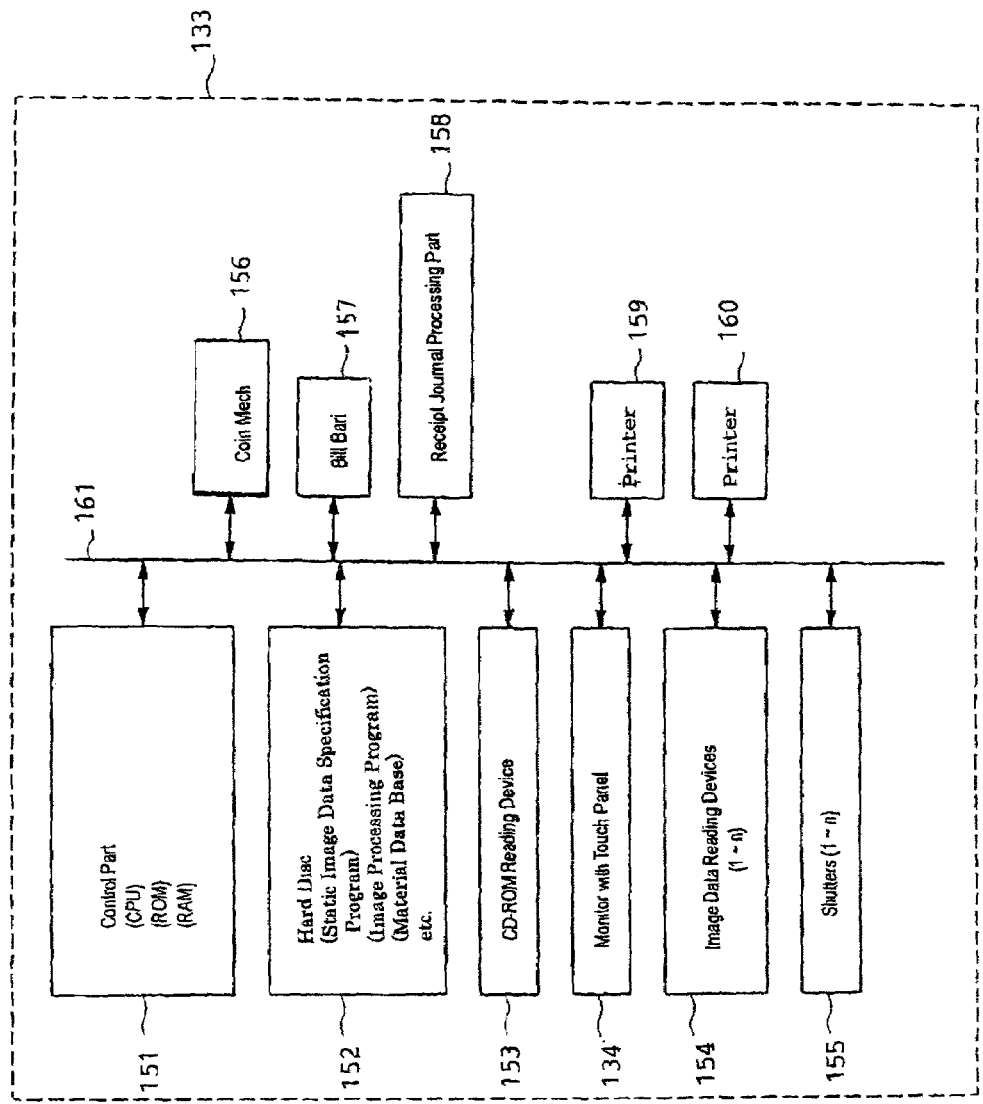
FIG. 48 is the block diagram showing an embodiment of the image printing system according to the second aspect of this invention.

FIG. 48 shows a block diagram of shot image printing system 102 stored in the post type image outputting apparatus 133 shown in FIG. 47. In this embodiment, the post type image outputting apparatus 133 comprises a control unit 151, a hard disc 152, a CD-ROM reading device 153, a monitor 134 with a touch panel, n sets of image data reading devices 154, n sets of shutters 155, a coin mech 156, a bill bari 157, a receipt journal processing part 158, and two sets of printers 159, 160, and connected via a bus 161.

The control unit 151 of the post type image outputting apparatus 133 comprises a CPU, a ROM, and a RAM for controlling the drive of the devices connected via the bus according to a program stored in the hard disc 152 as a large scale memory medium. In the hard disc 152, programs for controlling the drive of the devices, such as a reading program corresponding to each recording medium, an opening/closing control program for the shutters, a fee charging program or the like, as well as a static image specification program for specifying a best shot from the dynamic image input by replaying the dynamic image and selecting the desired scene, an image processing program for processing an input image, a material data base storing information of frames to be used for the image synthesis, or the like, are stored so as to be read out as needed and stored in the RAM for driving various devices The CD-ROM reading device 153 is used for upgrading the version of programs or any information stored in the ROM or the hard disc of the post type image output apparatus such that a CD-ROM for upgrading the version is inserted in the CD-ROM reading device 153 for rewriting the data with the terminal part switched to the administration mode by the maintenance key.

In FIG. 48, by selecting and executing the touch panel buttons displayed on the monitor 134 with a touch panel according to the operation guidance displayed on the monitor 134 with a touch panel, a series of the operation for choosing of the printing mode and reading of the dynamic image data to the output of a printed article can be executed. In this embodiment, first, the menu of the printed article is selected according to the operation guidance displayed on the monitor 134 with a touch panel and in case the touch panel button is pressed, an operation screen for guiding the input of the image data is shown on the monitor 134 with a touch panel. The customer can direct which shall be used between a dynamic image data or static image data as original image data in this guidance screen.

The image data reading devices 154 include various reading devices 1 to n corresponding to various kinds of recording media so that the customer can input dynamic image datum or static image datum recorded in a recording medium the customer has into the terminal part 2 by using the corresponding reading device, after the designation of either the dynamic image or the static image to be read in the above guidance screen. The image data reading devices 154 also include a scanner so that an static image can be read out from a printed article, processed to be digital data, and inputted into the post type image output apparatus 133. In case the Image data reading devices 55 are not dedicated for reading but also they can record image data in a recording medium, the customer can store the image data of the edited image produced by operating the post type image output apparatus 133 and take it home with the customer. The shutters 155 are provided at the recording medium insertion ports of the reading devices 1 to n so that the taking out operation of the recording medium can be prohibited during the reading process, or until the fee charging process is completed by port or closing the recording medium insertion port.

When the dynamic images provided by the customer are inputted as digital data using the image data reading devices 154 according to the operation guidance on the monitor 134 with a touch panel, the static image specification program is performed and the customer can choose the static image data which records the scene be printed or the static image data which records the image used as the material for editing the image to be printed. According to operation guidance of the monitor 134, the dynamic image input is reproduced on the screen of the monitor 134 in order to search the scene of best shot. Once the customer finds out his favorite scene, he may push the button which choose static image data, and thus, the customer can choose 1 or more static image data. At this time, playback speed can be made late, or a dynamic image can be stopped, so as that a best shot can be chosen easily.

The screen of the monitor 134 with touch panel is divided into two, and at one of them the dynamic image replays and at the other side the selected static images display in the thumb nail images as a list. The customer may delete a part of the temporary static image data, replace the order, or add another static image in any position, and finally he can specify the static image to be adapted.

An dynamic image is reproduced by one side of the screen which the screen of the monitor 134 with a touch panel is divided, and was divided, and a list indication of the selected static image is given in the form of the thumb nail image at another side. A user deletes a part from the static image data by which chose temporarily and it was indicated by the list, replaces an order, adds static image data to arbitrary ranting, and can specify the static image data which should finally be adopted.

When an static image is specified, an image processing program is executed according to a printing menu already selected. The customer can process the image, such as reduction, enlargement, rotation, deformation, synthesis with another image or the like according to the operation guidance on the monitor 134 with a touch panel. At the time, image materials stored in the material data base, such as picture frames can be utilized as well.

After completion of the edit of the image, according to the operation guidance on the monitor 134 with touch panel, the order content other than the printing menu and the process content, such as the number of prints, the print size or the like, is inputted. Also at this time, the order content can be input by pressing a button or ten keys displayed on the touch panel. In case a printing menu not requiring the edit of the original image is selected at the time of the start, the operation screen for guiding the edit operation is eliminated so that the operation guidance for guiding the other order content is displayed immediately.

After all the order content is inputted, on monitor 134 with the touch panel, the screen for the charged fee is displayed together with the order content and the fee payment is requested. When a coin is inserted and/or a bill is inserted to the post type image output apparatus 133 according to the payment request, the coin mech 156 and/or the bill bari 157 are driven so as to execute the fee charging process such as judgment of genuineness of the coin or bill inserted to the post type image output apparatus 133 for the fee payment, the judgment of the kind thereof, the amount calculation, the discharge of the change or the like. After finishing the fee charging process, the receipt journal part 154 prints the printing menu, the collected fee amount or the like on a receipt paper and discharges the receipt. The system can be set so as to eliminate the drive of the fee charging means in case request of the fee payment is not needed.

After the discharge of the receipt, the shutter is opened so as to enable taking out of the inserted recording medium so that the operation screen for guiding the take-out of the recording medium is displayed on the monitor 134. When the recording medium is taken out, a printed article Is output by the printer 159 or 160. The printer 159 can output a standard size printed article with a standard image quality, and the printer 160 can output a pre-cut seal printed article.

Next, the motion of the dynamic shot printing system of the present invention will be explained with reference to a flow charts and the indication on the monitor 134 with a touch panel, as the post type image output apparatus 133 shown in FIGS. 47 and 48.

In the embodiment of the image printing system according to the present invention, a start screen as shown in FIG. 8 is displayed on the screen of the monitor 134 with a touch panel in the post type image out put apparatus 133. In case an optional position of the start screen is touched by a hand, a main menu screen as shown in FIG. 9 is indicated. In case the main menu screen is left for a predetermined time, it returns to the start screen. In the main menu screen, the kinds of the printed articles to be selected are shown. Specifically, touch panel buttons for the "digital photo", the "frame synthesis", the "index print", the "seal", the "certification photograph", and the "postcard print" are shown in the upper and lower two rows. In the main menu screen, if "photo edit" is chosen, the printed article of the image plus event information can be created.

In case the "digital photo" is selected in the main menu screen and the touch panel button thereof is touched, a print out can be provided by reading the dynamic or static image data from a smart medium, a PC card, a compact flash card, a CD-ROM, or a flexible disc (FD), or reading the image data from a printed article such as a photograph using a scanner.

In case the "flame synthesis" is selected, a print out can be provided by reading the dynamic or static data from a smart medium, a PC card, a compact flash card, a CD-ROM, or a flexible disc (FD), or reading the image from a printed article such as a photograph using a scanner, and synthesizing the read out image with a frame which is provided by the system.

In case the "index print" is selected, an index print with a thumb nail image displayed can be printed out by reading the image data from a smart medium, a PC card, a compact flash card, a CD-ROM, or a flexible disc (FD).

In case the "seal" is selected, a pre-cut seal can be printed out by reading the dynamic or static image data from a smart medium, a PC card, a compact flash card, a CD-ROM, or a flexible disc (FD), or reading the image data from a printed article such as a photograph using a scanner, and synthesizing the read out image and a frame prepared by the system side. In the pre-cut seal, a plurality of small screens (frames) of the same image are printed, with each small screen divided by half cut.

In case the "certification photograph" is selected, an image for the certification photograph is taken by a digital camera in the store so as to be stored In a flexible disc, and then, the stored image data are read out by the main body so that they can be printed out after selecting the size from the driver's license size, the curriculum vitae size, the passport size, and the visa size, and selecting color or monochrome.

In case the "post card print" is selected, a print can be provided by reading the dynamic or static image data from a smart medium, a CF card, a flexible disc (FD), a PC card, or a CD-ROM, or reading the image data from a printed article such as a photograph using a scanner, producing the postcard data by processing the read out image, and reading the postcard data from the recording medium storing the same.

Figure 49:
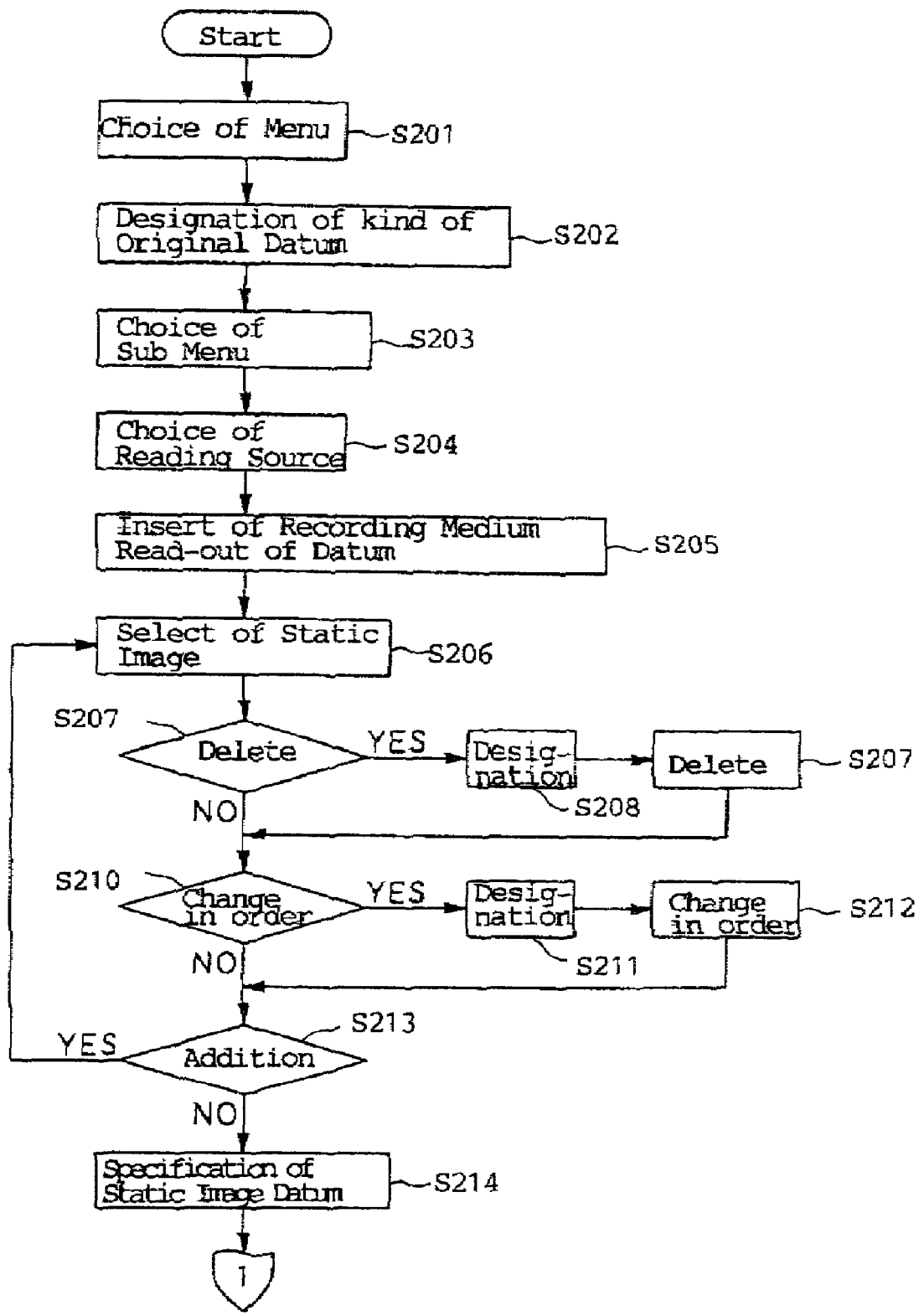
FIG. 49 is the flow chart which shows the first half of the procedure of a digital photograph in an embodiment of the image printing system according to the second aspect of this invention.
Figure 50:
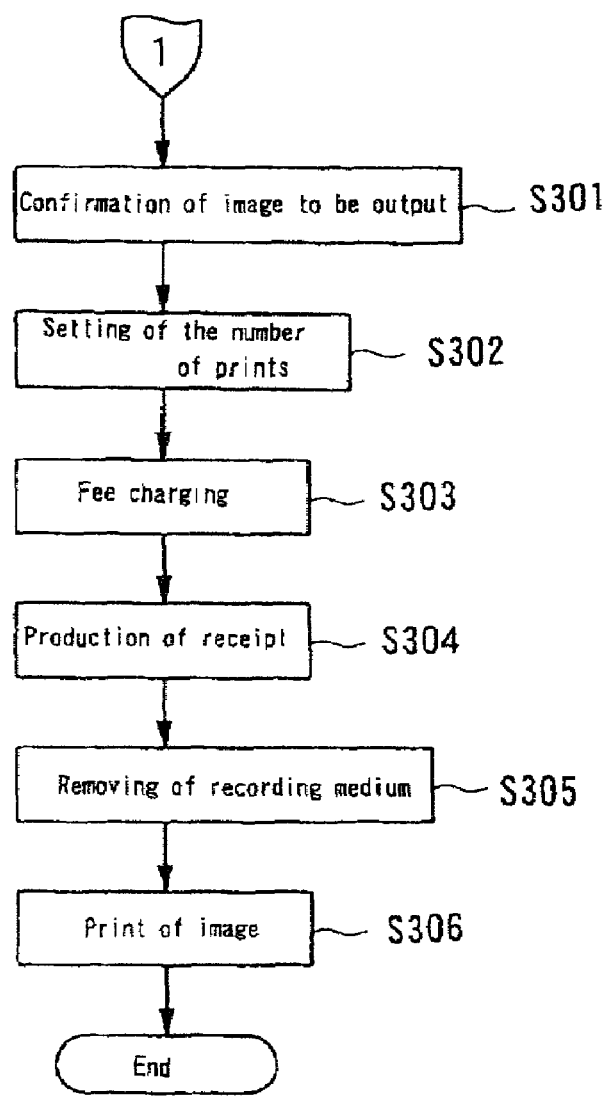
FIG. 50 is the flow chart which shows the second half of the procedure of a digital photograph in an embodiment of the image printing system according to the second aspect of this invention.

First, the procedure in case the "digital photo" is selected will be explained. In the main menu screen shown in FIG.9, if the "digital photo" position is touched by a hand, the "digital photo" procedure shown in FIGS. 49 and 50 is started (S201), In each operation screen to be indicated after the start of the "digital photo" procedure, in principle, a "cancel" button and a "return to the previous screen" button are provided so that it can return to the start screen by pressing the "cancel" button, and it can return to the operation screen of the previous step by pressing the "return to the previous screen" button so as to enable change of the operation.

Figure 53:
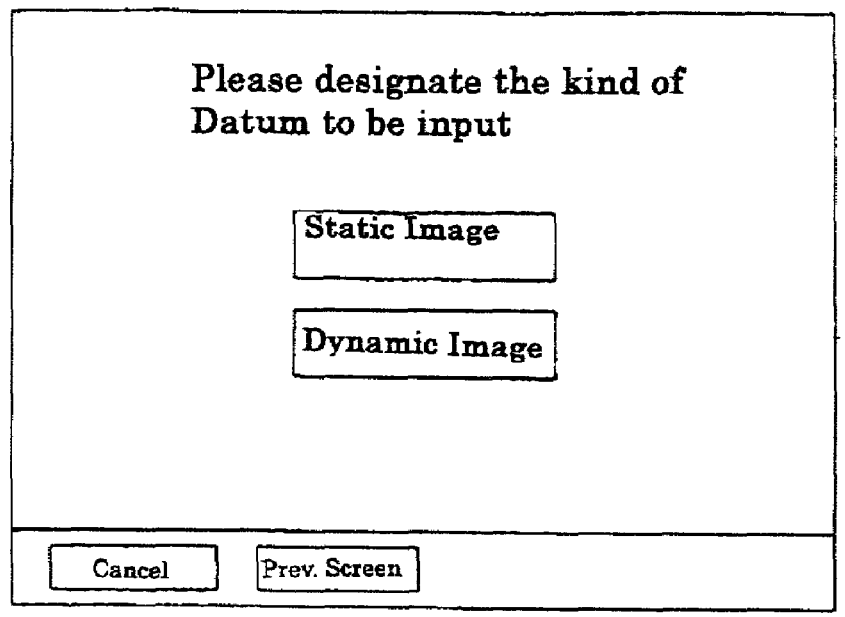
FIG. 53 is the screen which the kind of original data specifies in an embodiment of the image printing system according to the second aspect of this invention.

In case the "digital photo" procedure is started, as shown in FIG. 53, the operation screen which designates the kind of original data is displayed, and either a static image or the dynamic images can be designated (S202). The message of "please designate the kind of data to be input" is shown laterally in the uppermost row in the operation screen at this time, and therebelow each touch-panel button of a "static image" and an "dynamic image" are perpendicularly arranged, and "cancel" button and the button "return to previous menu" are provided in the lowermost row.

Figure 54:
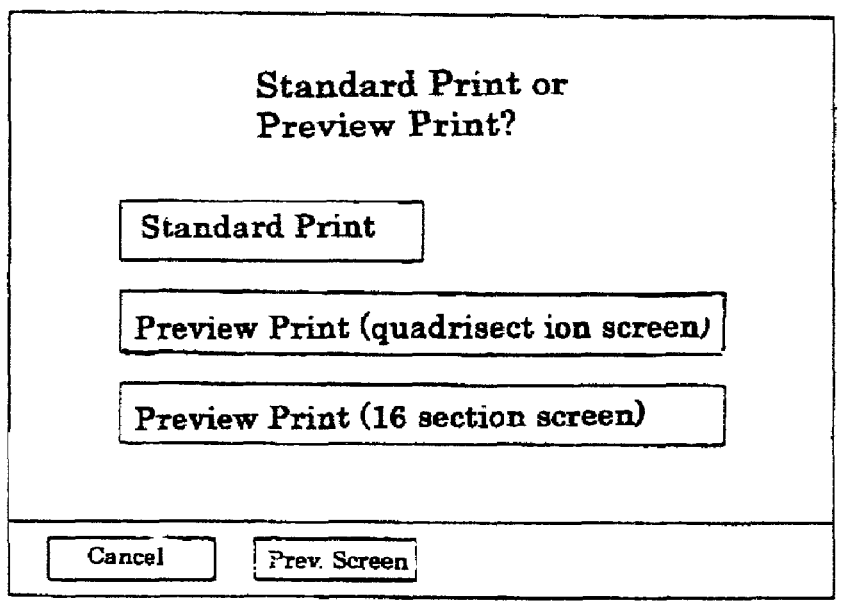
FIG. 54 is the screen which specifies a printed article to be output in an embodiment of the image printing system according to the second aspect of this invention.

When a dynamic image data is designated in this screen, as shown in FIG. 54, the operation screen of the sub menu which asks which shall be created between a standard print and a preview print will be displayed (S203). In the operation screen at this time, the message of "Standard print or preview print?" is shown laterally in the uppermost row, and therebelow, each touch-panel button of a "standard print", "preview print (quadrisection screens)", and "a preview print (16 section screens)" are arranged perpendicularly, and "cancel" button and the "return to previous menu" button are provided in the lowermost row.

Here, a standard print prints one shot image on one screen On the other hand, a preview print prints two or more shot images on one screen wherein the images are put in order, and for example, the continuation photographic playback showing a decomposed swing operation of golf may correspond to this type. Although a preview print are used as 4 section screen or 16 section screen as shown in the operation screen of FIG. 54, the number of section screen can be arbitrarily changed into a printing system by setup.

Figure 55:
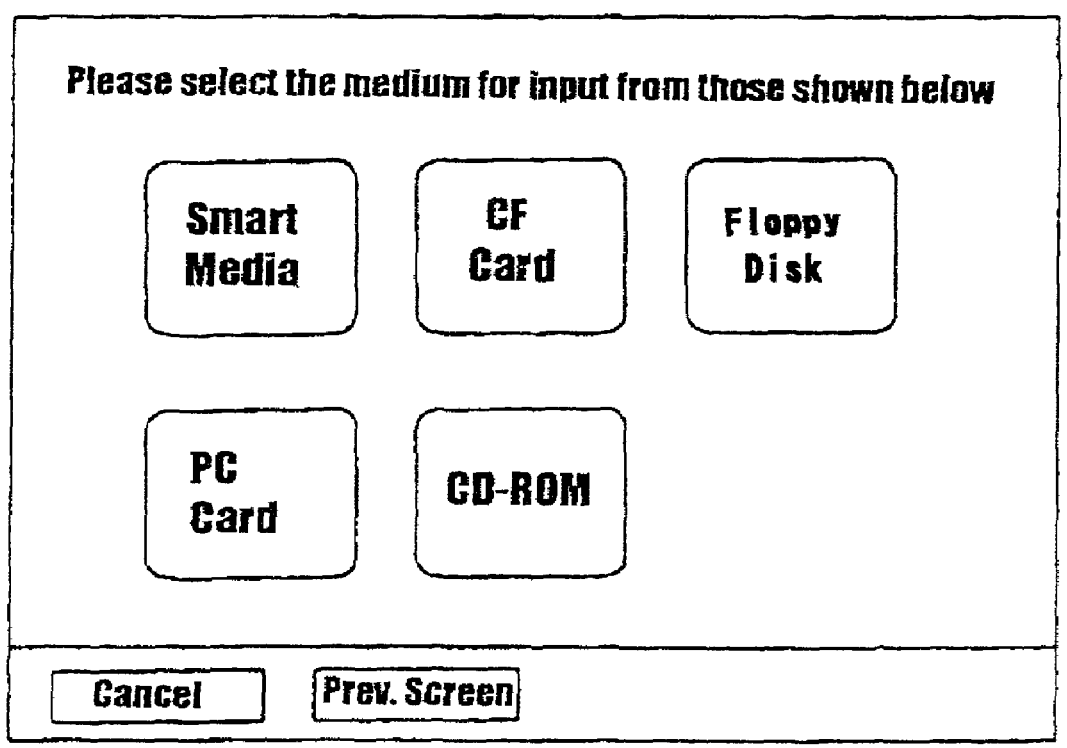
FIG. 55 is the screen which chooses image data's reading source in an embodiment of the image printing system according to the second aspect of this invention.

In this screen, if one of print form is designated, as shown in FIG. 55, an operation screen with the image data reading sources shown is indicated so that a reading source can be selected (S204). In the operation screen at the time, the message "please select the medium for input from those shown below" is shown laterally in the uppermost row, and therebelow, the touch panel buttons each with the name of the smart medium, the compact flash card (CF card), the flexible disc, the PC card, and the CD-ROM are shown. In the operation screen shown in FIG. 53., when a static image is chosen as original data, the touch-panel button which attached the name of a photograph (scanner) is displayed further In the operation screen, in case a touch panel button is touched by a hand, the corresponding reading source is selected.

If any of the reading sources is selected from the smart medium, the CF card, the flexible disc, the PC card, and the CD-ROM, the operation screen showing the inserting method corresponding to the selected recording medium is indicated so that the recording medium can be inserted and the dynamic image can be read out (S205).

In the operation screen in case the smart medium is selected, as shown in FIG. 12, the message "please set the smart medium and press the reading start" is shown laterally in the uppermost row, and a "reading start" button is provided in the lowermost row together with the "cancel" button and the "return to the previous screen" button. Similarly, in case the CF card is selected, the operation screen shown in FIG. 13 appears. In case the flexible disc is selected, the operation screen shown in FIG. 14 appears. In case the PC card is selected, the operation screen shown in FIG. 15 appears. And in case the CD-ROM is selected, the operation screen shown in FIG. 16 appears.

In case a recording medium is inserted in the predetermined insertion port according to the guidance of the operation screen and the reading start button on the touch panel is touched by a hand, the insertion port with the recording medium inserted Is closed by the shutter so as to start the reading operation of the image data.

Figure 56:
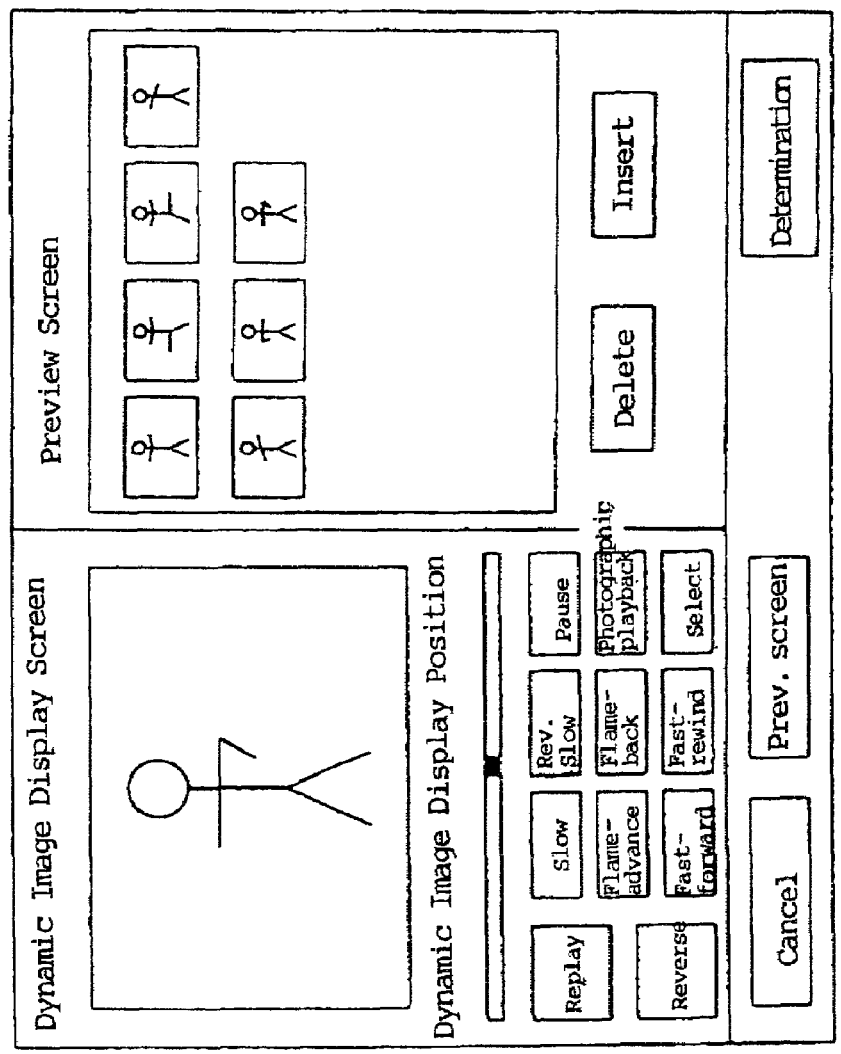
FIG. 56 is a screen for specifying static image data from dynamic image data in an embodiment of the image printing system according to the second aspect of this invention, it.

After reading of a dynamic image data is completed, as shown in FIG. 56, the operation screen which specifies a best shot from the countless scene included in the dynamic image appears, and static image data can be chosen (S206). The operation screen at this time is divided into right and left. On the left-hand side of the operation screen, the dynamic image display screen which replays a dynamic image, the scale in which the display position (relative lapsed time to all reproduction time) of a dynamic image, and the touch-panel button group for directing reproduction of a dynamic image and selection of static image data was perpendicularly arranged, and on the right-hand, the preview screen which indicates by list the scene (static image) and touch-panel button group for performing choice of selected static image data and making a change of accumulation ranking is perpendicularly arranged. The "Determination" button, as well as the "return to the previous screen" button and the "cancel" button is provided to the lowermost row of an operation screen.

In this operation screen, if the replay button is pushed, the dynamic image will be reproduced on a dynamic image display screen, and if the reverse button will be pushed, reverse play will be carried out. The slow button makes playback speed late and the reverse slow button makes reverse play speed late The frame-advance button playback each scene of a dynamic image frame-by-frame, the frame-back button returns each scene of a dynamic image frame-by-frame. The fast-forward button playback the dynamic image at high speed and the fast-rewind button reverse the dynamic image at high speed. The pause button makes a dynamic image temporary stop, and fixes one scene, and displays it on a screen.

Figure 57:
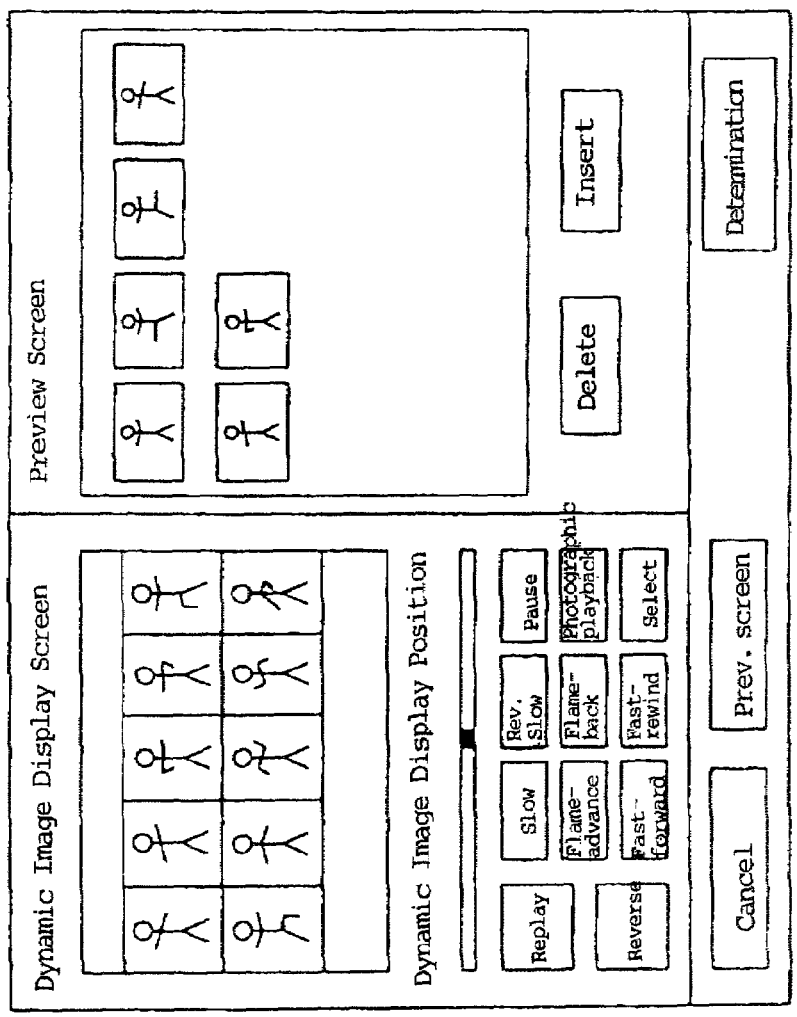
FIG. 57 is another screen for specifying static image data from dynamic image data in an embodiment of the image printing system according to the second aspect of this invention.

The photographic playback button make a display of photographic playback which displays several frames of scene continuously wherein a scene reproduced when the button concerned Is pushed becomes the basal frame, namely, as the starting point, the middle point, or the terminal point and it is in the form of continuation photographic playback. The usual reproduction will be resumed if the replay button is operated after operating the photographic playback button and displaying the photographic playback. In the example of FIG. 57, when the scene of FIG. 56 is reproduced by the dynamic image display screen, the photographic playback button is operated, and several scenes before and after the scene of FIG. 56 are displayed by making the scene of FIG. 56 into a middle point.

When a best shot appears on a dynamic image display screen, the static image data of a best shot can be chosen by operating the selection button. Usually, after pushing a pause button and fixing the image of a wish when it is made a slow motion and frame-by-frame advance and a best shot appears further if a reproduction button and a fast forward button are pushed, a dynamic image is reproduced and the scene of a best shot is approached, the static image data of a best shot can be easily chosen by pushing a selection button. When the reproduction screen has passed the best shot, it can wait to rewind by the inversion button or the rewind button, to make inversion speed late with a reverse slow button or a top return button if needed, and for a best shot to return. Moreover, when continuation photographic playback as shown in a dynamic image display screen in FIG. 57 is displayed, the surface of each photographic playback is a touch panel, and after touching and specifying a hand to be a favorite top, static image data can be chosen by touching a selection button.

A list of the static image which are selected by the operation of the selection button, chose and was accumulated is given on the preview screen in right-hand side. Early accumulation ranking is given to the selected order and each static image data is arranged in the direction of the right from the left in the uppermost row of a preview screen, henceforth, lowers the stage and is arranged rightward from the left one by one. In printing a preview image, the arrangement displayed on this preview screen turns into arrangement of each picture frame in a preview image as it is.

Each static image data which the selection button was operated and was chosen is in the state still accumulated temporarily. The frame of each static image arranged on the preview screen is in function to a touch-panel button, and can be deleted by touching and specifying a hand to be the frame of a static image which is not pleased, and touching a deletion button (S207, S208, S209). Moreover, by touching and specifying a hand to be a frame to make it move, touching an insertion button and touching the frame in the ranking of a change place with a hand after that changing an accumulation order, other frame advance according to movement of the specified frame by the ability making it move to the change place of a wish of the specified frame, or it winds and falls (S210, S211, S212).

Moreover, after making the deletion and ranking change of static image data which are accumulated, additional selection of the still newer static image data can be carried out (S213). The direct addition of the static image data can be carried out at the accumulation ranking of a wish by pushing an insertion button first, touching the frame in ranking adding to the next with a hand, and specifying an additional position, and operating a selection button, and choosing new static image data to add static image data to predetermined accumulation ranking directly.

Thus, if choice of static image data and correction of accumulation ranking end, a determination button is pushed and static image data is specified (S214). Although static image data can be accumulated until fill the preview screen, it is not necessary to accumulate until it fills. Even when a standard print is specified in the screen of FIG. 54, two or more static image data can be specified, in that case, the parallel processing of two or more static image data is carried out in a following process, and the shot image from which a scene differs can be printed as an independent printed article. Moreover, when a preview print (four section screens) or a preview print (16 section screens) is specified in the screen of FIG. 54, several number of the specified static image data can be accumulated. For example, when a preview print (four split screens) is specified, static image data can be accumulated to four.

Figure 58:
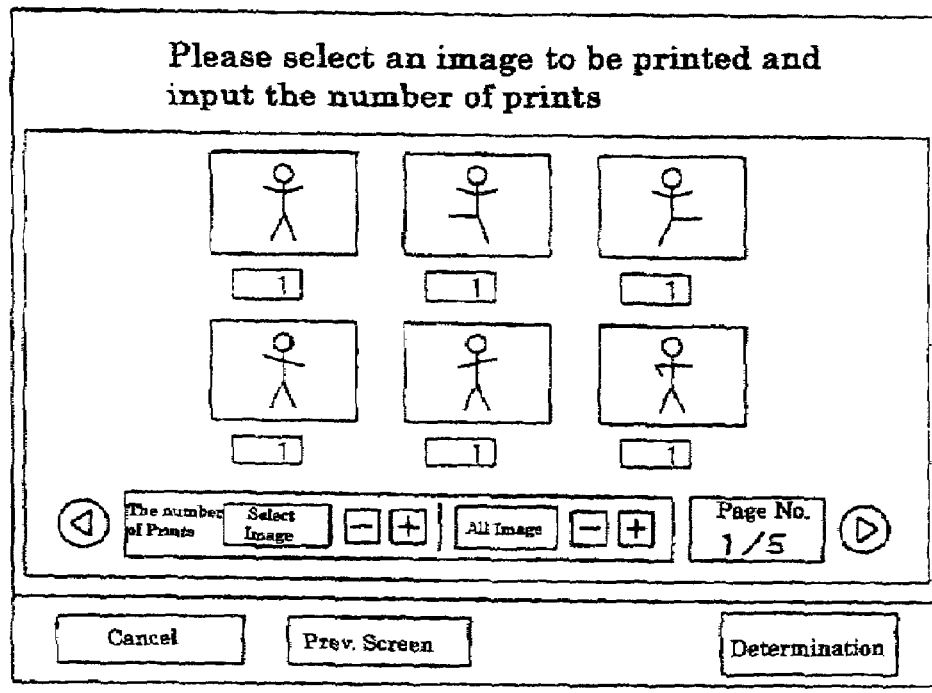
FIG. 58 is the screen which sets up the print number of sheets of a image in an embodiment of the image printing System according to the second aspect of this invention, it.
Figure 59:
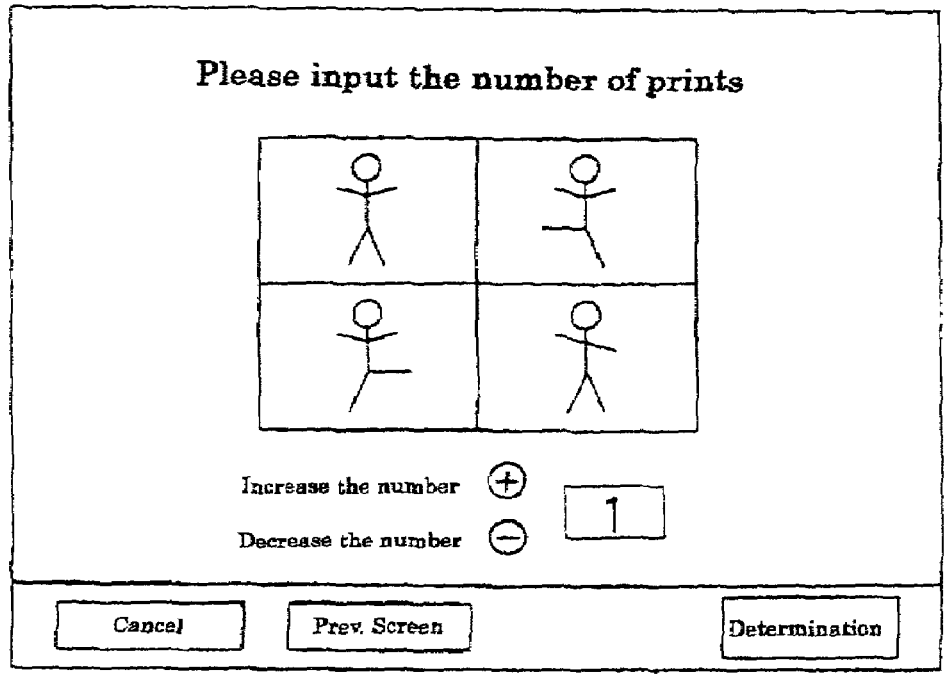
FIG. 59 is another screen which sets up the print number of sheets of a image in an embodiment of the image printing system according to the second aspect of this invention.

When static image data is specified, operation screens as shown in FIG. 58 or FIG. 59 appear and being able to check the image to be output, print number of sheets is specified (S301, S302). When a standard print Is designated in the operation screen of FIG. 54, as shown in FIG. 58, the operation screen which indicated the thumb nail image of all the specified static images by the list appears.

In the operation screen at the time, the message "please select the image to be printed, and input the number of prints" is shown laterally In the uppermost row, and therebelow, total 6 thumb nail images are shown in the two rows laterally, with the column for inputting the number of prints provided to each thumb nail image. Below the thumb nail images, "+" and "−" buttons for increasing or reducing the number of prints, and "+" and "−" buttons for the total images are provided. By selecting a thumb nail image on the screen for selecting the image, and touching the "+" and "−" buttons for the "selected image", the number of prints for the selected image can be increased or reduced individually. In contrast, by touching the "+" and "−" buttons for the total images, the number of prints can be increased or reduced for all the images displayed on the screen.

In case the number of the thumb nail images so large than they cannot be shown on one screen, all the thumb nail images are shown, divided in a plurality of pages. The page number currently appearing on the screen and triangular scroll buttons for moving forward or backward among the pages are displayed on the screen in the same row as the buttons for increasing or reducing the number of prints. Moreover, in the lowermost row of the operation screen at the time, a "determination" button is provided together with the "cancel" button and the "return to the previous stage" button. By selecting the images to be printed in the operation screen, setting the number of prints for each image, and pressing the determination button, the order content is set.

On the other hand, when a preview print is specified in the operation screen of FIG. 54, as shown In FIG. 59, the preview image to be output is displayed. In addition, the preview image of four split screens is displayed in this example. In the operation screen at the time, the message "please input the number of prints" is shown laterally in the uppermost row, and therebelow, a preview screen of 4 section screen are shown, and below the 4 section screen, "+" and "−" buttons for increasing or reducing the number of prints, and the column for inputting the number of prints is provided. In the lowermost row of the operation screen at the time, a "determination" button is provided together with the "cancel" button and the "return to the previous stage" button. By setting the number of prints, and pressing the determination button, the order content is set.

When the order content is set, as shown in FIG. 43, the guidance screen for charging the fee appears for executing the fee charging process (S303). In the guidance screen for the fee charging process, the message "please insert money" is shown laterally in the uppermost row, and therebelow, the number of order, the fee for one sheet (unit price), the total amount (sum of the charged amount), and the inserted fee (inserted amount) are shown laterally from above successively in fourth rows. When the amount inserted in the coin insertion port and/or the bill insertion port according to the explanation on the guidance screen reaches or exceeds the total charged amount, in case it is a mode for only confirming the total amount, the change is discharged from the change discharging port as needed, and the guidance screen for requesting the fee charge content appears as shown in FIG. 44. In the guidance screen at the time, the message "if it is okay, please press the confirmation button" Is shown laterally in the uppermost row, and therebelow, the number of order, the fee for one sheet, and the total amount are shown laterally from above successively in three rows. In the lowermost row, the "confirmation" button is provided together with the "cancel" button and the "return to the previous screen" button. In the guidance screen, in case the confirmation button is touched, the fee charging process is completed so as to move to the next step.

When the fee charging process is completed, the fee receipt is published so as to be discharged from the receipt outlet port (S304). After producing the receipt, the operation screen for removing the recording medium, which is the reading source of the image data, appears, and furthermore, in case the recording medium is inserted In the reading machine, the shutter of the insertion port is opened (S305). As shown in FIG. 30, in the operation screen in case the smart medium Is inserted, the message "please remove the smart medium and press the printing start" is shown laterally, and the "printing start" button is provided in the lowermost row. Similarly, in case the CF card is inserted, the operation screen as shown in FIG. 31 appears. In case the flexible disc is inserted, the operation screen as shown in FIG. 32 appears. In case the PC card is inserted, the operation screen as shown in FIG. 33 appears. And in case the CD-ROM is inserted, the operation screen as shown in FIG. 34 appears.

Figure 60:
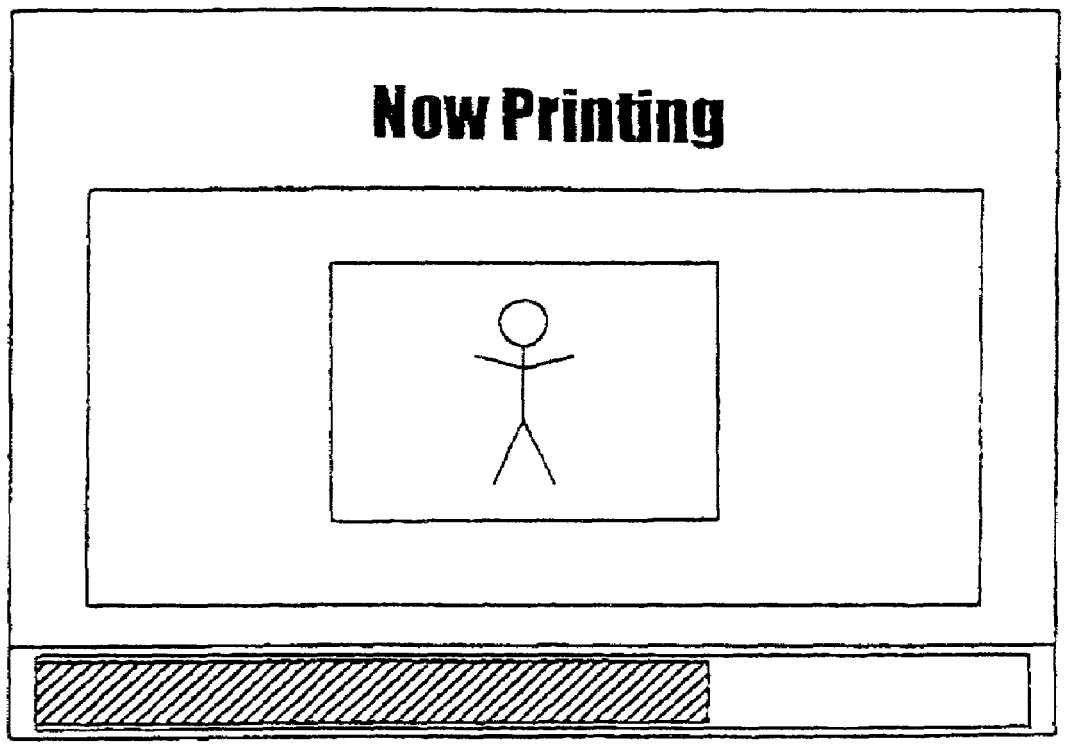
FIG. 60 is a guidance screen under print execution in an embodiment of the image printing system according to the second aspect of this invention.

In case the recording medium inserted in the reading machine is removed and the printing start button is touched according to the guidance on the operation screen, the printing is started by the printer installed in the post type image output means (S306). During the printing process, the guidance screen as shown in FIG. 60 appears. In the guidance screen at the time, the message "now printing" is shown laterally in the uppermost row, therebelow, the image being printed is shown, and below the image, a time line roughly indicating the proceeding state of the printing process is lit. When the printing process is finished, the printed article of the shot image is discharged from the printed article outlet port (standard printing) of the main body, and the finish screen as shown in FIG. 37 appears. The finish screen in the meantime returns to the start screen.

In addition, when a static image is specified as original data in the operation screen of FIG. 53, all the static images currently recorded on recording media are read, and an operation screen as shown in FIG. 58 appears, it is indicated by list in the form of the thumb nail image, a image to print is chosen, and print number of sheets can be specified for every image.

Figure 51:
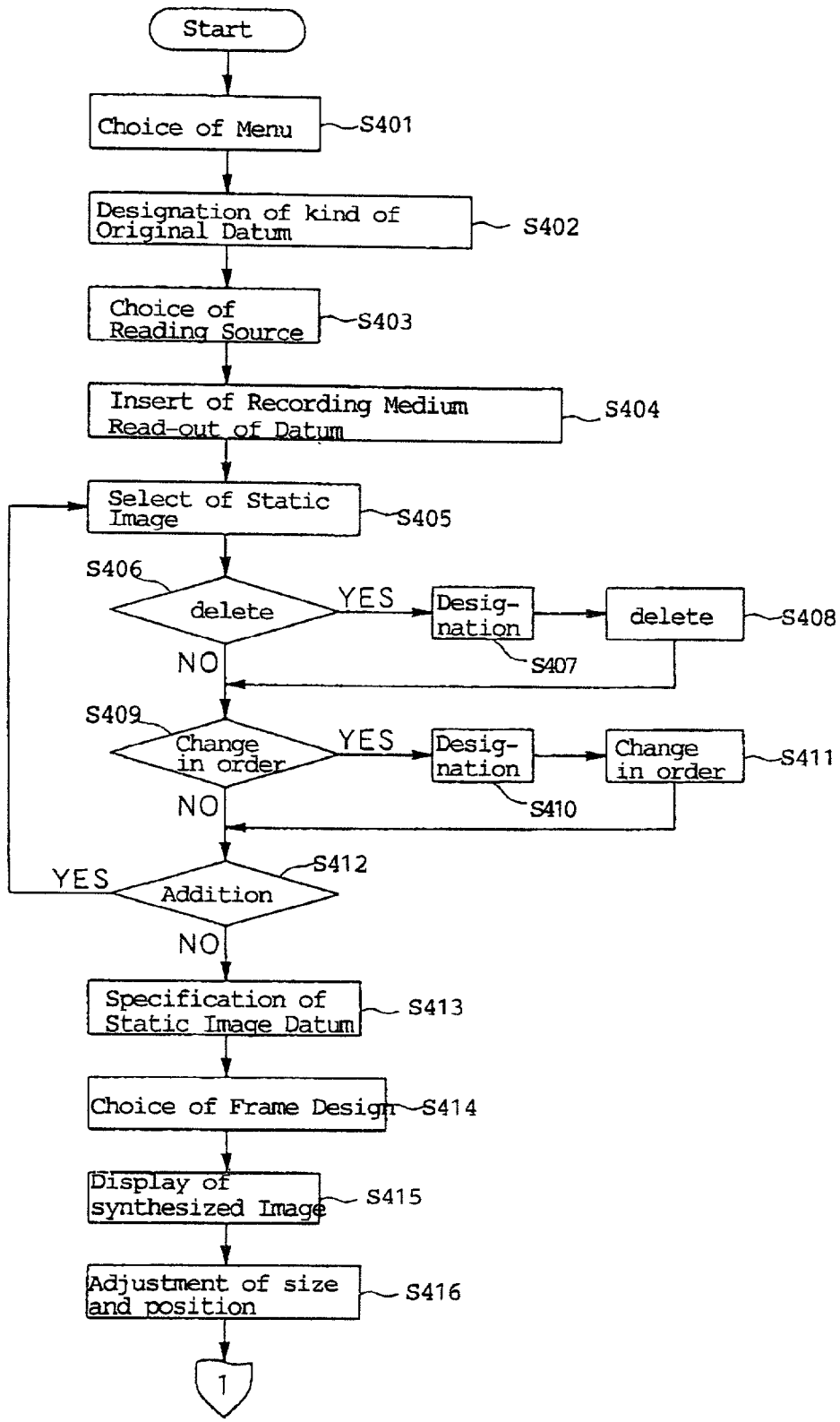
FIG. 51 is the flow chart which shows the first half of the procedure of frame synthesis in an embodiment of the image printing system according to the second aspect of this invention.

Next, the procedure at the time of choosing "frame synthesis" is explained. If the position of "frame synthesis" is touched with a hand in the main menu screen of above mentioned view 9, the procedure of "frame synthesis" as shown in FIG. 51 and FIG. 50 will start (S401). In addition, if the button will return to a start screen and "will return to a before screen" if "cancel" button and the button "return to the previous screen" are prepared for each operation screen displayed after the procedure of "frame synthesis" started in principle and "cancel" button is pushed is pushed, it can return to the operation screen in front of 1 stage, and operation can be redone.

If the procedure of "frame synthesis" starts, as shown in the view 53 as stated above, the operation screen which specifies the kind of original data is displayed, and either a static image or the dynamic images can be specified (S402). If a dynamic image data is specified in this screen, as shown in FIG. 55, the operation screen which enumerated image data's reading origin is displayed, and either reading origin can be chosen (S403). In addition, although the operation screen of view 54 is omitted in this example since only a standard print can be performed in the procedure of "frame synthesis", it can also set up so that a preview image can be edited in the procedure of frame synthesis. In this operation screen, if one of touch-panel buttons is touched, reading origin will be chosen, recording media can be inserted and reading of a dynamic image data will be performed (S404).

After reading of a dynamic image data is completed, as shown in FIG. 56, the operation screen which specifies a best shot from the countless scene included in the dynamic image appears, and static image data can be chosen (S405-S413). The process which specifies this static image data is the same in the procedure of a digital photograph.

If static image data is specified, as shown in FIG. 39, the operation screen which enumerated frames is displayed, and one of frames can be chosen (S414). In the operation screen at this time, the message of "please choose a favorite frame design" is laterally written by the uppermost row, below this massage, the frame designs are enumerated, and "cancel" button, the button "return to previous screen", the "expansion display" button, and "determination" button are provided in the lowermost row. A frame design is called from a material database and displayed on a screen.

Figure 61:
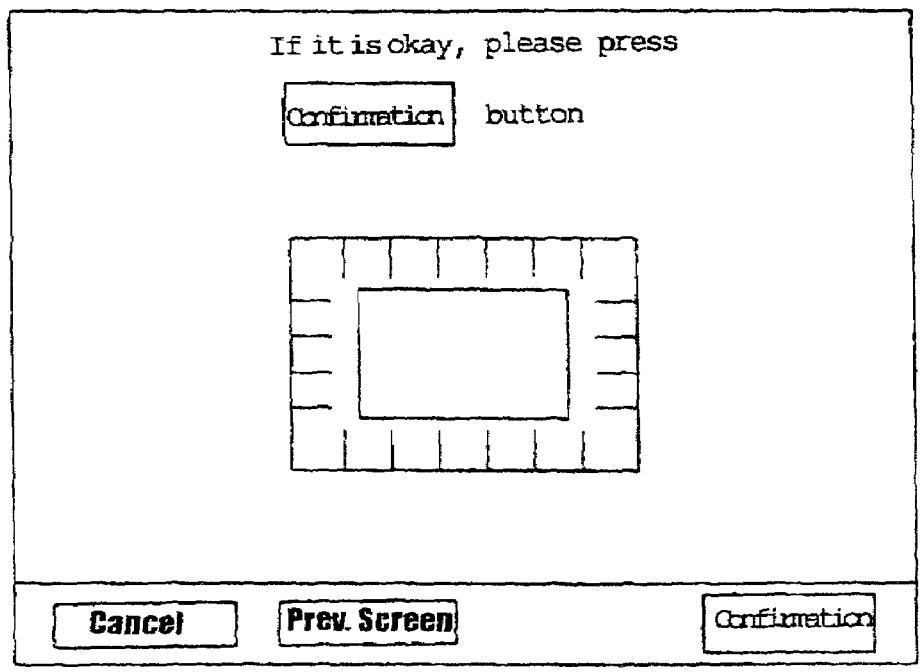
FIG. 61 is the expansion display screen of the selected frame in an embodiment of the image printing system according to the second aspect of this invention.

In case the enlarged display button is touched after touching one of a frame displayed on the screen, as shown in FIG. 61, the enlarged image of the selected frame is shown. In the operation screen at the time, the message "if it is okay, please press the confirmation button" is shown laterally in the uppermost row, and below the message, the enlarged frame design is shown. In the lowermost row, the "confirmation button" is provided together with the "cancel" button, and the "return to the previous screen" button. In case the customer does not like the enlarged frame, by touching the return to the previous screen button, the screen with the frames listed can be shown so that another frame can be selected.

In case the determination button is touched immediately after selecting the frame in the screen of FIG. 39, or in case the confirmation button is touched after indicating the enlarged image in the screen of FIG. 61, the frame to be used is set. In addition, when "no frame" is chosen in the screen of FIG. 39, since it becomes the procedure of performing the usual print of a digital photograph,the screen immediately shown in FIG. 58 is displayed.

Figure 62:
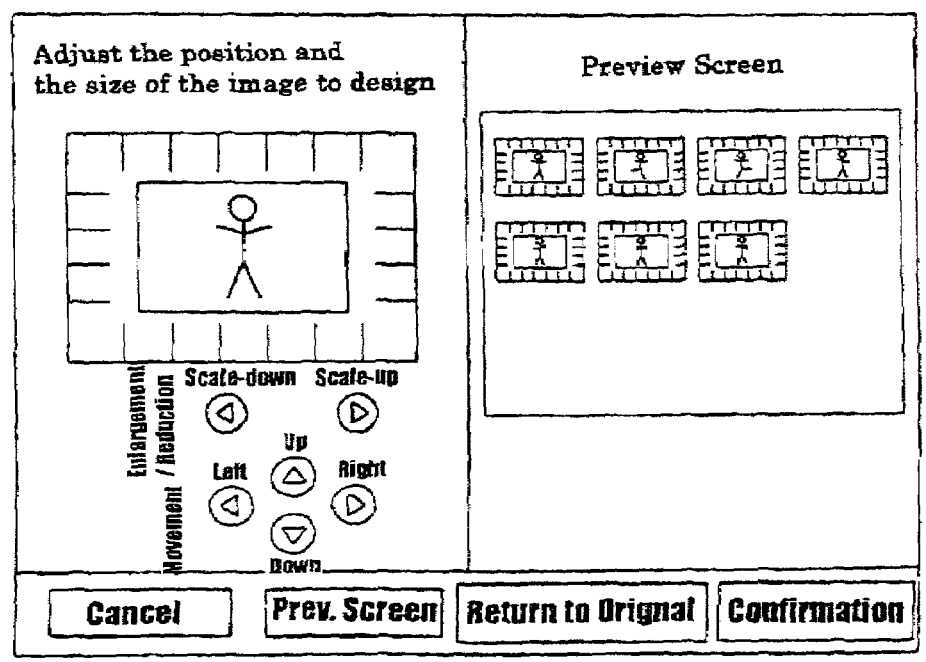
FIG. 62 is the operation screen which adjusts the synthesized image of frame synthesis in an embodiment of the Image printing system according to the second aspect of this invention.

If a frame is decided, while an operation screen as shown in FIG. 62 will appear and the synthesized image will be displayed, the size and the position of a static image and a frame can be adjusted (S415, S416). The operation screen at this time is divided into right and left, on the left-hand side of the operation screen concerned, the message of "please adjust the position and size of a image according to a design" is laterally written in the uppermost row, the edit screen which displays the synthesized image of the static Image data and the frame which have been set as the object of edit on the message bottom is prepared, and the touch-panel button group of expansion reduction and movement is prepared in the bottom of it. On the other hand, the preview screen of a synthesized image is displayed on the right-hand side of an operation screen Furthermore, "cancel" button, the "return to the previous screen" button, the button "reset", and the "confirmation" button are prepared in the lowermost row.

In this operation screen, each frame of a preview screen serves as a touch panel, if hands are touched and specified to be one of frames, it can be displayed on an edit screen, and the size of the read image can be changed by touching expansion or reduction button can be changed. Thus, the image can fit with a frame, and the position of a image can be adjust with a frame by touching each vertical and horizontal move button. If the reset button Is touched, it will return to original image size and an original position. By repeating similar operation. The edition work can be separately done about each static image data. However, it is also possible to set up so that any one may be made into representation and Image edition may be performed thereto, when two or more static image data is accumulated. Such a setup is effective when synthesizing a frame for each frame of a preview image including the seal print mentioned especially later.

If a synthesized image is decided, while the operation screen same with being shown in FIG. 58 appears and being able to check the image to be output, print number of sheets can be set up (S301, S302). After this, the process shown in FIG. 50 similarly in the procedure of a digital photograph is performed, and the printed article of the shot image which synthesized the frame is obtained (S303-S306).

Figure 52:
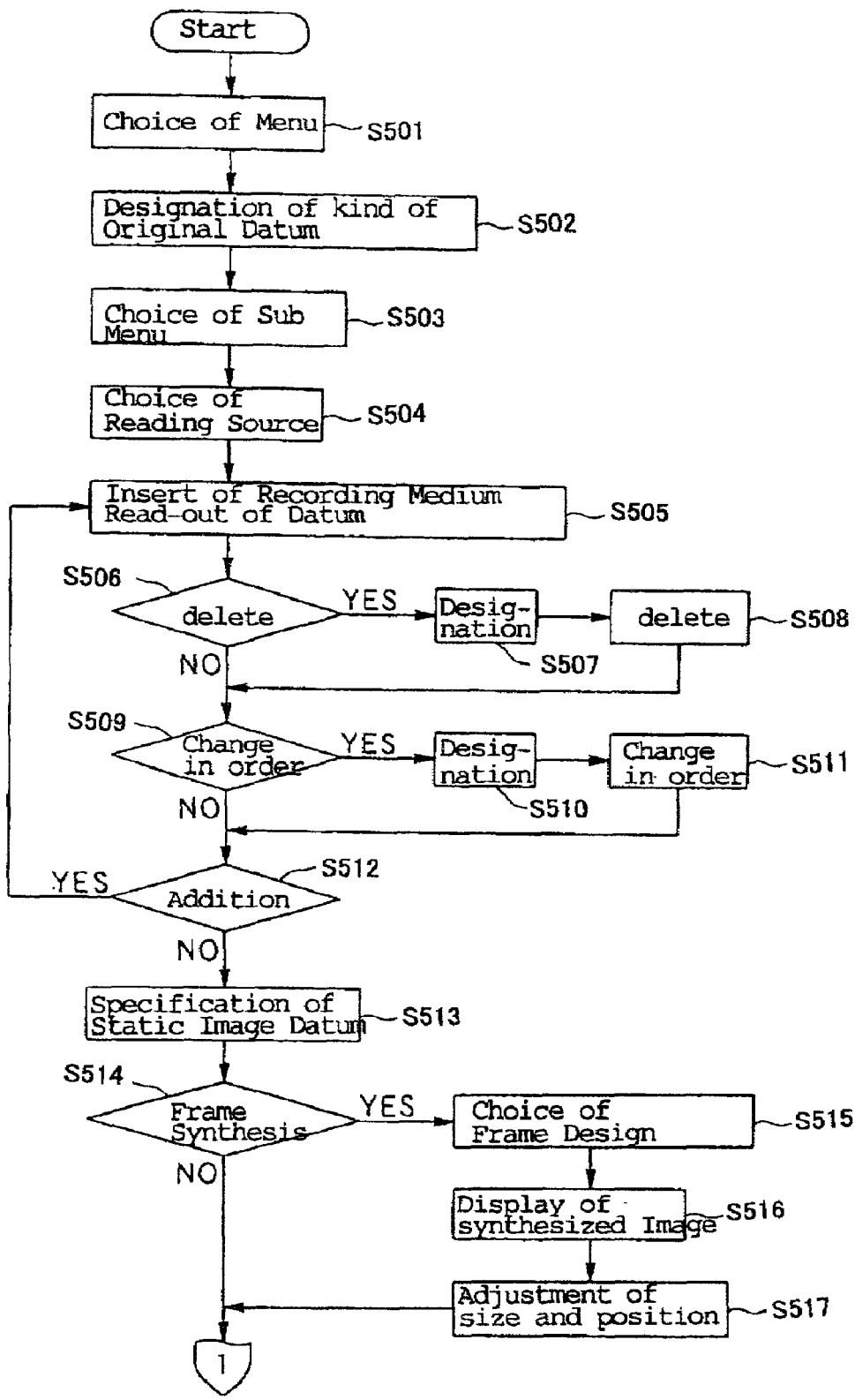
FIG. 52 is the flow chart which shows the first half of the procedure of a seal print in an embodiment of the image printing system according to the second aspect of this invention.

Next, the procedure at the time of choosing a "seal" is explained. If the position of a "seal" is touched with a hand in the above mentioned main menu screen, the procedure of a "seal" as shown in FIG. 52 and FIG. 50 will start (S501), and the pre-cut seal divided into two or more small screens will be obtained. In addition, in each operation screen to be indicated after the start of the "seal" procedure, in principle, a "cancel" button and a "return to the previous screen" button are provided so that it can return to the start screen by pressing the "cancel" button, and it can return to the operation screen of the previous step by pressing the "return to the previous screen" button so as to enable change of the operation.

Figure 63:
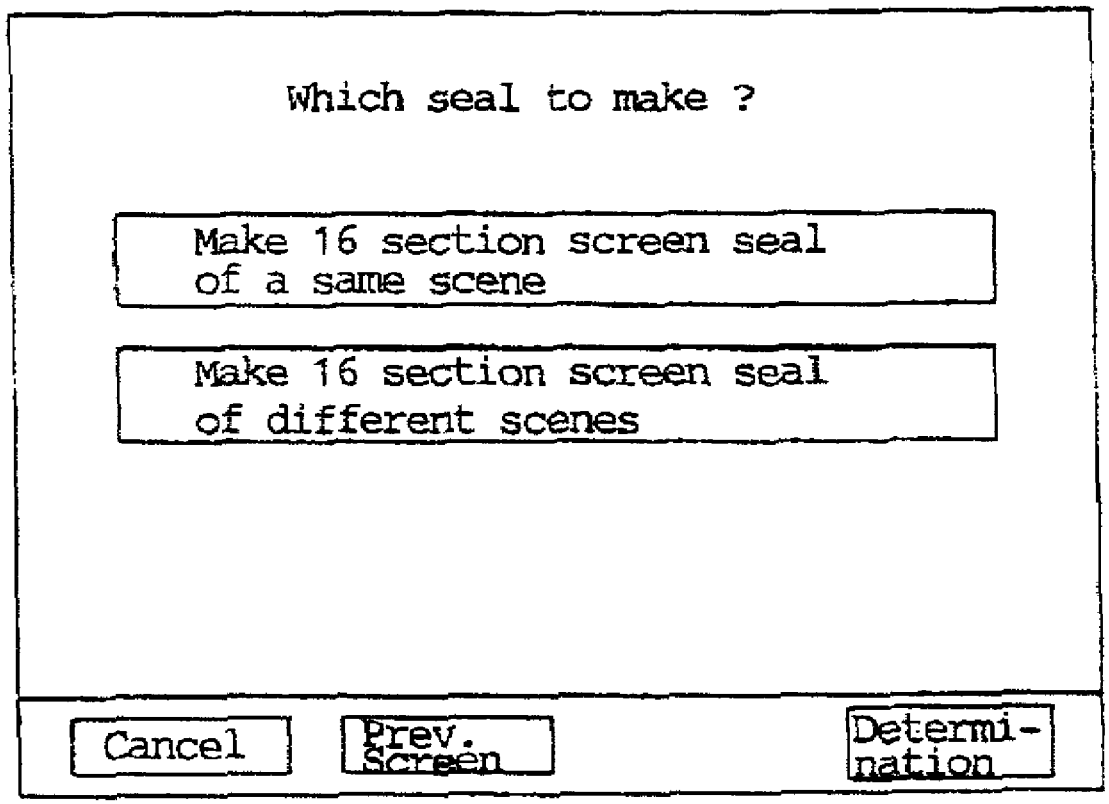
FIG. 63 is the screen which specifies a printed article to be output in an embodiment of the image printing system according to the second aspect of this invention.

If the procedure of a "seal" starts, as shown in the view 53 as stated above, the operation screen which specifies the kind of original data is displayed, and either static image or dynamic images can be specified (S502). If a dynamic image data is specified in this screen, as shown in FIG. 63, the operation screen which specifies whether the small screens of several scenes or the small screens of the same scene should be printed will appear (S503). In the screen at this time, the message of "which seal do you want?" is laterally written by the uppermost row, the touch-panel button of the choice "making 16 section screens with a same scene" and "making 16 section screen with different scenes" are arranged perpendicularly, and at the lowermost raw the "cancel" button, the "return to the previous screen" button, and "determination" button are provided. If either is chosen on this operation screen, as shown in FIG. 55, the operation screen which enumerated image data reading source is displayed, and either reading source can be chosen (S504). In this operation screen, if one of touch-panel buttons is touched, reading source will be chosen, recording media can be inserted and reading of a dynamic image data will be performed (S505).

After reading of a dynamic image data is completed, as shown in FIG. 56, the operation screen which specifies a best shot from the countless scene included in the dynamic image appears, and static image data can be chosen (S506-S513). In the operation screen of FIG. 63, when printing only the small screen of the same scene is chosen, only one static image data is specified. Moreover, in the operation screen of FIG. 63, when printing the small screen where scenes differ is chosen, static image data can be specified up to 16 pieces. The process which specifies this static image data is the same in the procedure of a digital photograph.

If static image data is specified, as shown in FIG. 39, the operation screen which enumerated frames can be displayed, a frame can be chosen according to guidance on an operation screen, and a frame can be synthesized on each smallness screen (S515-S517). However, when a touch-panel button without a frame is chosen, the process of frame synthesis (S514) can be skipped. In the procedure of a "seal", frame synthesis can be performed similarly in the procedure of "frame synthesis."

If a synthesized image is decided, while the operation screen same with being shown in FIG. 58 appears and being able to check the image to be output, print number of sheets can be set up (S301, S302). After this, the process shown in FIG. 50 similarly in the procedure of a digital photograph is performed, and the printed article of the pre-cut seal which arranged the shot image of the small screen which synthesized the frame is obtained (S303-S306).

According to the dynamic image shot printing system of this invention, as explained above, it is possible to process a dynamic image data easily, possible to print shot image contained in a dynamic image as it is or after advanced image processing. Therefore, it can provide the image printing system and printed article of high added value.

According to the dynamic image shot printing system of this invention, by combining freely the original dynamic image contents and/or original static image contents brought by a user with dynamic image contents and/or static image contents possessed by the system or originally obtainable by the system side, a new image can be easily synthesized and easily printed out.

Moreover, If the owner of a dynamic image data can specify a shot image from a dynamic image data personally by using the post type image outputting apparatus according to this invention, it is possible to delete such inconveniences that the customer should specify a static image data from the dynamic image data in advance to go to print shop, or asking the clerk of print shop to specify the static image by replaying the dynamic image in front of the clerk, and possible to easy access and use the system.

Moreover, since it is possible that the post type image output apparatus is provided with an image processing system of business-use and advanced performance and a printer of high performance, by using such a post type image outputting apparatus, the owner of a dynamic image data can make advanced edit freely to the shot image of a dynamic image by his hand, obtain the shot image of a dynamic image being printed on special goods, and the printed article of a dynamic image shot with difficult creation which are not be easily created by the personal computer and printer at a home.

Addition Information Printing System

Figure 64:
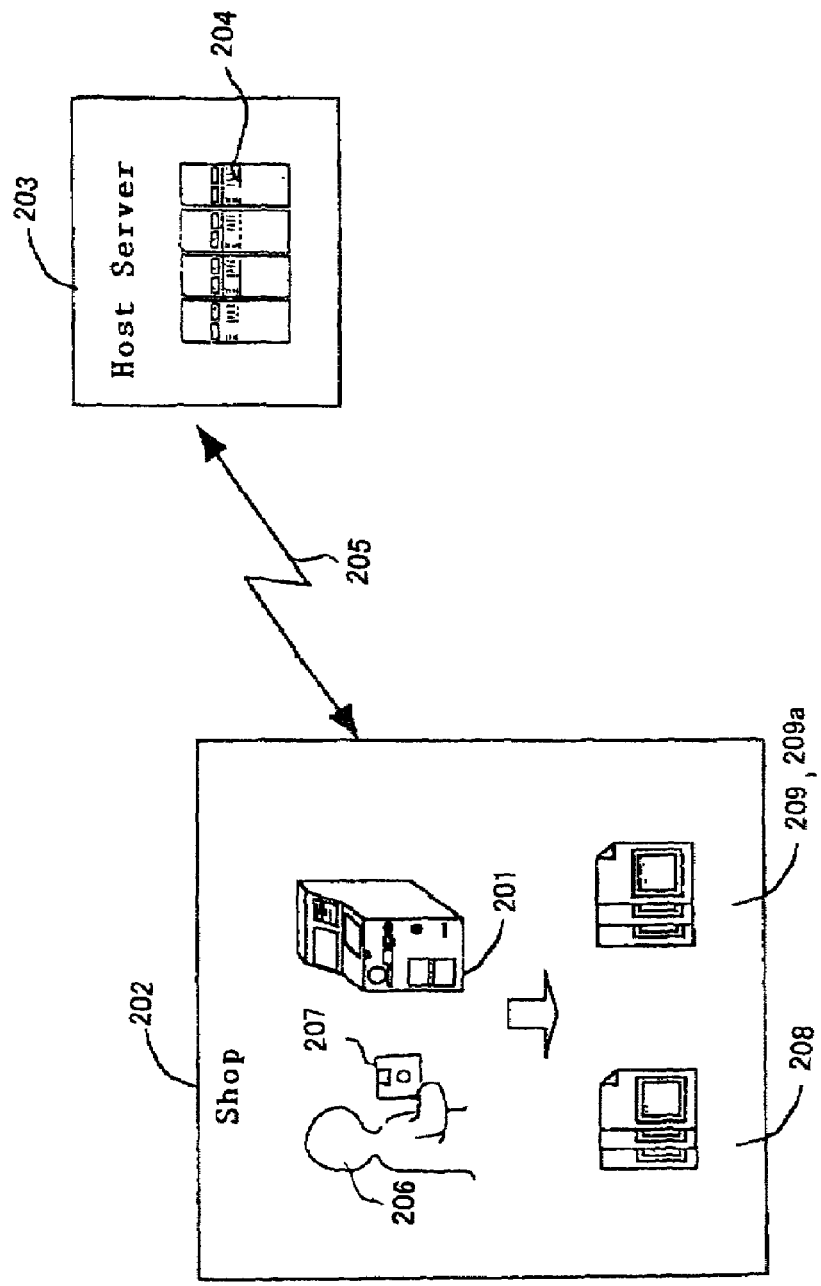
FIG. 64 is the outline view of system according to the third aspect of this invention.

The embodiment of the addition information printing system according to this invention is explained in detail. In the term explained below, the word "image data 207", it is not be restricted to the image data recorded on recording media, such as a flexible disk, but analog images, such as a photograph, may also be included. The word "printing apparatus 201" is also not limited to the printing apparatus as shown in FIG. 64. As the printed apparatus any kind of printing apparatus may be used as far as it has a fee charging function and with the apparatus a customer 206 can obtains the printed article 208 of the image data 207 by himself.

Figure 65:
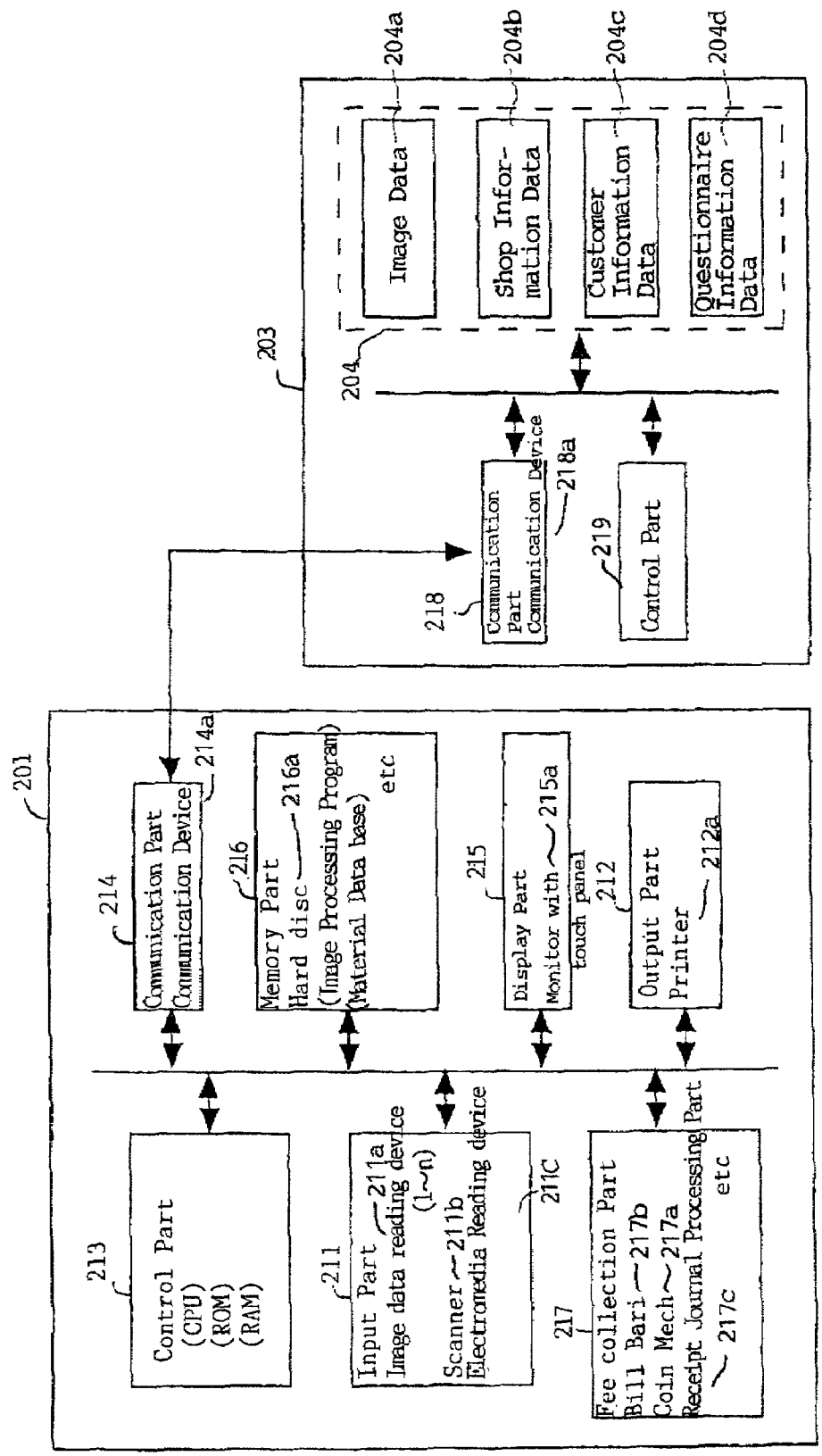
FIG. 65 is the block diagram showing an embodiment of the additional information printing system according to the third aspect of this invention.

FIG. 64 shows the outline view of the addition information printing system according to this invention, and FIG. 65 shows a system construction thereof. As shown in these Figures, the system has printing apparatus 201 which is installed in the shop 202, and the database 204 installed by the host server 203, and the printing apparatus 201 and database 204 are connected through the communication circuit 205. If the shop 202 has amply space for installing the database 204, the connection between the printing apparatus 201 and the database 204 with in the same shop can be connected with any connection code or line. Further they may be connected via network. In this system, when the image data 207 which a customer 206 demands is printed as the printed article 208 by using the printing apparatus 201 installed in the shop 202 of this system, various information service such as advertising information, personal information, etc. can be offered as the printed article 209 which is added to the printed article 208.

In the printing apparatus 201 installed in the shop 202 the input part 211 for inputting image data 207, the output part 212 for outputting the input image data 207, the control part 213 which controls through from input to output, the communications part 214 for communicating with the exterior, the display part 215 for displaying an operation procedure, the memory part 216 which processes procedure programs, such as an operation procedure and a printing procedure, etc., and the fee collection processing part 217 for collecting the charge concerning the printing are connected via a bus 210.

The input part 211 may be equipped with image data reading apparatus 211a containing the various reading devices 1-n corresponding to various kinds of recording media. Image data reading apparatus 211a may include scanner 211b and electronic media reading devices 211c. Scanner 211b is used in order to read analog images, such as a photograph, and input as digital image data. Electronic media reading apparatus 211c is used in order to input the image data recorded on the electronic media. Moreover, electronic media reading device 211c contains the various reading devices corresponding to various kinds of recording media. As an example of electronic media, e a floppy disk, a PC card, MO, smart media, a compact flash, etc. may be cited. A customer can input the image data currently recorded on the brought recording media using corresponding reading apparatus.

The output part 212 may be equipped with the output unit for outputting the image data input by the input part 211 as analog images, such as a photograph. An output unit is printer 212a. As a kind of this printer 212a, a sublimation transfer formula printer is used suitably.

The control part 213 may be equipped with CPU, ROM, RAM, etc. for controlling the flow of data (information), memorizing temporarily, or calculating addition of a point etc. Moreover, it may have a storing means for saving the image data input according to the request of a customer. Moreover, it has an extraction means by which the image data specified by demand of a customer always can be extracted from the image data stored by the storing means.

The system may have the hard disk 203 (mass memory medium) as a memory part 216. A program Is stored in a hard disk 203 and the control part 213 controls each apparatus connected through the bus 210 according to the program. As the program stored in hard disk 216a, for example, an image processing program for processing the input image, a questionnaire program for acquiring information by the questionnaire, a point addition program for supply and adding a point to the customer embracing the customer's use situation, as well as a the reading program corresponding to each recording media, a print control program, fee collection program, an addition information print program, etc., are exemplified. Each programs may read when needed, and various kinds of means are performed.

The display part 215 is equipped with monitor 215a with touch panel, and displays the operation guidance for performing the program memorized by the memory part 216. According to the displayed operation guidance, a series of operations from reading of image data to the output of printed article can be performed by performing selection and execution.

The fee collection processing part 217 is equipped with coin mech 217a, bill bari 217b, and receipt journal processing part 217c, and performs fee collection processing which starts the printing from the printed article which the customer demanded, printing number of sheets, etc. The coin mech 217a and/or bill bari 217b perform fee collection processing of judgment of genuineness of the coin or bill inserted for the fee payment, the judgment of the kind thereof, the amount calculation, the discharge of the change or the like. Receipt journal processing part 217c prints the printing menu, the collected fee amount or the like on a receipt paper and discharges the receipt.

The communications part 214 has communication device 214a. Communication device 214a can communicate with the exterior, and can perform movement of data etc. The exterior may be, for example, the host server 203. The database 204 for storing image data 207 is prepared for the host server 203, image data 207 is saved in the database 204, or the saved image data 207 is extracted.

The host server 203 may be equipped with the communications part 218, the control part 219, and a database 204. The communications part 218has communication device 218a. Communication device 218 is connected with communication device 214a with which printing apparatus 201 was equipped through the communication circuit 205. The control part 219 performs storing and extraction control of the image data 207 demanded from printing apparatus 201, or the information data 204b and 204c.

Image data 203a, shop information data 204b, and customer information data 204c may be stored in a database 204. Image data 203a is image data 203a when a customer 206 uses printing apparatus 201. Shop information data is the information on shops 22 (shopping center etc.) and advertisement/advertising information that printing apparatus 201 was installed. For example, they are the recommended information, coupon information, and the other member information on the point card service which a shop deals with, on a shop that printing apparatus was installed. The administrator of printing apparatus 201 mainly inputs this information using printing apparatus 201. Moreover, shop information data can carry out the addition of change and new information etc. at any time. Customer information data is personal information data of the customer using printing apparatus 201. For example, it is point data which adds the number of points and is added each time according to the use situation of a customer individual's printing apparatus. Customer Information data is automatically updated at any time, whenever a customer uses.

Thus, it has the input part 211 as an inputting means by which a customer 206 or a printing apparatus donor inputs image data 207 or information into printing apparatus 201. It has a database 204 as a means to store the image data 207 or information which carried out the input. With the demand from the above mentioned customer 206 or printing apparatus 201, the information (203a-204c) demanded from stored image data 203a or the information (204b, 204c) is specified, and the work which extracts specified image data 203a or the information (204b, 204c) is done by the control part (213, 219) (controlling). The image data 207 input or demanded by the customer 206, and information (204b, 204c) while having the output part 212 (printer 212a) as a printing means to print 204c, printing the image data 207 which accepted the demand of a customer 206, and the customer 206 input or demanded and offering the printed article 208. It considered as the addition information print service system which provides a customer 206 with the printed article 209 which printed information (addition information).

Figure 66:
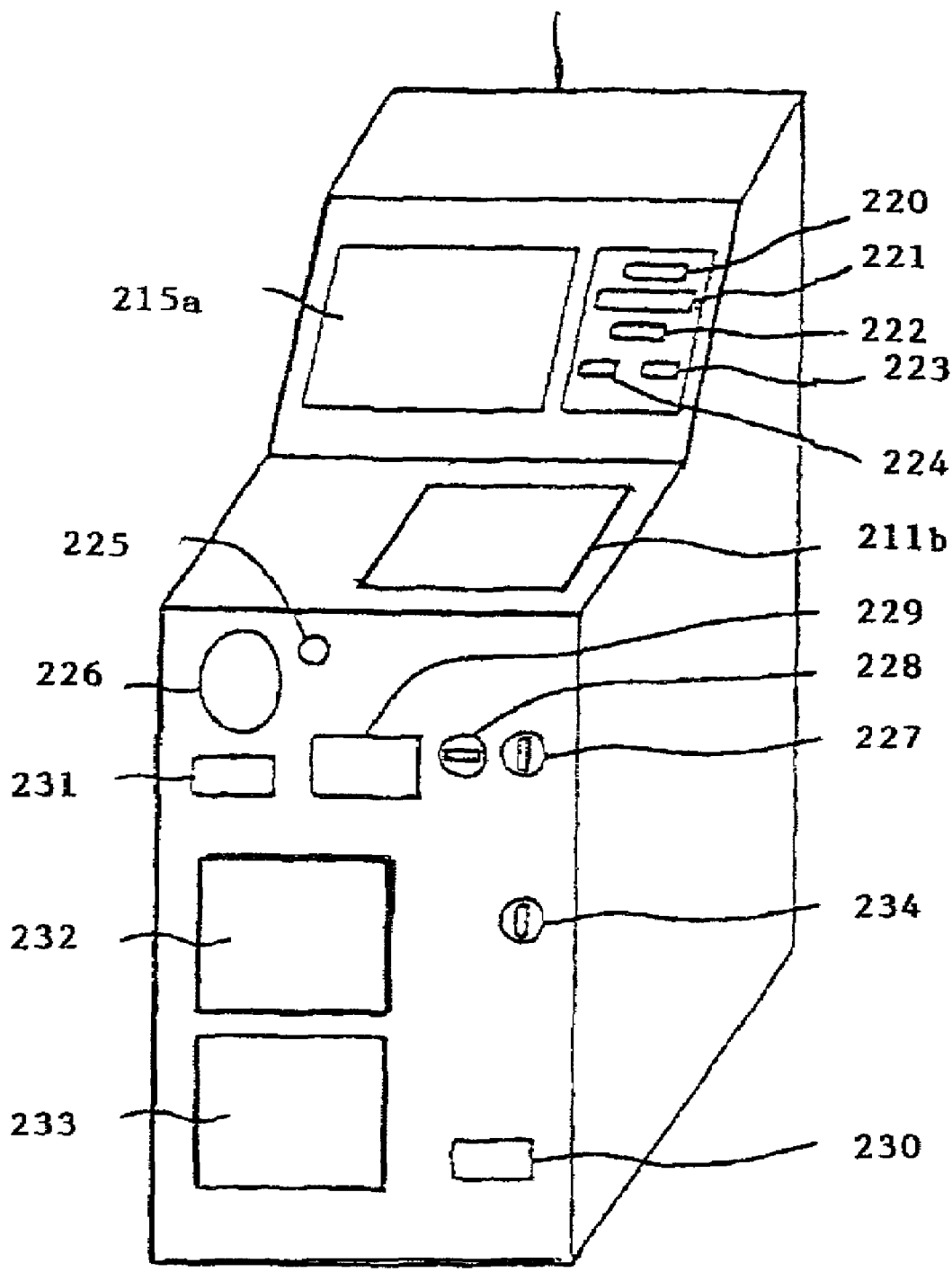
FIG. 66 is the perspective view of a printing apparatus.

The general view of printing apparatus is shown in FIG. 66. Like illustration, the screen of monitor 215a with touch panel is arranged at the upper row part front of the main part of printing apparatus 201. As for this screen. CRT and a liquid crystal panel are used. This monitor 215a with touch panel also demonstrates the function as a means to perform input operation in an order inputting means, a questionnaire inputting means, etc. while demonstrating the function as a display means to display guidance of operation, the situation of operation, the read image or the processed image, etc.

As a Image input part 211, the insertion ports 220-224 of image data reading apparatus 211a which can read the image data recorded on various recording media are formed beside the screen of monitor 215a with touch panel. A scanner 211b reading surface is provided on a horizontal part dividing the upper part and the lower part for reading the image of a printed article and processing the same to digital data.

In this embodiment, as the insertion ports for the various recording media, specifically, a flexible disc insertion port 220, a CD-ROM insertion port 221, a PC card insertion port 222, a smart medium insertion port 223, and a compact flash insertion port 224 at a position on the whole. A shutter (not shown) may be provided on each insertion port 220-224 for protecting these ports.

In the lower part of the main body, a maintenance key 225, a speaker 226, a coin insertion port 227, a coin return lever 228, a bill insertion port 229, a change return port 230, a receipt outlet port 231, a printed article (for standard printing) outlet port 232, a printed article (for pre-cut seal) outlet port 233, and a front door opening/closing key 234 are disposed.

The maintenance key 225 is a key for switching an ordinary drive mode capable of accepting a customer, and an administration mode for setting the image printing system or maintenance by an administrator. In management mode, the color correlation for the printed article to output from a printer outputting like standard coloring information can be performed if needed suitably. The speaker 226 is for reproducing the sound, BGM, effect sound or the like while waiting or operation. The maintenance key 225 is a key which changes the usual operation mode which can receive a customer, and the management mode in which an administrator performs a setup and maintenance of a image printing system. In management mode, the color compensation for the printed article to output from a printer outputting like standard coloring information can be performed if needed suitably. A speaker 226 can reproduce a sound, BGM, a sound effect, etc. during standby and operation.

The coin insertion port 227 or the bill insertion ports 229 is formed in order to pay a charge. The coin return lever 228 is used when a coin is choked Moreover, when the coin return lever 228 is turned, or when there is change to the injection amount of money, it is from the change return port 235.

The receipt outlet port 231 constitutes a part of the receipt producing means and the order receipt note producing means. After collecting the fee by the fee charging means, a receipt with the collected amount and the order content printed is discharged from the receipt outlet port 231.

The printed article (for standard printing) outlet port 232 and the printed article (for pre-cut seal) outlet port 233 constitute parts of the printing means which is stored inside of the main body. A printed article is discharged from the printed article outlet port 232 or the printed article outlet port 233.

By turning the front door opening/closing key 234, the front door is opened so that the maintenance work for each device installed inside the housing can be executed. In the housing of the main body 1, each main body is installed corresponding to the screen of the monitor 215a with a touch panel, the Insertion port 220-224, and the scanner 211b reading surface. A volume adjusting part is installed corresponding to the speaker 226. Corresponding to the coin insertion port 227, the coin return lever 228, the bill insertion port 229, and the change return port 230, a coin mech 217a (coin processing device) for identifying the coins, storing, and returning the change, a bill bari 217b (bill processing device) for identifying the bills, and storing, and a safe for storing the coins. In case the coin mech 217a is fill, are installed. Corresponding to the receipt outlet port 231, a receipt printer is installed. Furthermore, corresponding to the printed article outlet port 232, and the printed article outlet port 233, a printer 212a is installed.

Moreover, although it is not apparently recognized by the external appearance, inside the housing of the main body, a personal computer 213 including a control unit for controlling each device in the image outputting apparatus, a power source box for converting the voltage, an interruptible power supply device for preventing breakage of the CPU, the hard disc or the like in the control unit at the time of blackout or the like are installed.

Figure 67:
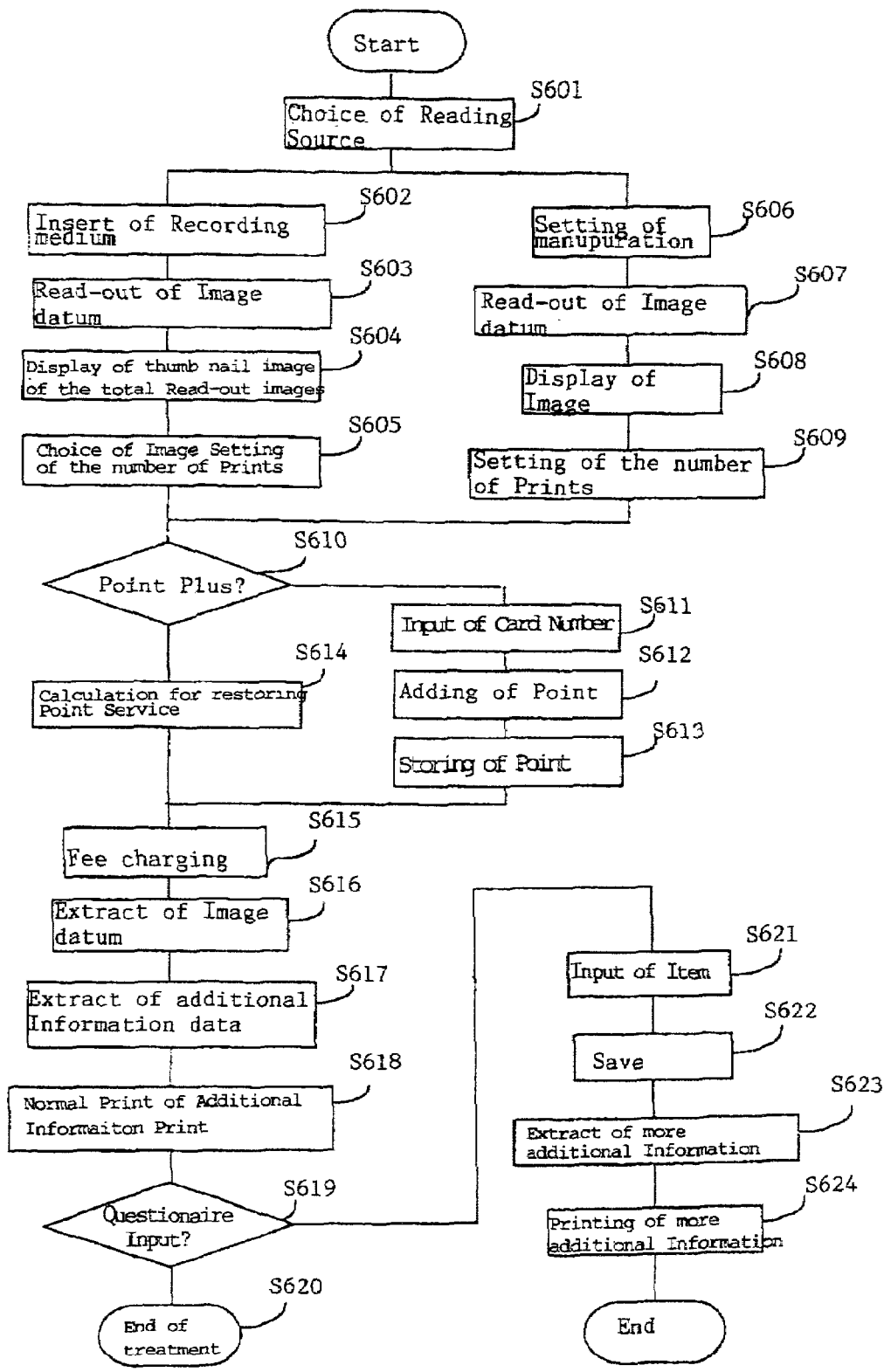
FIG. 67 is the flow chart of the operation form in an embodiment of the system according to the third aspect of the system of this invention.

The flow chart for operation of the embodiment according to this invention of is shown in FIG. 67, as shown in this figure, when printing an image data by using this printing apparatus, first, a customer performs selection of reading source (Step S601). When inputting image data using recording media, such as a flexible disk, it inserts in image data reading apparatus 211a (electronic media reading apparatus 11c) as a predetermined Input part 211 which can read the recording medium with which image data was recorded (Step S602), and image data is read (Step S603). Since the list of the thumb nail images of the image currently recorded on recording media is displayed on monitor 215a with touch panel of printing apparatus 201 (Step S604), image data (print) to be printed, its printing number of sheets, etc. are set up (Step S605). When inputting image data using analog data, such as a photograph, since the guidance screen in a setup of image data, such as a photograph, is displayed on monitor 215a with touch panel as a display part 215. According to the guidance, manuscripts (photograph etc. are set to image data reading apparatus 211a (scanner 211b) as an input part 211 (Step S606), and image data is read (Step S607). Since the image was displayed on monitor 215a with touch panel of printing apparatus 1 (Step S608) when image data was read, if necessary, after adjusting such as expansion, reduction, move or rotation of a image etc., printing (print) number of sheets etc. is set up (Step S609).

Next, a charge is determined according to the set up situation. A charge is changed by the existence of point addition service. ("Point addition service" is a form which adds the number of points according to a customer's use situation, and offers various services with the number of points.) The customer chooses existence of point addition, when a setup of the form of printing, number of sheets, etc. is completed (Step S610). When performing point addition, the card numbers (ID number, password, etc.) of a point card are input (Step S611). By inquiring the card number to the customer information data stored in the database, the customer is specified and to the specified customer information data points is added (Step S612), and it stores in a database (Step S613). When not performing point addition, reduction operation of point service is performed according to the situation used this time (Step S614), and discount etc. is served.

Here, the service correspondence table having shown the service outline is shown in Table 1. The data of Table 1 is beforehand stored in the memory part (hard disk) of printing apparatus, and reads and processes the information which corresponds in case the number of points is added, or in case the charge concerning printing is computed.

TABLE 1

SERVICE CORRESPONDENCE TABLE

| Print Mode | Service Point (Point) | Discount (yen) |
|---|---|---|
| Digital Photo Print | 1 | 5 |
| Seal Print | 4 | 20 |

(per 1 print)

If a printing form is a digital photograph print as shown in Table 1, when performing point addition per print, the number of points is added 1 point, and when not performing point addition, discount of 5 yen is performed. On the other hand, if a printing form is a seal print, when performing point addition per print, the number of points is added 4 point, and when not performing point addition, discount of 20 yen is performed. For example, when a customer performs a setup which prints 4 digital photograph print and 4 seal prints at a time, and it performs point addition, since seal prints is added 16 point, a digital photograph print is added 4 point and a total of 20 points. On the other hand, when not performing point addition, since 80 yen is discounted for the seal print and 20 yen for digital photograph print, a total of 100 yen is discounted from the normal charge.

Next, fee collection processing is performed (Step S615). Fee collection processing computes normal charge by setup of a printing form, number of sheets, etc. which the above mentioned customer set up. Then, when there is service of discount etc., the charge to be indicated is calculated by deducting discount money from the normal charge. Once a charge is computed, the print data of the charge will be created and it will display on monitor 215a with touch panel as a display part 215. A customer peruses the monitor 215a, and checks a charge. A customer injects the displayed charge from the predetermined entrance slot after a check.

After fee collection processing is completed, while extracting the image data which extracted the image data specified from recording media or the scanner (Step S616), and was specified out of image data 203a stored in the database 204, addition information data is extracted from shop information data 204b stored in the database 204, and customer information data 204c (Step S617). The image data and addition information data which were extracted are printed, and a customer is provided with the usual print and an addition information print (Step S618). Moreover, the screen of the purport for asking cooperate in a questionnaire using the time of the waiting for printing is displayed (Step S619). Processing is ended when the customer will not cooperate (Step S620). When the customer will cooperate, a questionnaire item is displayed and a customer inputs an item according to the display (Step S621). The input information is saved as questionnaire information data 204d in a database 204 (Step S622). This questionnaire information data 204d, it totals at any time and uses for an improvement of a shop etc. To the customer who had cooperated in a questionnaire, superior addition information data is further extracted from shop information data 204b etc. (Step S623). The extracted additional addition information data is printed, a customer is provided with the superior addition information print (Step S624), and processing is ended.

Figure 68:
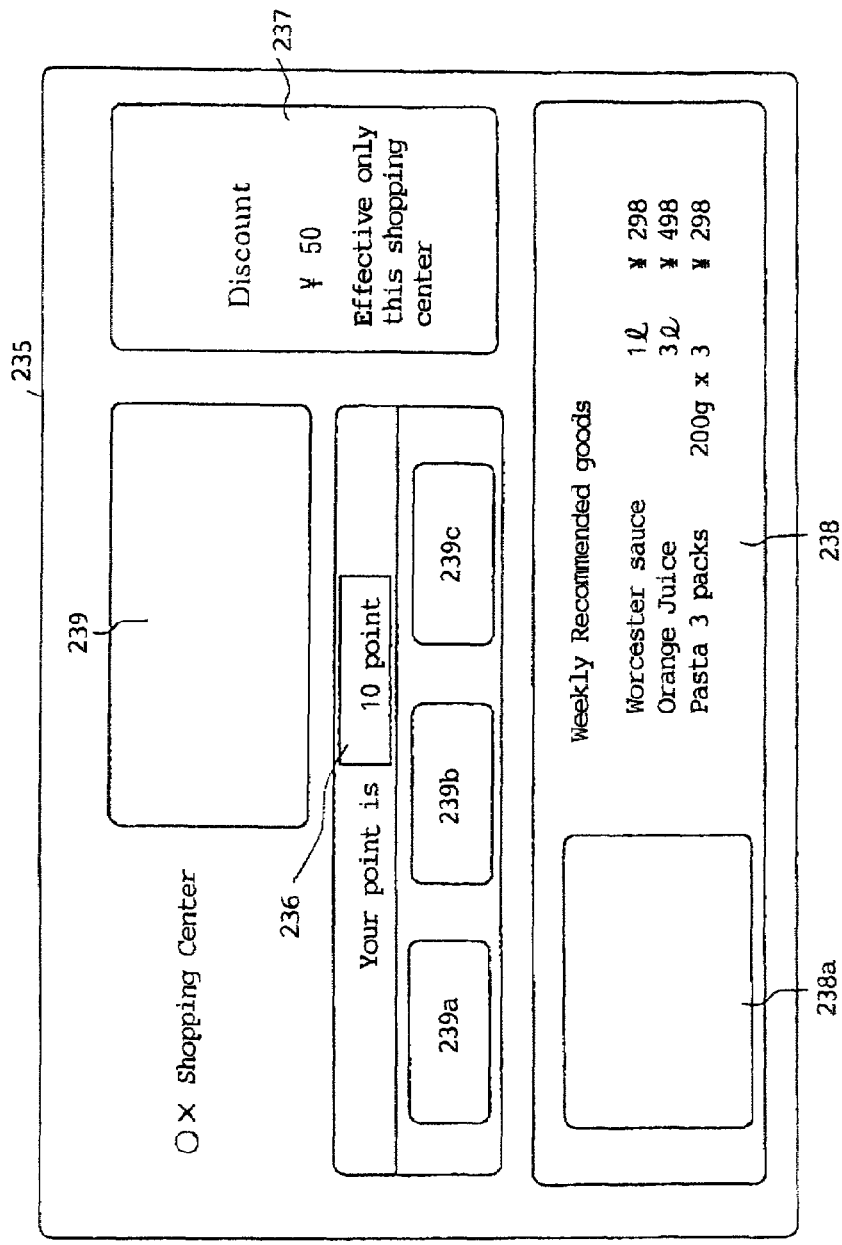
FIG. 68 is an example of a content of the additional information print with which a customer is provided.

The example of a display of the addition information print with which a customer is provided is shown in FIG. 68. When printing apparatus 201 is installed in the shopping center or the like, the addition information print 235 includes the number of point accumulation as point information 236 on a shopping center management card, the advertisement 238 and its image 238a which are the loss leader or recommended goods of a shopping center, the discount ticket 237 which can be used in the shopping center and as shop information, the other advertising information 239, 239a-239c etc. is printed with the form arranged in the predetermined position, and a customer is provided with the printed article. What is arranged where sets up in advance, and it extracts each information from a database 204, embeds it automatically, and prints it.

Thus, as a form of the service to a customer 206, the point addition program is beforehand stored in the memory part 216 of printing apparatus 201 and it is shown in Step S610-Step S614, while adding a point automatically according to the situation that the customer 206 used printing apparatus 201, the control part 213 performs addition processing with a former point, and it may store the number of points as customer information data in a database. When providing a customer 206 with the printed article 9 which printed addition information, it is desirable to also specify the above mentioned point information 236 (the number of accumulation). Moreover, the questionnaire program as a questionnaire inputting means is beforehand stored in the memory part 216 of printing apparatus 201. When a customer 206 has answer to a questionnaire as a questionnaire program is performed and it is shown in Step S619-Step S624, while printing the printed article (8 9) of Step S618, printed article 9a which printed new addition information may be added, so as to provide for a customer 206. Moreover, the printed article 9 and 9a which printed the addition information in the above mentioned service may have at least one of printed article with which the point information 236 (the number of accumulation), the shop information 237, 238, and 238a (an advertisement, recommended information. etc.), an advertisement 239-239c information, etc. was printed at least.

As mentioned above, although the operation form of printing apparatus equipped with an addition information print service system was shown, it is not limited to this operation form, but can carry out according to various forms. Similarly, printing apparatus is not limited to this form.

According to the addition information printing system of the third aspect of this invention, a customer can receive the information on the service (point addition service, discount service) according to the use situation, and others etc., like the service currently offered in other DPE shops etc. Moreover, in the shopping center in which the printing apparatus was installed, effective advertisement can be performed with the timely hit of the shop. Furthermore, an advertising income can also be obtained by inviting other advertisements.

The entire disclosure of Japanese Patent Applications No. 2000-247743 filed on Aug. 17, 2000, NO. 2001-008226 filed on Jan. 16, 2001, and No. 2001-076477 filed on Mar. 16, 2001 including the specification, claims, drawings, and summary are incorporated herein by reference in its entirety.

What is claimed is:

1. Image plus event information printing system, which comprises:
    an image data inputting means for inputting a datum of original image,
    an event information database which memorizes the data of current and/or passing social events information being sorted with two or more items, wherein one of the items consists of the occurrence time of the event, and another one of the items consists of genre of the event,
    an event genre selecting means, wherein a genre is selected from genres of event information,
    an event information retrieval means for extracting any event information in the selected genre within a predetermined range being in correlation to the time which is related to the original image, by retrieving from the sorted data in the event information database with using one or more of the items,
    an image editing means for preparing a datum of an image plus event information, from the datum of original image and the extracted event information, and
    a printing means for printing the image plus events information in accordance with the datum prepared by the image editing means.

2. Image plus event information printing system according to claim 1, wherein the time which is related to the original image is the photographed day of the original image.

3. Image plus event information printing system according to claim 1, which further comprises an event information selecting means, wherein one or more events information are selected as users pleases from the retrieved events information when two or more events information are retrieved from the sorted data at the event information retrieval means, and thereby,
    the image editing means prepares the datum of the image plus event information, from the datum of original image and the event information selected by the event information selecting means.

4. Image plus event information printing system according to claim 1, wherein the system comprises a terminal part and a event information service part, which are connected to each other via line, wherein the terminal part includes the image data inputting means, the image editing means and the printing means, and wherein the event information service part includes the event information database and the event information retrieval means.

5. Image plus event information printing system according to claim 1, wherein the system comprises a terminal part and a retrieval and editing part, which are connected to each other via line, wherein the terminal part includes the image data inputting means and the printing means, and wherein the retrieval and editing part includes the current event information database, the current event information retrieval means, and the image editing means.

6. Image plus event information printing system according to claim 1, wherein the system comprises a terminal part, an editing part, and an event information service part, wherein the terminal part and editing part are connected to each other via line, and the editing part and the event information service part are connected to each other via line, wherein the terminal part includes the image data inputting means and the printing means, and wherein the editing part includes the image editing means, and wherein the event information service part includes the event information database and the event information retrieval means, and the image editing means.

7. Server which delivers a material datum for image synthesis to a terminal or server capable of editing the image via line, which comprises:
    an event information database which memorizes the data of current and/or passing social events information being sorted with two or more items, wherein one of the items consists of the occurrence time of the event, and another one of the items consists of the genre of the event,
    an event genre selecting means, wherein a genre is selected from genres of event information,
    an event information retrieval means for extracting any event information in the selected genre within a predetermined range being in correlation to the time which is related to an original image, by retrieving from the sorted data in the event information database with using one or mare of the items, and
    a transmission means for transmitting the retrieved data to the terminal or server capable of editing the image.

8. Server according to claim 7, wherein the time which is related to the original image is the photographed day of the original image.

9. Server according to claim 7, which further comprises an event information selecting means, wherein one or more events information are selected as user's pleases from the retrieved events information when two or more events information are retrieved from the sorted data at the event information retrieval means.

10. Server which is connected to a terminal via line and transmits to the terminal a datum of image which is synthesized herein, which comprises:
    a receiving means for receiving a datum of original image,
    an event information database which memorizes the data of current and/or passing social events information being sorted with two or more items, wherein one of the items consists of the occurrence time of the event, and another one of the items consists of the genre of the event,
    an event genre selecting means, wherein a genre is selected from genres of event information,
    an event information retrieval means for extracting any event information within a predetermined range being in correlation to the time which is related to the original image, by retrieving from the sorted data in the event information database with using one or more of the items, and
    an image editing means for preparing a datum of an image plus event information, from the datum of original image and the extracted event information.

11. Server according to claim 10, wherein the time which is related to the original image is the photographed day of the original image.

12. Server according to claim 10, which further comprises an event information selecting means, wherein one or more events information are selected as user's pleases from the retrieved events information when two or more events information are retrieved from the sorted data at the event information retrieval means.

13. Image plus event information printing system according to claim 1, wherein the genres of the events information comprise entertainments news, sports, science, political economy, and non-genre.

14. Server according to claim 7, wherein the genres of the events information comprise entertainments news, sports, science, political economy, and non-genre.

15. Server according to claim 10, wherein the genres of the events information comprise entertainments news, sports, science, political economy, and non-genre.

* * * * *